United States Patent [19]
Yu et al.

[11] Patent Number: 5,721,876
[45] Date of Patent: Feb. 24, 1998

[54] SOCKETS APPLICATION PROGRAM MECHANISM FOR PROPRIETARY BASED APPLICATION PROGRAMS RUNNING IN AN EMULATION ENVIRONMENT

[75] Inventors: Kin C. Yu, Burlington; John L. Curley, North Andover, both of Mass.

[73] Assignee: Bull HN Information Systems Inc., Billerica, Mass.

[21] Appl. No.: 413,333

[22] Filed: Mar. 30, 1995

[51] Int. Cl.$^6$ ............................. G06F 3/00; G06F 15/63
[52] U.S. Cl. ................ 395/500; 395/200.79; 364/578; 364/242.94
[58] Field of Search ............................. 395/500, 200; 364/473, 238.3, 578, 284; 370/60

[56] References Cited

U.S. PATENT DOCUMENTS

| | | | |
|---|---|---|---|
| 4,742,447 | 5/1988 | Duvall et al. | 364/200 |
| 5,142,622 | 8/1992 | Owens | 395/200 |
| 5,301,302 | 4/1994 | Blackard et al. | 395/500 |
| 5,410,681 | 4/1995 | Jessen et al. | 395/500 |
| 5,475,601 | 12/1995 | Hwang | 364/473 |
| 5,485,579 | 1/1996 | Hitz et al. | 395/200.12 |
| 5,537,417 | 7/1996 | Sharma et al. | 370/94.1 |

*Primary Examiner*—Kevin J. Teska
*Assistant Examiner*—Herbert McNair
*Attorney, Agent, or Firm*—Faith F. Driscoll; John S. Solakian

[57] ABSTRACT

A host data processing system operating under the control of a host operating system such as an enhanced version of the UNIX operating system on a RISC based hardware platform includes an emulator which runs as an application process for executing emulated system (ES) user application programs. The emulator includes a number of emulated system executive service components including a socket command handler unit and a socket library component operating in shared memory and an interpreter, an emulator monitor call unit (EMCU) and a number of server components operating in host memory. The host operating system further includes a host socket library interface layer (API) which operatively connects through a TCP/IP network protocol stack to the communications facilities of the hardware platform. The socket server components operatively connect ES TCP/IP application programs to the socket library interface layer of the host operating system when such application programs issue standard ES socket library calls. The socket command handler unit maps the ES socket library calls into appropriate input/output requests directed to the EMCU. The EMCU directs the requests to an appropriate socket server component which in turn issues the appropriate host socket library calls to the host socket interface layer thereby eliminating both the need to communicate through additional protocol stacks and to provide additional communication hardware facilities.

42 Claims, 10 Drawing Sheets

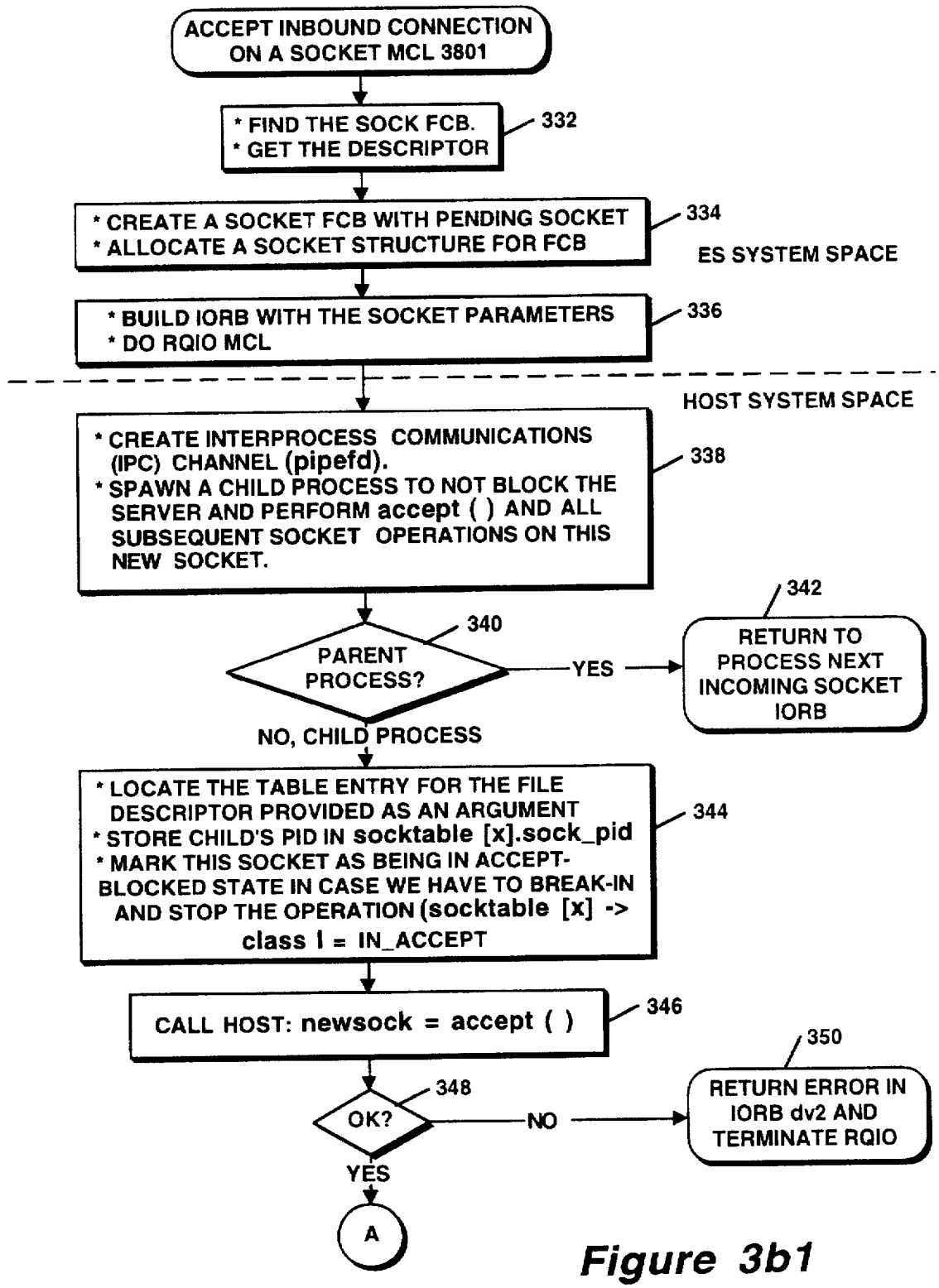
*Figure 3b1*

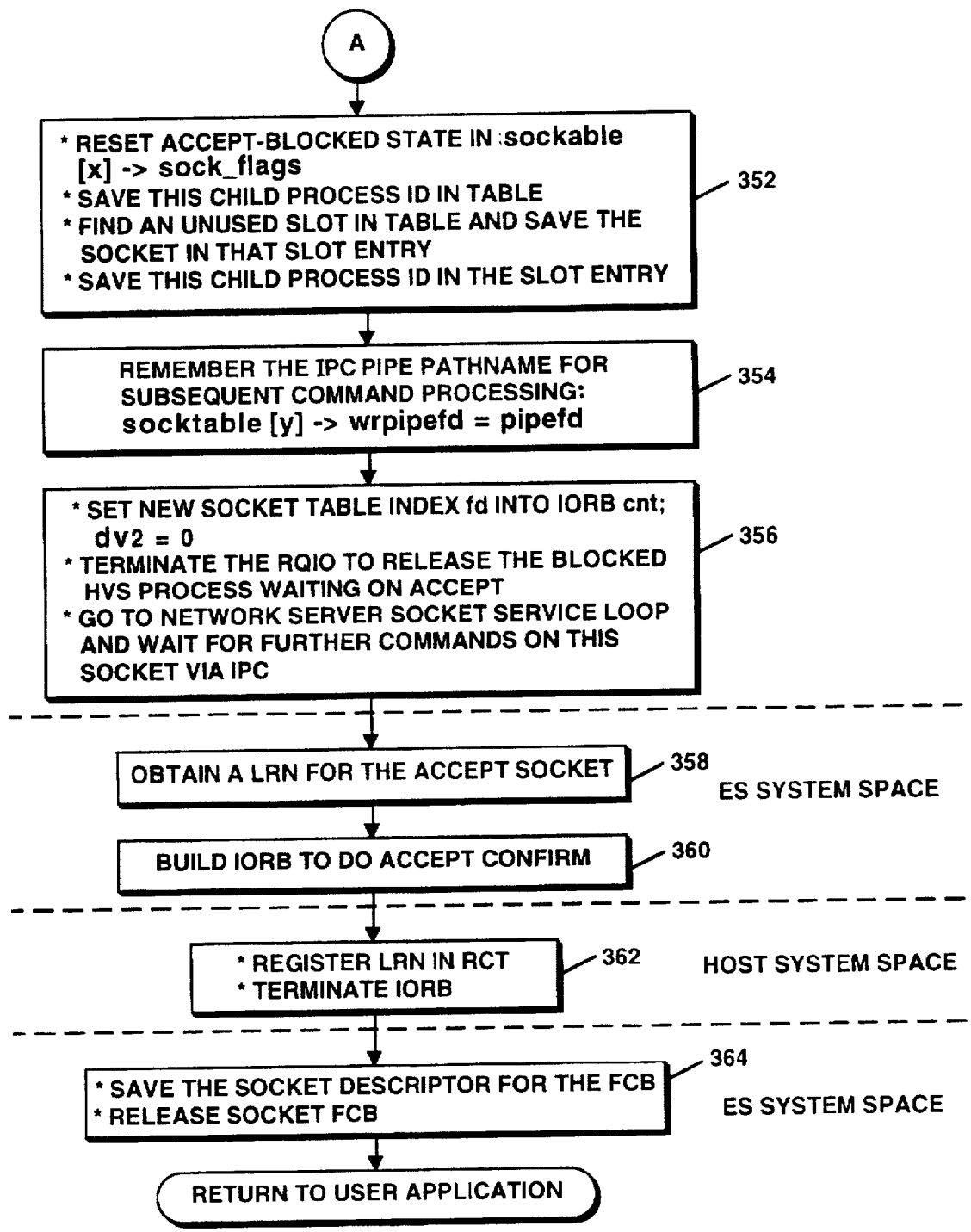
Figure 3b2

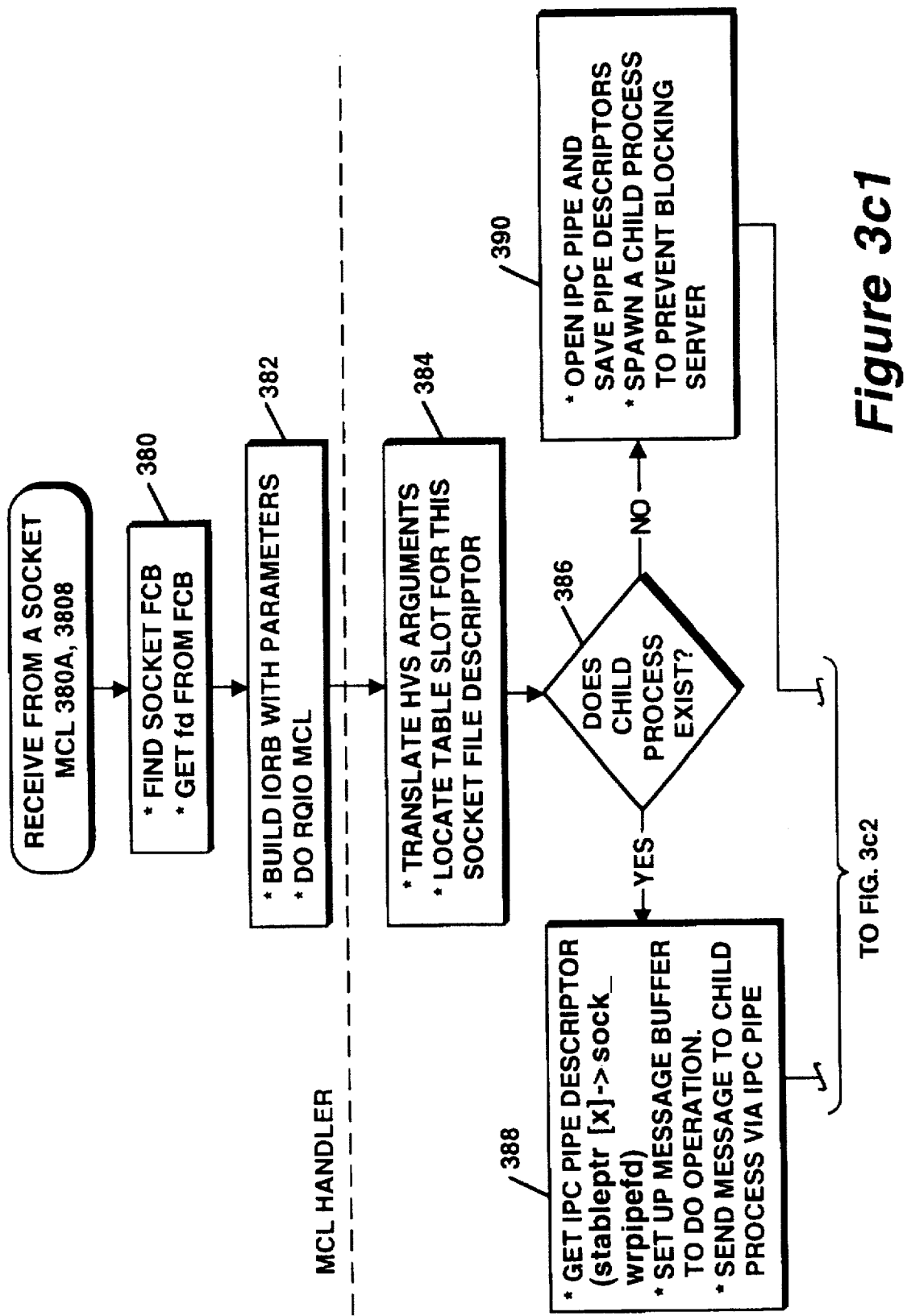
Figure 3c1

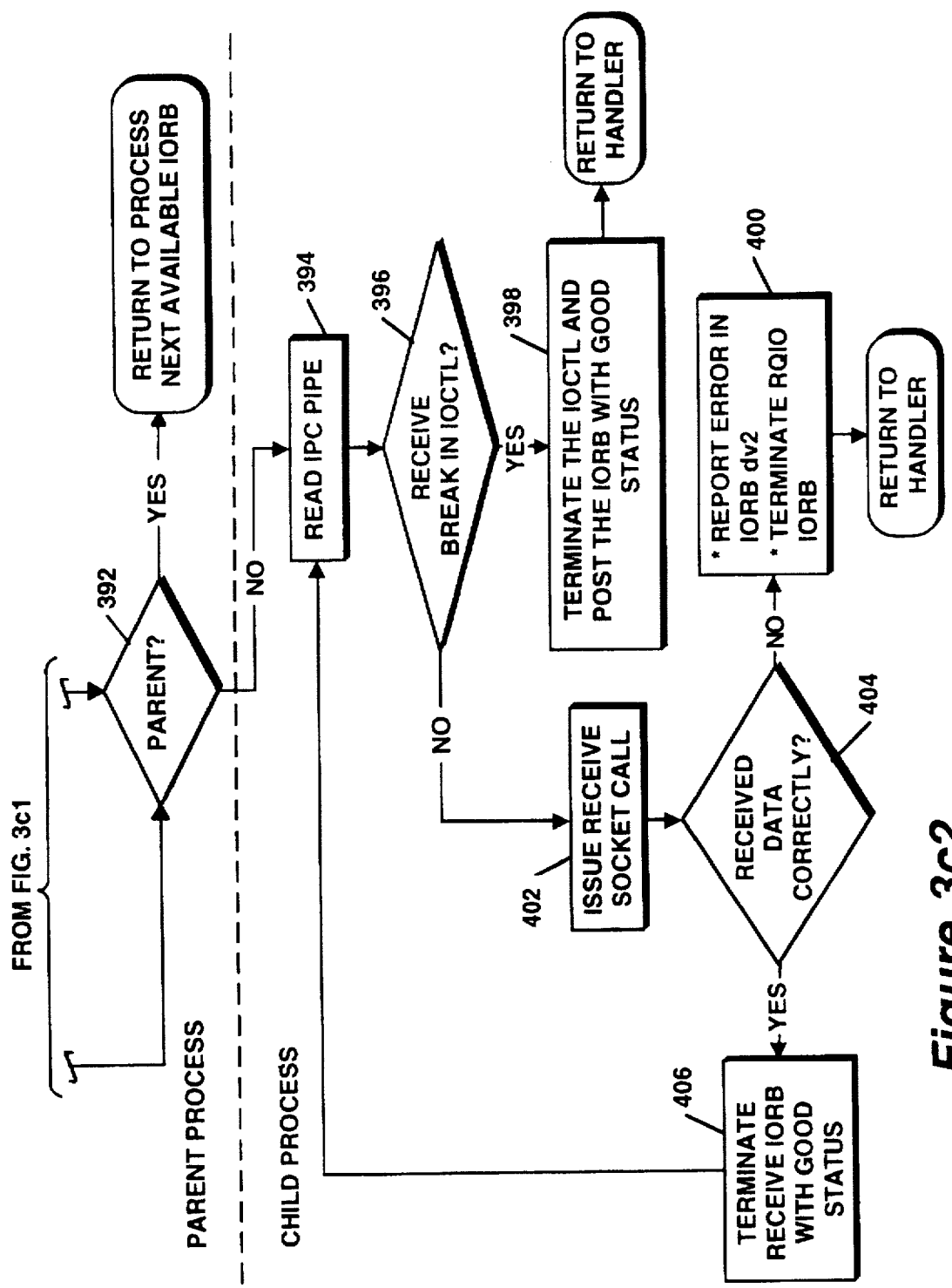
Figure 3c2

SOCKETS APPLICATION PROGRAM MECHANISM FOR PROPRIETARY BASED APPLICATION PROGRAMS RUNNING IN AN EMULATION ENVIRONMENT

RELATED PATENT APPLICATIONS

1. The patent application of Richard S. Bianchi, Dennis R. Flynn, Marcia T. Fogelgren, Richard A. Lemay, Mary E. Tovell and William E. Woods entitled, "Executing Programs of a First System on a Second System," filed on Sep. 28, 1993 bearing U.S. Ser. No. 08/128,456 which is assigned to the same assignee as this patent application.
2. The patent application of Richard S. Bianchi, et al. entitled "A Dual Decor Capability for a Host System which Runs Emulated Application Programs to Enable Direct Access to Host Facilities for Executing Emulated System Operations", filed on Sep. 23, 1994, bearing U.S. Ser. No. 08/311,655 which is assigned to the same assignee as this patent application.

BACKGROUND OF THE INVENTION

1. Field of Use

The present invention relates to network communications and more particularly to arrangements for executing proprietary application programs requiring socket networking services.

2. Related Art

With the advent of open system platforms which operate under the control of versions of the UNIX* operating system, it becomes more and more desirable to be able to efficiently run proprietary application programs on such open systems without having to rewrite or port such application programs. Also, when certain types of proprietary application programs are written to utilize standard communication network protocols, such as TCP/IP, implemented as part of the proprietary operating system, this may complicate the process of running these programs in an open system environment.

* UNIX is a registered trademark of X/Open Co. Ltd.

This process is further complicated when multiple instances of an emulated system are to be concurrently emulated on an open system platform. This type of arrangement is discussed in the related copending patent application of Richard S. Bianchi, Dennis R. Flynn, Marcia T. Fogelgren, Richard A. Lemay, Mary E. Tovell and William E. Woods entitled, "Executing Programs of a First System on a Second System".

One approach which has been considered is to provide a separate TCP/IP protocol stack and separate hardware facilities for servicing the network demands of such proprietary application programs. While this approach appears satisfactory, it creates considerable processing delays causing such proprietary application programs to run too slow thereby reducing overall system performance. This can be a substantial disadvantage particularly when such programs are to be executed in an emulator environment. Also, this approach is too costly in terms of memory resources and is unable to take direct advantage of the facilities of the open system environment.

Accordingly, it is a primary object of the present invention to provide a method and system which enables application programs running in an emulation environment on a host system to be efficiently executed so as to minimize delays.

It is another object of the present invention to provide a method and system for executing application programs running in an emulation environment on a host system which requires minimal change to the host system thereby facilitating debugging, modifying and maintaining of such programs.

SUMMARY OF THE INVENTION

The above and other objects of the present invention are achieved in a preferred embodiment of the present invention which includes a host data processing system operating under the control of a host operating system such as an enhanced version of the UNIX operating system on a RISC based hardware platform. The host system includes an emulator which runs as an application process for executing emulated system (ES) user application programs. The emulator includes a number of emulated system executive service components including a socket command handler unit and a socket library component operating in shared memory and an interpreter, an emulator monitor call unit (EMCU) and a number of server components operating in the host memory.

The host operating system further includes a socket interface layer which operatively connects through a TCP/IP network protocol stack to the communications facilities of the host hardware platform. The hardware platform operatively couples to conventional network facilities. Socket server components operatively connect ES TCP/IP application programs to the socket library interface layer of the host operating system in response to standard ES socket library calls issued by such programs. The socket command handler unit contains specific routines which map the ES socket library calls into appropriate input/output requests directed to the EMCU which in turn directs the requests to a main socket server component. The socket server component in turn issues the appropriate host socket library calls to the host socket library interface layer thereby eliminating both the need to communicate through additional protocol stacks and the need to provide additional communication hardware facilities.

In accordance with the present invention, the main socket server component spawns server child processes as a function of the type of socket library call function being processed by the server. That is, when the socket library call function is determined by the main socket server component to be a function/operation requiring either a long or an indeterminate amount of time to process, it creates a child process to perform that specific operation. This prevents the function from blocking the operation of the main socket server component so that it can continue to handle socket library calls from other user applications.

In the preferred embodiment of the present invention, the management of the different socket operations being executed is carried out using a socket control table. According to the present invention, the socket control table contains a number of addressable slot locations which are allocated to user applications on a first come first serve basis. The address of each assigned slot location is used as an index to the control table for obtaining information pertaining to the actual socket (number) assigned by the network facilities. The socket control table address is returned to the application which issued the library call and is used by the application as the assigned socket number.

Each socket control table slot includes a number of fields which when the slot is assigned, store information pertinent to the assigned socket. For example, the fields include a first field for storing the actual assigned socket number, a second field for indicating the owner/creator of the socket entry (i.e. main or child socket server process) and a number of fields for storing pipe descriptor information to establish and maintain interprocess communications between parent and child socket server processes. The control table arrangement enables the efficient multiplexing of socket library requests by server components thereby increasing overall system performance. The size of the socket control table is selected to be large enough to accommodate a substantial number of concurrent socket operations.

Overall, the socket mechanism of the present invention allows proprietary application programs running in the emulation environment access to host TCP/IP protocol stack communication facilities of the host enhanced UNIX operating system thereby eliminating the need to communicate through additional protocol stacks or to provide additional communication hardware facilities. This in turn enhances overall system performance as well as eliminating the need for having to allocate additional system resources (e.g. memory).

The above objects and advantages of the present invention will be better understood from the following description when taken in conjunction with the accompanying drawings.

BRIEF DESCRIPTION OF THE DRAWINGS

FIGS. 2, 3a through 3c2 are flow diagrams used in describing the operation of the present invention.

DESCRIPTION OF THE PREFERRED EMBODIMENT

Figure 1A:
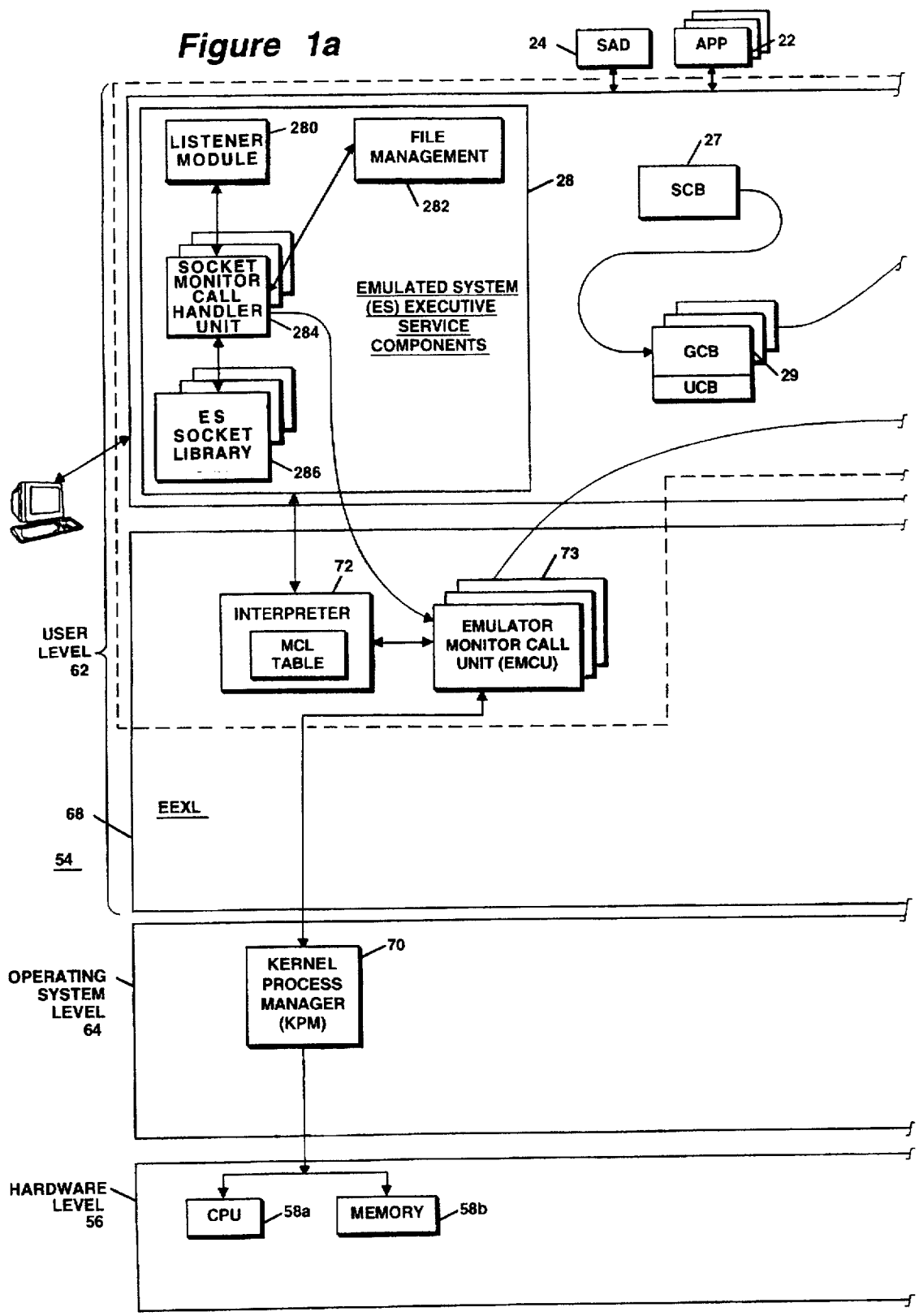
FIGS. 1a and 1b illustrate in block diagram form, a multilayer emulator system which incorporates the method and components of the present invention.
Figure 1B:
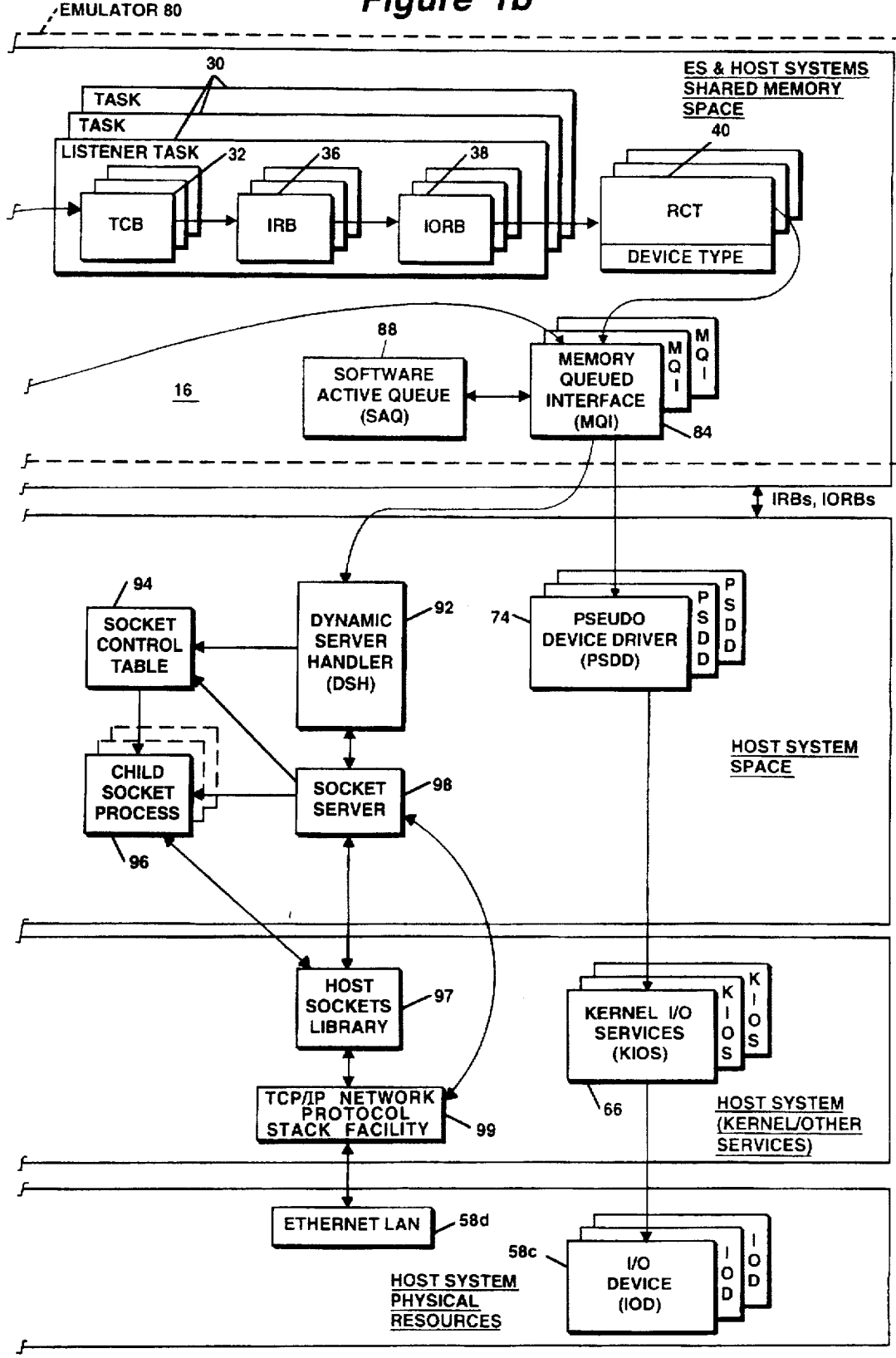

FIGS. 1a and 1b collectively form a block diagram of a host system 54 which incorporates the components of the present invention. As shown, the system 54 includes a hardware platform 56 which contains the hardware elements such as a central processing unit 58a, a main memory 58b and a number of input/output peripheral devices 58c and a communications facility such as an Ethernet local area network (LAN) 58d for connecting system 54 to other processing systems via standard communication network facilities.

The central processing unit (CPU) represented by block 58a is a reduced instruction set (RISC) based processing unit which takes the form of the RS6000 microprocessor manufactured by IBM corporation. The hardware platform 56 may also take the form of the DPX/20 system marketed by Bull HN Information Systems Inc.

As seen from FIG. 1a, the hardware platform 56 including processing unit 58a operates under the control of an enhanced version of the UNIX* operating system such as the AIX** operating system. Portions of physical memory represented by MEM block 58b are illustrated in terms of the layered construction. As shown, memory is divided into two basic levels, a user level and an operating system level. The user level is divided into emulated system (ES) and host shared memory space and host or an operating system kernel native memory space. The shared memory space contains the ES executive level 16 which includes a plurality of executive program tasks 30 spawned by ES executive services components of block 28 for executing ES application programs 22 and system administrator programs 24.

\* UNIX is a registered trademark of X/Open Co. Ltd.
\*\* AIX is a registered trademark of International Business Machines Corporation.

In the emulated system, each task 30 utilizes a plurality of data control structures, such as a task control block (TCB) structure 32, an indirect request block (IRB) structure 36, an input/output request block (IORB) structure 38 and a resource control table (RCT) structure 40. The task control block (TCB) structure 32 contains information pertaining to the state of execution of the associated task as well as pointers to interrupt save areas for storing hardware parameters related to the task. The indirect request block (IRB) structure 36 contains information defining the operation requested by an associated task and includes pointers identifying the task and its associated task control block (TCB) and a pointer to the associated IORB structure.

The input/output request block (IORB) structure 38 is used as the standard means of requesting a physical I/O service. It contains information such as a logical resource number (LRN) that identifies the I/O device being addressed as well as the location and size of the buffer to be used for the transfer and the specific function (operation) requested. The resource control table (RCT) structure 40 contains information describing the resources, such as its characteristics or information regarding the tasks or requests being executed by a corresponding resource as well as pointers to its associated task control block (TCB) structure.

Additionally, two other structures depicted in FIG. 1a are a group control block (GCB) structure and a user control block structure of block 29. The GCB structure contains information required to define and control the operations of a specific task group which defines a named set of one or more tasks with a common set of resources within which a user and system function must operate. Each group has a two character name (e.g., $L, $S) by which the group is uniquely known to the system. The GCB structure includes information identifying the lead task whose execution spawns all other tasks required for executing group programs. As indicated, the GCB structure includes a number of user control blocks (UCB), each of which contains information defining the user's personality such as user node identification, user group id within a node, user task id within group, user person id and pointer information to directories to which the user has access.

As shown, the emulated system utilizes a further data structure corresponding to system control block (SCB) structure 27. This data structure is created at system startup and contains information defining system resources and pointers to the different task groups established by the system represented by a corresponding number of group control blocks in the system. For further information regarding such structures and their relationships to each other, reference may be made to U.S. Pat. No. 5,111,384 and the publication entitled "HVS PLUS Systems Concepts" published by Bull HN Information Systems Inc., Order No. HE03-01.

As indicated in FIG. 1b, the shared memory space further includes a memory queued interface (MQI) represented by block 84 which provides a form of interprocess communication mechanism and a software active queue (SAQ) of block 88. SAQ block 88 represents a data structure used to provide the path by which the results of the operations performed by the kernel level components are passed back or returned by the host processes to the requesting emulated system user level tasks 30 being executed. Thus, it can be viewed as functioning as an output stage of MQI 84. This data structure is similar to data structures which are used by the emulated system operating system.

MQI block 84 is a semaphore data structure which takes the form of a single linked list controlled by semaphores through a set of routines which are executed by the various host processes operating within different levels or layers that want to communicate with each other. Its routines are used to manage queues within the pseudo device drivers 74 and the software active queue 88.

Executive Services Components 28

As seen in FIG. 1a, the executive services components 28 of executive layer 16 includes a plurality of components or facilities which are equivalent to those facilities normally included in emulated system. The emulated system is a multiprogrammed multiprocessor system. The facilities illustrated in FIG. 1a include a listener module 280, a file management facility 282, a socket monitor call command handler unit 284, and an ES socket library 286 which are arranged as shown. The listener module 280 is responsible for monitoring the operations of terminals configured for login and for initiating user tasks in response to user commands. As indicated in FIGS. 1a and 1b, listener module 280 runs as a task 30 with its own set of unique data structures.

The listener module 280 is able to consult a profiles file containing user specific registration information such as user id, login id and password requirements tabulated by the system administrator for all registered users. The listener module 280 checks the user profile when monitoring the privileges and/or restrictions given to each user. The file management facility 282 includes the conventional shared data structures and set of routines normally provided to perform functions that access such data structures to control the synchronization of concurrent processes or tasks in addition to performing various system services or functions. That is, the facility responds to system service monitor calls identifying the types of services requested (e.g. creating or deleting files, reading or writing records or blocks in files) which result in the specified system services being executed by the emulated system on behalf of executing user application programs.

A monitor call unit (not shown) receives monitor calls from the interpreter component 72 which are in turn to be executed interpretively using the ES executive service components of block 28. A command handler unit (not shown) contains the routines that respond to user commands entered via a terminal or program. In response to such commands, the command handler unit routines invoke the appropriate tasks for executing such commands.

The present invention includes an ES socket command handler unit 284 and ES socket library 286. The ES socket library 286 is constructed to provide the same socket application program interface (API) as provided in the emulated system. This interface is described in detail in the manual entitled "GCOS 6 HVS TCP/IP SOCKET API FOR C USERS" published by Bull HN Information Systems, Inc., copyright 1993, order no. RD89-00.

The ES socket command handler unit 284 contains a plurality of routines which operate to convert HVS socket calls into the appropriate low level request input/output (RQIO) monitor calls accompanied by IORBs created by mapping/translating the socket library calls into the corresponding socket function codes. As described in detail herein, the IORBs are forwarded to the main socket server component by the EMCU via the MQI interface. The main socket server component then issues the appropriate host (ADO socket calls to the host system socket facilities.

Emulator level layer 68

As indicated in FIGS. 1a and 1b, the next layer within the user level is the emulator executive level 68. This level includes certain components present in the emulated system which have been transformed into new mechanisms which appear to the remaining unchanged components to operate as the original unchanged components of the emulated system. At the same time, these new mechanisms appear to the components of the kernel level 64 as native components with which the host system is accustomed to operate. As shown, the components include the interpreter 72, an emulator monitor call unit (EMCU) 73, dynamic server handler (DSH), main socket server component 98, a number of child socket processes 96 and a socket control table 94 operatively coupled together as shown.

As indicated in FIG. 1b, the emulator executive level 68 further includes a plurality of pseudo devices drivers (PSDD) 74 for each input/output device or type of input/output device which is required to be emulated by host system 54. For example, the pseudo device drivers 74 will include PSDDs for terminals, disk drivers, tape drivers, displays and for certain communication devices.

For a more detailed discussion of other aspects of the SAQ 88, MQI block 84, PSDD 74 and other emulator components, reference may be made to the related patent application.

The interpreter 72 successively fetches the instructions of an emulated system application program, categorizes each instruction and executes it interpretively through sequences of RISC instructions which allows CPU 58a, MEM 58b and other elements of host system 54 to emulate the operations of corresponding elements of the emulated system. The interpreter 72 includes a monitor call (MCL) table containing information for each possible monitor call which it utilizes to determine whether to trap or send an ES monitor call to the ES executive services components 28 for execution of the instruction or to make an emulator call to EMCU 73 for execution of the instruction through the services of an appropriate C language routine (server). The EMCU 73 is responsible for acquiring from the host system 54, the necessary memory and other resources, for initializing the emulated system data structures and invoking interpreter 72 and the various server processes. Both the interpreter 72 and EMCU 73 run as host processes.

As viewed by the host system, the ES service components 28 and tasks 30 being executed on behalf of the application programs, the interpreter 72 and EMCU 73 are executed in the system 54 of FIGS. 1a and 1b as a single process 80 wherein such process corresponds to one or more user processes as defined by the conventions of the host operating system being run on host system 54. Thus, it is possible to have multiple instances of the emulated system concurrently emulated on host system 54.

The dynamic server handler (DSH) 92 is created by EMCU 73 during initialization. The server 92 communicates with emulated system processes through MQI 84 as indicated. The lower level main socket server 98 and socket control table 94 are dynamically created by higher level server 92 for carrying socket operations according to the present invention. The main socket server 98 creates child socket processes as a function of the type of socket operation to be performed and manages such child processes through socket control table 94. All of the servers operate as root and therefore have super user privileges with access to any file within the host system 54.

The server 92 include mechanisms specifically designed for validating security at the user level in conjunction with the execution of dual decor commands and functions. These mechanisms are described in the related copending patent application entitled "A Dual Decor Capability for a Host System which runs Emulated Application Programs to Enable Direct Access to Host Facilities for Executing Emulated System Operations".

Operating System/Kernel Level

The operating system/kernel level 64 includes the standard mechanisms and components normally included within the host operating system. As shown, level 64 includes a kernel process manager component 70 and a number of host kernel I/O services (KIOS) processes 66 for each pseudo device driver (PSDD) 74 which is to be emulated by the host system. Additionally, in the preferred embodiment of host system 54, level 64 is assumed to contain the standard utility programs, shell, editors, compilers, etc. and libraries (e.g., I/O libraries, open, close) which are accessed in the host user mode. For further information regarding the use of such arrangements, reference may be made to publications of the IBM Corporation describing the AIX operating system.

In the preferred embodiment, the kernel/operating system level 64 further includes as an interprocess communications facility, an implementation of "sockets" which includes a host sockets library 97 for storing a plurality of socket subroutines and network library subroutines and a TCP/IP network protocol stack facility 99 arranged as shown. The stack facility 99 connects to an Ethernet driver included within kernel level 64 (not shown) which communicates with the Ethernet LAN 58c.

As indicated in the system of FIGS. 1a and 1b, as in the case of the AIX operating system, the socket subroutines contained in host sockets library 97 serve as the application program interface (API) for TCP/IP. This API provides three types of communications services which use different components of TCP/IP. These are reliable stream delivery, connectionless datagram delivery and raw socket delivery. For further information regarding sockets, reference may be made to various well known publications and texts such as publications of IBM Corporation describing the AIX Version 3.2 for RISC System/6000 and the text entitled "UNIX System V Release 4: An Introduction for New and Experienced Users" published by Osborn McGraw-Hill, Copyright 1990 by American Telephone and Telegraph Company.

DESCRIPTION OF OPERATION

In the emulated system, several different types of applications included within block 22 issue ES socket library calls to carry out read and write operations between the host and remote computer systems using TCP/IP. In the preferred embodiment, these applications include an FTP interactive program which allows a user to transfer files between the system of FIGS. 1a and 1b and a remote system; a Telnet interactive program which implements the UNIX remote terminal logon and a remote file access (RFA) which gives a user access to the facilities of a remote system. For specific information about these types of applications such as FTP, reference may be made to the publication entitled "GCOS 6 HVS TCP/IP Reference Manual" published by Bull HN Information Systems Inc., copyright 1993, Order Number RE86-01.

With reference to FIGS. 1a through 4b, the operation of the preferred embodiment of the socket mechanism of the present invention will now be described. In this example, it is assumed that reliable stream delivery services are used. By way of example, it is assumed that one or more of the above emulated system application programs 22 written to run on a DPS6000 system under the GCOS6/HVS operating system are being executed in the emulation environment provided by the system of FIGS. 1a and 1b. Therefore, the system of FIGS. 1a and 1b has been initialized to run the emulator 80 and that the application programs 22 are running and have initiating communications with the remote computer system. Since the typical flow of events for a connection oriented transfer using sockets is well known, the networking aspects of establishing such connections will not be described in detail herein. For further information regarding such events, reference may be made to the text entitled "Unix Network Programming" by Richard Stevens, published by Prentice-Hall, copyright 1990.

Figure 2:
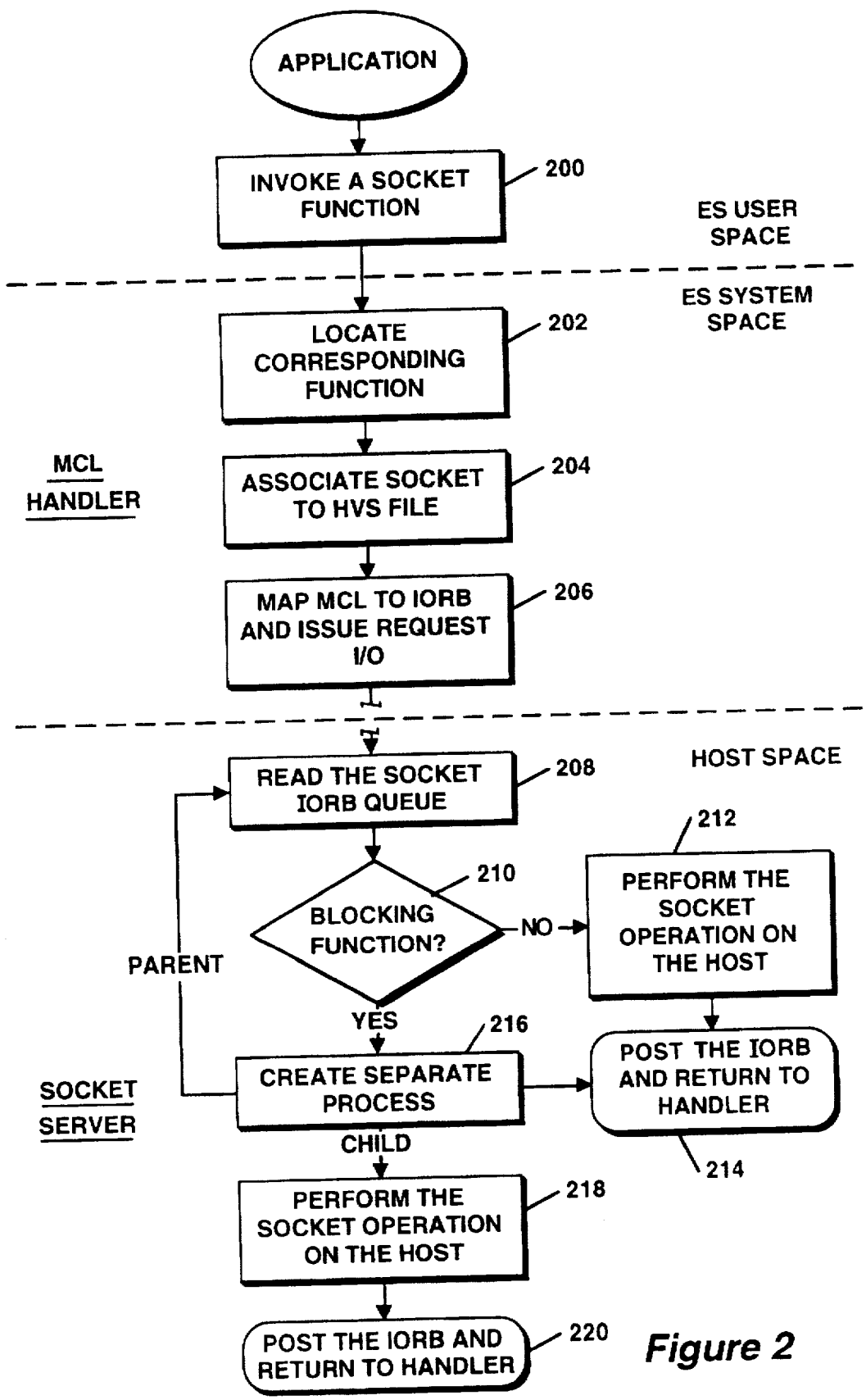

Overall Description-FIG. 2

With reference to FIG. 2, the overall operation of the socket mechanism will now be described. In using the socket interface, an application program invokes a socket function (block 200) which is typically processed as indicated in FIG. 2. More specifically, the application program 22 invokes the socket function by issuing a socket library call which is directed to socket library 286. Depending upon the type of application program, the library call may be issued directly or indirectly via the file management component 282. But whatever the path, the result is that a ES library call is applied as an input to ES socket library 286.

In response to the library 286 call, the ES socket library 286 directs a monitor call to the executive (MCL) handler unit which is in turn directed to the appropriate socket handler routine (block 202). This routine associates the socket to the HVS file (block 204) via the file management unit 282. Next, the socket handler routine maps the ES socket monitor call to an IORB in accordance with the present invention as described herein (block 206) and then issues an request I/O (RQIO) which includes that IORB.

As indicated in FIG. 2, the RQIO request is forwarded to the socket server 98 for processing. The socket server 98 obtains the request by reading an assigned MQI socket queue (block 208) as described herein. It examines the IORB and determines from the device specific word (dvs) containing the actual socket library call if the function/operation specified in the call is a blocking function. That is, it determines if the socket operation will require substantial time to execute so as to prevent socket server 98 from responding to socket function requests issued by other application programs 22 thereby impairing system performance. If it is not a blocking function (block 210) (i.e., will not incur substantial delay), then socket server 98 performs the designated socket operation (block 212) using the host TCP/IP facilities 99, posts the IORB and returns control back to the handler/user application program (block 214).

In the case where the operation is a blocking function, then socket server 98 spawns or creates a separate child process (block 216) to perform the socket operation on the host system (block 218). When the operation is completed by the child process, it posts the IORB and returns control back to the user application program via the socket handler (block 220). The spawned child process remains active/alive for the duration of the socket (i.e. until the socket is closed).

Detailed Description of Socket Functions

Figure 3A:
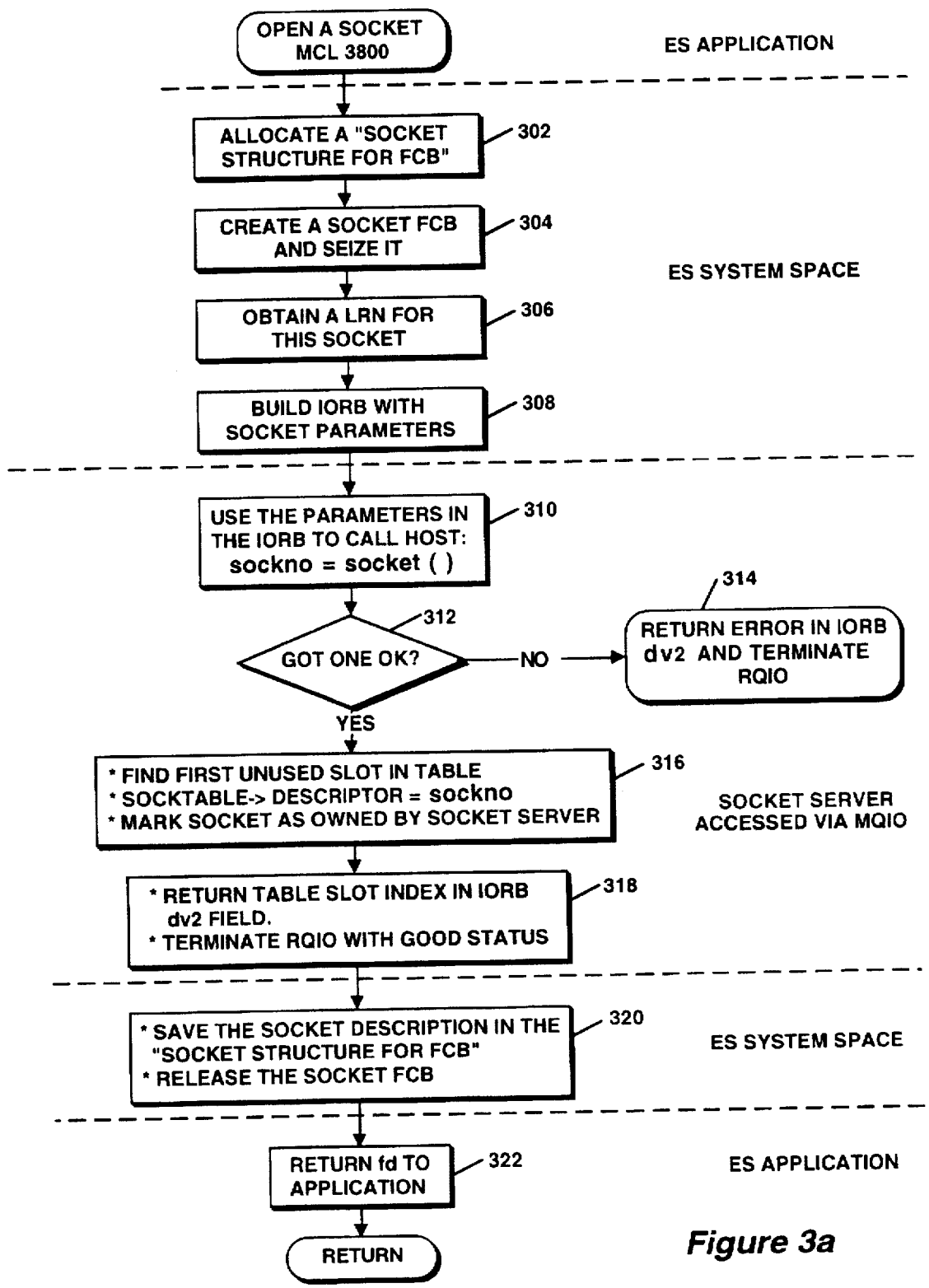

With particular reference to FIGS. 3a through 3c2, the manner in which the socket mechanism of the present invention operates to process different ES socket function system calls will now be described. FIG. 3a illustrates the operations pertaining to the open socket function. As indicated, this operation is initiated in response to an ES monitor call command code of 3800. The socket function is used by either a client or server application program to create or open a socket for establishing an end point for communicating with a remote computer system.

The open socket function has the format: int socket(int Family, int Type, int Protocol). In the system of FIG. 1, the arguments Family, Type and Protocol are set to specify AF_INET SOCK_STREAM or SOCK_RAW or SOCK_DGRM, and 0 respectively.

The socket function is applied as an input to the ES socket library 286 and results in the generation of the MCL 3800 monitor call as in the emulated system. This ensures that application program 22 sees the same interface in FIG. 1 as in the emulated system. The MCL 3800 monitor call is applied to the socket monitor call handler unit 284 which locates the corresponding function as indicated in block 202 of FIG. 2. As in the emulated system, the major function code high order byte value "38" through a first level table branching operation causes control to be passed from the executive MCL handler to the TCP/IP MCL handler of block 284. Using the minor function code low order byte value "00" contained in the MCL 3800 monitor call, the TCP MCL handler via a second level table branching operation locates the appropriate socket handler routine which in the instant case is "socket".

The socket handler routine performs several operations which are similar to those performed by ES components within the system being emulated. These operations include the operations of blocks 302 through 306 of FIG. 3a. More specifically, the socket handler unit 284 allocates a "socket structure" for a file control block (FCB) data structure, creates the FCB, seizes it and obtains a logical resource number (LRN). These operations are carried out through the file management unit 282 in a conventional manner.

Next, in accordance with the teachings of the present invention, the socket handler routine "maps" the reel to IORB by building the IORB extended structure with the socket parameters/arguments contained in the ES open socket call (block 308). In greater detail, this is done by performing a memory set operation wherein the ES socket function arguments Family, Type and Protocol are placed into specific fields (iorb.so.socket.family, iorb.so.socket-.type and iorb.so.socket.protocol) within the extended portion of the IORB data structure. Also, the socket function code (i.e. open socket) is placed in the device specific word (dvs) of the IORB.

Since this is an open socket function, the socket handler unit 284 first obtains a logical resource number (LRN) for the socket. To do this, socket handler unit 284 issues to EMCU 73, a special ES executive handler monitor call (MCL_SOCK_LRN) containing a command code of hexadecimal 0x3727. The EMCU 73 obtains the socket LRN and resource control table (RCT) entry which is to be used in communicating with main socket server 98. More specifically, an area of shared memory is reserved for a given number of RCT/TCB structure pairs which are dynamically allocated for handling commands and functions. All of the RCTs are linked together onto a free queue. The 3727 monitor call is used to request a socket LRN and removes an RCT/TCB pair from the free queue. Next, the EMCU 73 allocates the socket LRN and RCT for subsequent use by the main socket server 98.

Next, the socket command handler 284 generates the I/O request (RQIO) specifying a CONNECT operation for issuance to the socket server 98. The IORB containing the socket parameters has a number of fields which are initialized to the appropriate values for carrying out the socket operation. This includes having its LRN field set to the extended LRN value previously obtained for the main socket server 98 and its function code to specify the CONNECT, the operation type field set to SOCK_IORB_ID indicating that it belongs to the socket and information to specify the type of socket function to be performed by server 98. More specifically, a "11" socket operation code is included in the device specific word (dvs) of the IORB to specify the create or open socket function.

Since this is the first RQIO monitor call and the RCT entry corresponding to its LRN indicates that no server process has yet been created, the EMCU 73 enqueues the IORB onto the MQI queue section (socket queue) of the dynamic server handler (DSH) 92. In response to the RQIO monitor call, the DSH 92 determines from the IORB that it is associated with a socket operation and that it contains a CONNECT function code.

The DSH 92 takes the required steps to establish a connection between the application program/handler unit 284 component issuing the socket call and the main socket server 98. This involves issuing host system calls to the kernel manager 70 in the form of a fork system call which creates a new host process and an exec system call which invokes the main socket server 98 to be run by the new host process. Also, DSH 92 creates a main socket server and MQI queue pair and establishes a connection to the RCT so that EMCU 73 can enqueue subsequent socket requests to this LRN on the appropriate server queue. Following the creation of main socket server 98, DSH 92 calls the server 98 with a number of required parameters, some of which are used to allocate system shared memory to read/write IORBs, buffers etc. and to attach shared memory for socket table(s).

Creation of Socket Control Table Structure

Figure 4A:
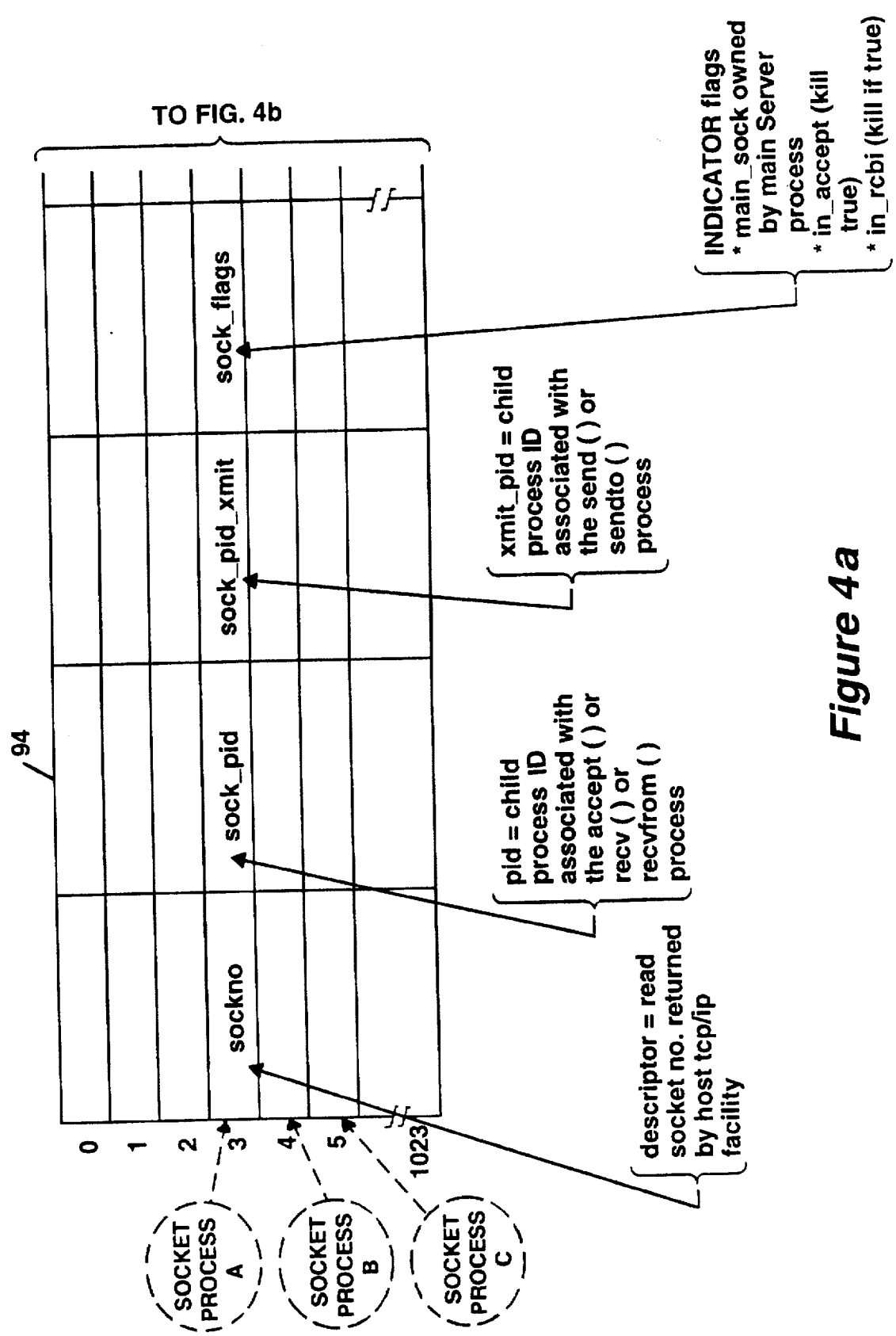
FIGS. 4a and 4b are diagrams illustrating, in greater detail, the socket control table structure of FIG. 1.
Figure 4B:
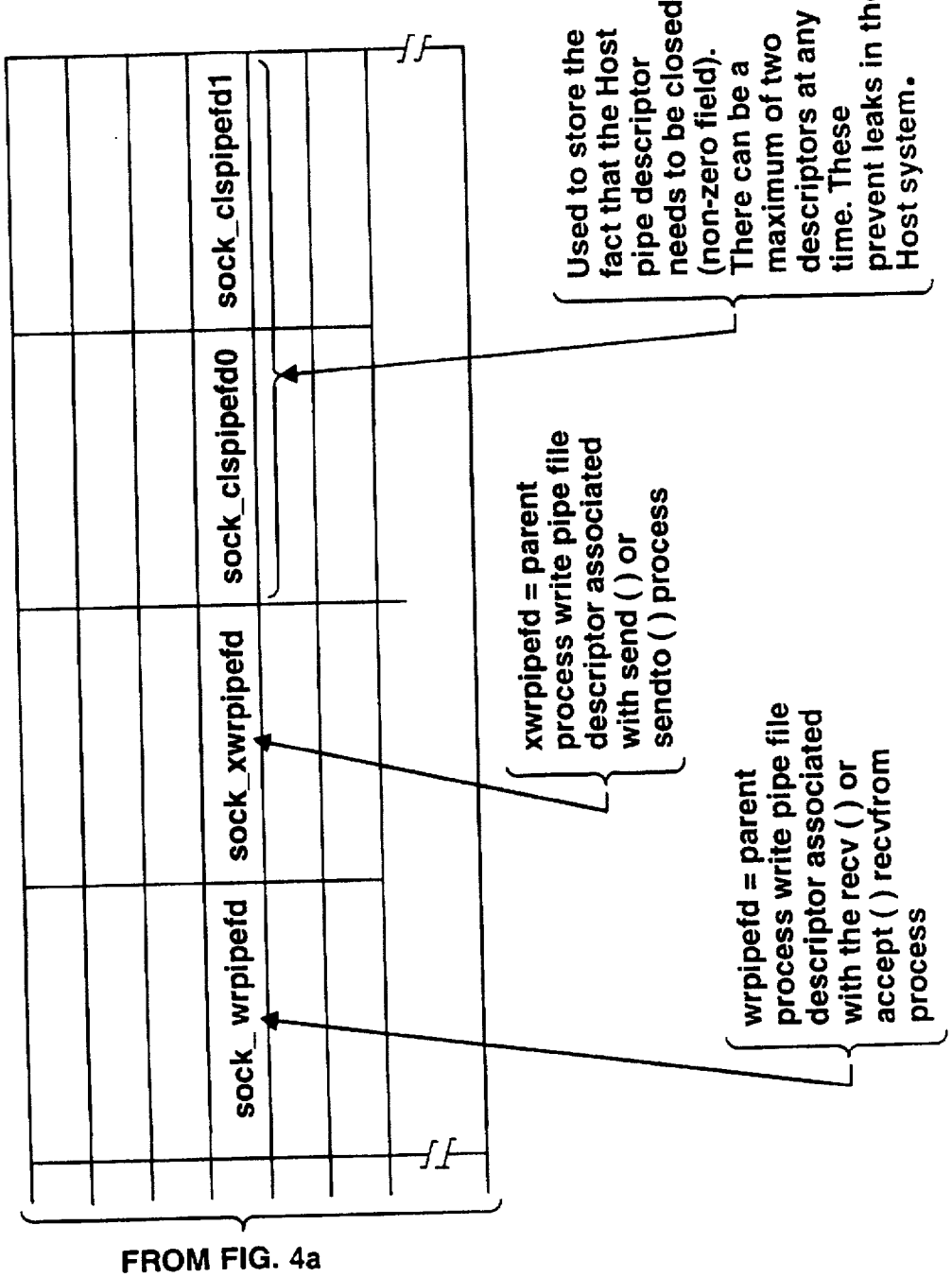

The main socket server 98 creates an addressable socket control table structure 94 in host system space as part of the initialization function. The socket control table structure 94 is shown in detail in FIGS. 4a and 4b. The table 94 is set up to have a size of addressable 1024 slots or locations for storing information pertaining to a number of sockets. The first three address slots of FIGS. 4a and 4b are reserved for convenient storage. Thus, the socket address values start with an index value of "3".

As indicated in FIGS. 4a and 4b, each of the socket locations contains the following fields: sockno, sock_pid, sock_pid_xmit, sock_flags, sock_wrpipefd, sock_xwrpipefd, sock_clspipefd0 and sock_clspipefd1. The sockno field is used to store the actual or real socket number returned by the host tcp/ip facility 99. This is done to prevent issuing duplicate sockets/processes for handling application program requests.

The sock_pid field is used to store the process ID of the child process executing an accept0, recv0 or recvfrom0 socket operation. The sock_pid_xmit field is used to store the process ID of the child process executing a send0 or sendto0 socket operation.

The sockflags field stores a number of indicators which include a main_sock indicator flag whose state indicates the owner of the socket (state=1, socket owned by main server 98, state=0, socket owned by child server process), an in_accept indicator whose state indicates when the socket is in an accept block state and an in_rcvbi indicator whose state denotes when a break-in has been received. These last two indicators specify the state of the socket and enable an orderly shut down of the socket operation (i.e. return/release 13 of ES and host resources) when required such as when the ES file management unit 282 issues an abort group (AGR) command to close the socket.

The next three fields are used for carrying out interprocess communications (IPC) between parent and child processes. The sock_wrpipefd field is used to store the parent process write pipe file descriptor used for communicating with the child process executing the recv0, recvfrom0 or accept0 socket as well as other socket library calls. The sock_ xwrpipefd field is used to store the parent process write pipe file descriptor used for communicating with the child process executing the send0 or sendto0 socket operation. The sock_clspipefd0 & 1 fields are pipe descriptor number information indicating which pipe resources are to be returned to the host system when the socket is closed.

The main socket server 98 initializes the required ES system data structures (e.g. SCB, NCB) and the socket control table pointers (i.e. initial, current and sockmax) used to access socket control table 94 to the appropriate initial values. The server 98 also issues a host kernel call to obtain its process ID.

Then, the main socket server 98 begins a dispatch loop wherein it reads the common socket server's MQI queue. From the queue, it obtains the IORB and then obtains the socket MCL command code from the device specific word (dvs) of the socket extended IORB. The socket server 98 uses the socket MCL command code value to branch to the appropriate routine for carrying out the specified socket function. Since the socket function previously mapped into the IORB specified a socket function (MCL 0x3800), the main server 98 references a routine mcl-socket for creating a communication endpoint. That is, as indicated in block 310 of FIG. 3a, the socket server 98 issues a host socket call (socket0) to host sockets library 97 using the parameters contained in the extended IORB (family, type, protocol).

The host library component 97 invokes the host TCP/IP network protocol stack facility 99 which initiates in a conventional manner, the appropriate series of operations for obtaining the actual socket number from the TCP/IP network facility. As indicated by block 312, the server 98 determines if it received a socket number. When it has received a socket number, it then finds the first unused slot in the socket control table 94 by accessing the table with the socket current table pointer. It then stores in the sockno field of the slot, the descriptor value returned by the TCP/IP stack facility 99 which corresponds to the actual socket number (block 316 of FIG. 3a). It also sets the main_sock indicator flag of the slot for indicating that the socket is owned by the socket server 98.

Since this is the first socket operation, the slot location identified by an address (index) of 3 is the first available slot in socket control table 94. It is this value that is returned to the user application program as the socket while the actual socket descriptor (actual socket number) remains stored in the sockno field of slot 3. As indicated in block 318 of FIG. 3a, server 98 stores the address index value 3 in the dv2 field of the IORB structure and terminates the RQIO by posting the IORB with good status (block 318). If no actual socket was obtained, then socket server 98 terminates the RQIO and returns error status (block 314).

As indicated in block 320 of FIG. 3a, control is returned to the socket handler 284 which saves the socket descriptor (index value of 3) in the socket FCB structure (block 320) and issues a call to file management unit 282 to release the socket FCB data structure. The file management unit 282 in response to the call locates the socket FCB, marks it not busy and decrements the FCB usage count by one and performs any other operations required for freeing up the FCB structure. As indicated in block 322, the socket descriptor index value of 3 is returned to the user application program. This completes the processing of the open socket function.

Accept Function-FIGS. 3b1 and 3b2

FIGS. 3b1 and 3b2 illustrate the series of operations performed by the socket mechanism of the present invention in processing an accept function. As well known in the art, the accept function is used by a server application program for accepting a connection on a socket and creating a new socket. The accept function of the preferred embodiment has the format:

include <socket.h> int accept (Sd, Name, Namelen)

int Sd;

struct sockaddr *Name;

int *Namelen.

Name is a result parameter that is filled in with the address of the connecting entity, as known to the communications layer and Namelen is a value result parameter which on return contains the actual length in bytes of the address returned. The argument/parameter Sd is a socket that has been created with the previously discussed socket function, bound to an address by a bind function, and is listening for connections after a listen function.

The accept function takes the first connection request on the queue of pending connection requests, creates a new socket with the same properties of Sd and allocates a new socket descriptor for the socket. If there are no connection requests pending on the queue, this function blocks the caller application until one arrives. The application program uses the accepted socket to read and write data to and from the socket which connected to this socket and is not used to accept more connections. The original socket Sd remains open for accepting further connection requests.

As indicated in FIG. 3b1, the application program 22 applies the accept function as an input to the ES socket library 286 and results in the generation of the MCL 3801 monitor call as in the emulated system. The MCL 3801 monitor call is applied to the socket monitor call handler unit 284 which locates the corresponding function. In the same manner described above, the MCL 3801 value is used to locate the appropriate socket handler routine which in this case is "accept".

As indicated in FIG. 3b1, the accept socket handler routine performs the operations of blocks 332 through 338 which associate the required sockets to the HVS file. More specifically, the accept handler routine finds the socket FCB, increments the socket FCB reference and usage counts and gets the socket descriptor (block 332). Also, the accept handler routine creates another socket FCB with the same properties as the pending socket and allocates a socket structure for the FCB (blocks 334 and 336). These operations are carried out through the file management unit 282 in a conventional manner.

As indicated in block 338, in accordance with the teachings of the present invention, the accept handler routine maps the mcl to IORB by building the IORB extended structure with the accept parameters contained in the accept socket call (block 338). In greater detail, this is done by performing a memory set operation wherein the accept function arguments are placed into specific fields (iorb. so.accept.newlrn) within the extended portion of the IORB data structure. Also, information is included to identify that the IORB data structure belongs to a socket and to specify the type of socket function to be performed by server 98. More specifically, a "1" function code is included in the IORB data structure to specify that the socket function is an accept socket function.

When building of the IORB data structure is completed, the accept handler routine generates a RQIO request specifying a WRITE operation for issuance to socket server 98.

The IORB containing the socket accept parameters has a number of fields which are initialized to the appropriate values in the same manner as described above for carrying out the accept operation. The RQIO request is issued to EMCU 73 which after determining from the LRN value that the socket server process has been created, enqueues the IORB onto the socket server MQI queue for processing.

The socket server 98 process upon receipt of the request IO and upon determining that it is an accept operation, performs the series of operations in block 340 of FIG. 3b1. That is, first, the socket server creates interprocess communications (IPC) channel with the later spawned child process 96 by issuing a pipe system call (pipe(pipefd) to the kernel 70. The kernel 70 opens up a PIPE and returns read and write file descriptors to communicate with the later spawned child process.

In accordance with the teachings of the present invention, since the accept socket operation requested requires a substantial amount of time to complete, the socket server 98 spawns child process 96 to handle the operations for processing the accept function so as not to tie up or prevent (block) the socket server 98 from responding to other application IORB socket requests. This is done by the server process 98 issuing a standard fork system call (fork0)to the kernel 70 which creates the new process which is a logical copy of the parent server process except that the parent's return value from the fork is the process ID of the child process and the child's return value is "0".

As indicated by block 342 of FIG. 3b1, the parent socket server process 98 returns to process the next incoming socket IORB. The child process 96 begins initial processing by executing the operations of block 344. As indicated, the child process 96 first locates the slot entry (i.e. index of 3) in the socket control table 94 for the file descriptor provided as an argument by the IORB and stores the child process in the sock_pid field of the entry for subsequent proper closing of the socket. Also, the child process 96 marks the socket as being in the accept blocked state by setting the in_accept indicator flag to the appropriate state. This enables the server to break-in and stop the operation.

As indicated by block 346, the child process 96 generates a system call to the host sockets library 97 using the previously assigned socket number 5 (i.e., ns=accept (realsock, peer, (int*)intp) for obtaining a new socket for the incoming socket connection. This initiates the appropriate series of operations for obtaining an actual socket number.

The child process 96 loops waiting for the return of the actual socket number from the TCP/IP stack facility 99. If there is an error, the result is that an error is entered into the device status word of the IORB data structure and the RQIO operation is terminated (block 350). Assuming that there was no error, the child process 96 performs the series of operations of block 352. As indicated, the child process 96 resets the state of the in_accept indicator flag in the third slot of the socket control table 94 corresponding to index value of 3 in addition to saving the child process ID (pid) in the sock_pid field of that slot.

Next, the child process 96 finds the next unused slot in the socket control table 94 which corresponds to the slot location having an index of 4 by accessing the table with the socket current pointer value after being incremented by one. It then stores in the sockno field of the slot, the descriptor value returned by the TCP/IP stack facility 99 which corresponds to the actual socket number (e.g. 100). It also sets/verifies that the state of the main_sock indicator (i.e. "0") designates that the socket is owned by the child process. Also, it saves the child process ID in the sock_pid field of the slot having the index of 4. At this point, there are two slots which contain the pid of the child process 96. It will be noted that while the child process started with the slot having index of 3 in socket control table 94, it now is operating with the slot having an index of 4. While this example uses sequentially numbered slots, it will be appreciated that the slot to which the child process 96 sequences may be any slot within the socket control table 94 which corresponds to the next available slot location.

As indicated by block 352 of FIG. 3b2, the child process 96 stores previously obtained pipe descriptor value into the sock_wrpipefd field of the slot having an index of 4 for communicating between the child process 96 and server process 98 as required for processing subsequently issued socket commands. As indicated by block 354, the child process 96 next stores the address index value 4 which corresponds to the new socket table descriptor into the dv2 field of the IORB status word. It also terminates the RQIO operation by posting/returning a good status indication.

As indicated in block 356 of FIG. 3b2, the child process 96 enters a socket services loop and waits for further commands to be received via the IPC which involve the new socket. As a consequence of terminating the RQIO operation, control is passed back to the socket handler which carries out the operations of blocks 358 through 364 which completes the accept operation. As indicated, block 358 involves the allocation of an LRN for the accept operation. As discussed above, to do this the socket handler unit 284 issues to EMCU 73, a special ES executive monitor call (MCL_SOCK_LRN) containing a command code of 0x3727. The EMCU 73 obtains the socket LRN and resource control table (RCT) entry which is used in communicating with main socket server 98 in the manner described above. Next, the socket handler performs a series of operations which results in issuing another RQIO request to perform an accept_confirm operation (block 362) for registering the new socket number corresponding the index of 4 and the RCT associated therewith. These operations include building the IORB involving taking the new socket value sockfd, placing it into the field of the IORB (iorb.so.accept.sockfd) and then generating the RQIO specifying a CONNECT including the IORB containing a socket function code specifying an accept_confirm operation.

The RQIO request is issued to the EMCU 73 which carries out the required operations for registering the new socket number in the RCT. When the accept_confirm IORB is completed, the socket handler also saves the socket descriptor which is associated with the new LRN and releases the socket FCB through the file management unit 282 in the manner previously described (block 364). The socket descriptor is returned to the application program 22 which is now able to proceed with its operation.

FIGS. 3c1 and 3c2

FIGS. 3c1 and 3c2 illustrate the series of operations performed by the socket mechanism of the present invention in processing a socket receive function/system call issued by an ES application program. The receive function is used to receive data from another socket. The receive (recv) function of the preferred embodiment has the format:

include <socket.h> int recv (Sd, Buf, Len, Flags)

int Sd void *Buf;

int Len, Flags.

Sd is a socket descriptor that has been created with the socket function. Buf is a pointer to buffer, Len is the number of bytes to receive and Flags indicates optional information. The receive function attempts to read Len bytes from the associated socket into the buffer pointed to by Buf. If no messages are available at the socket, the receive function waits for a message to arrive.

As indicated in FIG. 3c1, the application program 22 applies the receive function as an input to the ES socket library 286 and results in the generation of either an MCL380a or MCL3808 monitor call as in the emulated system. The monitor call MCL380a is generated for a recv0 function for receiving a message from a socket while monitor call MCL3808 is generated for a recvfrom0 function which is also used to receive data from another socket whose destination may be specified rather than being implicitly specified by the connection as in the case of the recv0 function. It will be assumed that the monitor call generated is for the recv0 function.

The MCL380a monitor call is applied to the socket monitor call handler unit 284 which locates the corresponding function. That is, in the same manner described above, the MCL380a value is used to locate the appropriate socket handler routine which in this case is "recv". As indicated in blocks 380 and 382 of FIG. 3c1, the recv handler routine finds the socket FCB, increments the socket FCB and usage counts and gets the socket descriptor (block 380). These operations are carried out through the file management unit 282 in a conventional manner.

As indicated in block 382, the reev handler routine builds the IORB extended data structure with the recv parameters contained in the recv socket system call. In greater detail, this is done by performing a memory set operation wherein the recv function arguments are placed into specific fields (iorb. so.data.flags) within the extended portion of the IORB data structure. Also, information is included in the IORB identifying that it belongs to a socket and specifying the type of socket function to be performed by server 98. More specifically, a "0x0f" is included in the IORB data structure to specify the socket function as a recv socket function.

When the building of the IORB data structure is completed, the recv handler routine generates a RQIO request specifying a READ operation for issuance to socket server 98. The IORB containing the socket recv parameters has a number of fields which are initialized to the appropriate values in the same manner as described above for carrying out the recv operation. The RQIO request is issued to EMCU 73 which after determining from the LRN value that the socket server process has been created, enqueues the IORB onto the socket server MQI queue for processing.

The socket server process 98 upon receipt of the request I/O performs the operations of block 384. That is, it translates the HVS address arguments from the ES system space into host space as required. Using the IORB socket descriptor index value, the server process 98 locates the socket control table slot specified by that socket descriptor. The socket server process 98 then determines if a child process exists for the socket (block 386) by examining the indicator flag main__sock of the slot. If the sock__pid and main__sock indicator flag are set to values indicating that a child process already exists, then the server process 98 performs the operations of block 388. This involves obtaining the IPC pipe descriptor stored in the sock__wrpipefd field of the slot identified by the index value, setting up a message buffer for the operation and sending a message to the child process via the IPC pipe. Also, the server process 98 returns to process the next available IORB request.

If the sock__pid equals the child pid or "0" and main__ indicator flag is set to a value indicating that no child process exists, then the socket server process 98 performs the operations of block 390. That is, the socket server process 98 creates an interprocess communications (IPC) channel for use with the later spawned child process by issuing a pipe system call (pipe(pipefd)) to the kernel 70. The kernel 70 opens up a PIPE and returns read and write file descriptors to communicate with the child process.

In accordance with the teachings of the present invention, since the requested socket recv operation requires substantial time to complete, the socket server 98 spawns the child process to handle the operations for processing the receive function so as not to tie up or block socket server 98 from responding to other socket requests (block 392). The socket server process 98 then returns to process the next available IORB request.

Next, the spawned child process enters a socket receive routine (sorecv) which reads the newly requested socket operation (message) contained in the IPC pipe (block 394) using read file descriptor pipefd[0]. It checks for the presence of an ioctl command specifying a break-in. Assuming that the IPC pipe contains no ioctl command, the child process issues a socket receive library call to the host system. That is, the child process issues the socket receive (recv0) call to the host socket library (block 402) which contains the actual socket number obtained from socket control table 94.

Next, the child process enters a receive loop wherein it determines if the receive is completed at which time it sends back the data to the ES application and if the data was correctly received (block 404). If it was, the child process terminates the receive RQIO and posts the IORB with good status (block 406). As indicated in FIG. 3c2, the child process following the completion of the first receive again performs another read PIPE operation and processes the next receive request. Thus, the child process continues to handle receive requests on that socket until the socket is closed. Accordingly, there may be a series of receive socket requests issued before the child process receives a ioctl command specifying a break-in. If the child process receives such a command, it performs the operations of blocks 398 and 400. It terminates the receive socket operation taking place at that time according to the state of the in__rcbi indicator in the flags field of the socket control table slot associated with the socket. It then terminates the RQIO request and posts good status in the IORB (block 398).

From the above, it is seen that the socket mechanism of the present invention performs an ES socket library receive function by spawning a child process which prevents blocking socket server process 98. Through the use of socket control table 94, the socket server process 98 is able to communicate and efficiently manage the operations of the child process which in turn communicates with the host library and TCP/IP network protocol stack facilities.

The other i/o socket functions not described (e.g. bind, listen, close, send, etc.) are processed in a manner similar to the above described socket functions. It will be appreciated that the non-blocking bind and listen socket functions typically are processed by server process 98 since they do not require a substantial amount of time to process. It will be appreciated that a child process can also execute bind or listen socket functions (i.e., in the case of an accept). The send socket function similar to the receive function requires a substantial amount of time and therefore processed by a spawned child process to allow the server 98 process socket library calls received from other application programs.

Thus, as graphically indicated in FIGS. 4a and 4b, there may be a plurality of child processes being concurrently managed by the server 98 issuing socket library calls to the host networking facilities thereby enabling the socket mechanism of the present invention to efficiently service a plurality of application programs. Thus, independent of the type of socket function being performed by a particular emulated system application program being executed, the socket mechanism of the present invention processes socket library calls in an efficient manner.

For further more specific details regarding the implementation of the socket mechanism of the present invention, reference may be made to the source listings contained in the attached appendix which include the following items: Main Socket Server Component; Socket Handler Component; Socket Control Table Structure; Socket Call and IORB Related Data Functions; and Socket Control and Related Data Structures.

It will be apparent to those skilled in the art that many changes may be made to the preferred embodiment of the present invention. For example, the present invention is not limited to the formatting of particular calls or data structures.

While in accordance with the provisions and statutes there has been illustrated and described the best form of the invention, certain changes may be made without departing from the spirit of the invention as set forth in the appended claims and that in some cases, certain features of the invention may be used to advantage without a corresponding use of other features.

-37-

ATTACHED APPENDIX

This Appendix includes source listings which are subject to copyright protection. The copyright owner, Bull HN Information Systems Inc., has no objection to the facsimile reproduction of any one of the patent disclosures, as it appears in the Patent and Trademark Office patent files or records, but otherwise reserves all copyrights in such listings whatsoever.

Socket Mechanism Components and Associated Data Structures:

| | | |
|---|---|---|
| I. | Main Socket Server Component (sock_main.c) | Pages 38-84 |
| II. | Socket Handler Component (sockmclc.c) | Pages 85-97 |
| III. | Socket Control Table Structure (ntc_ncb.h) | Page 98 |
| IV. | Socket Call and IORB Related Data Structures (sock_iorb.h) | Pages 99-101 |
| V. | Socket Control and Related Data Structures (sock_head.h) | Pages 102-104 |

-38-

I. MAIN SOCKET COMPONENT (sock_main.c)

```c
define RCVBRKINST 0x1d11 extern struct MSG *Msg;

int        sox_main_pid = 0;/* sock_main's current pid */
int        sock_init = 0;   /* Socket code initialized, if non-zero */
struct sock_table *stableptr = 0;  /* ->tbl of Open socket Owner's pids */
struct MQI    *super_srvr;
struct TTBL   *my_ttbl;
struct LRT    *lrt;

int        accept_breakin = 0;

/* sock_main Parameters:
 *
 * The HVS Socket fd (table Index) is conveyed for each command via the
 * RCT and is stored in rct->status2
 *
 * IORB Input (to Server) Parameters:
 *    rb_ct2    - Link_main Command Codes  (CONNECT, DISCONNECT)
 *    rb_dvs    - Socket MCL function codes, "ACCEPT_CONFIRM"
 *
 * IORB Output (from Server) Parameters:
 *    rb_dv2    - Error Return Code; If good, Must be Zero
 *    rb_cnt    - Receive, Send & Accept Count Values
 *
 * sock_main is called with the following required arguments:
 *          -a NTD_shrm   - NTD Shared Memory Segment to attach.
 *          -l LRT_Ptr    - The System's Logical Resource Table Base ptr
 *          -q MQI_Ptr    - The Super Server's MQI ptr (May not be used!).
 *          -t TTBL_Ptr   - Our (Socket API Server's) T-Table ptr.
 *          -s Shrm_Name  - System Shared Memory Segment to attach.
 *          -w Virt_View  - VM view is User-Only or System-Wide.
 */ void
main(argc, argv)
int        argc;
char       *argv[];
{
   struct IRB    *irb;    /* Common IRB pointer */
   struct XRB    *iorb;   /* Common IORB pointer (Socket Type IORB) */
   struct RCT    *rct;    /* Common RCT pointer */
   int        lrn, fc;

process = SERVER;
```

-39-

```c
/* open syslog for user */
    openlog(get_session_name(), LOG_PID, LOG_LOCAL0);
    setlogmask(LOG_MASK(LOG_ERR)
              | LOG_MASK(LOG_WARNING)
              | LOG_MASK(LOG_NOTICE));
    if (parse_options(argc, argv, &opt) != 0)
    {
        syslog(LOG_ERR, "E1192: SOCK_SVR: Invalid command line options");
        exit(1);
    }
/* Attach the system shared memory to read/write IORBs, Buffers, etc. */
    if ((base = shmat(opt.shmid, (char *) NULL, 0)) == (char *) -1)
    {
        syslog(LOG_ERR, "E1193: SOCK_SVR: System shmat Failed: %m");
        exit(1);
    }
    init_vm();
    if (intrp_vm())
    {
        syslog(LOG_ERR, "E1194: SOCK_SVR: intrp_vm Failed");
        exit(1);
    }
    srvr_vm();
/* lnk_main issues SIGTERM to this server to clean up */
    sigset(SIGUSR1, socleanup);
/* Attach the NTDX shared memory for Socket Tables. */
    if ((Msg = (struct MSG *) shmat(msg_shmid, (char *) MSG_ADDR, 0)) ==
        (struct MSG *) - 1)
    {
        syslog(LOG_ERR, "E1195: SOCK_SVR: NTD shmat Failed: %m");
        exit(1);
    }
    mcl_sock_init();            /* setup the socket table */
    syslog(LOG_INFO, "I653: SOCK_SVR enabled");
    while (1)
    {
/* Begin Dispatch Loop; Read the Common Socket Server's MQI Queue */
        irb = (struct IRB *) mqi_dqh(&my_ttbl->tch);
        SRVR_RISC_ADDR(iorb, (struct XRB *), irb->i_rb, irb);
        iorb = (struct XRB *) ((char *) iorb - OFF_RB);
        lrn = (int) (iorb->rb_ct2 >> 8);
        if (lrn == 0xfd)
            lrn = (int) iorb->neg.rb_lrx;
        RISC_ADDR(rct, (struct RCT *), (lrt->rt_rct + lrn * 2));
        rct = (struct RCT *) ((char *) rct - OFF_RCT);      /* start of neg portion */
        rct->qaddr.in_progress = 1;
/* Now get the socket MCL Function Code */
        fc = iorb->rb_dvs;
        switch (fc)
        {
        case FC_SOCKT:
            mcl_socket(iorb, irb, rct);
```

-40-

```
            break;
        case FC_ACCPT:
            mcl_accept(iorb, irb, rct);
            break;
        case ACCEPT_CONFIRM:
/* Set the HVS Socket Index into the provided RCT */
            rct->qaddr.status2 = (ushort) iorb->so.rb_accept.accept_index;
            term_iorb(iorb, rct, irb, AOK);
            break;
        case ACCEPT_REJECT:
            mcl_rejectsocket(iorb->so.rb_accept.accept_index);
            term_iorb(iorb, rct, irb, AOK);
            break;
        case FC_BIND:
            mcl_bind(iorb, irb, rct);
            break;
        case FC_CNNCT:
            mcl_connect(iorb, irb, rct);
            break;
        case FC_GTPNM:
            mcl_getpeername(iorb, irb, rct);
            break;
        case FC_GTSNM:
            mcl_getsockname(iorb, irb, rct);
            break;
        case FC_GTSOP:
            mcl_getsockopt(iorb, irb, rct);
            break;
        case FC_LISTN:
            mcl_listen(iorb, irb, rct);
            break;
        case FC_RCVFM:
            mcl_recvfrom(iorb, irb, rct);
            break;
        case FC_RECV:
            mcl_recv(iorb, irb, rct);
            break;
        case FC_SEND:
            mcl_send(iorb, irb, rct);
            break;
        case FC_SNDTO:
            mcl_sendto(iorb, irb, rct);
            break;
        case FC_SHUTD:
            mcl_shutdown(iorb, irb, rct);
            break;
        case FC_SSKOP:
            mcl_setsockopt(iorb, irb, rct);
            break;
        case FC_IOCTL:
            mcl_socketioctl(iorb, irb, rct);
            break;
```

-41-

```
        case FC_CLOSE:
            mcl_sclose(iorb, irb, rct);
            break;
        default:
/* look for system issued iorb without go thru socket library due to
 * abort group function
 */
            if ((fc == FC_RFU) && ((iorb->rb_ct2 & 0xf) == DISC_FUNCTION))
            {
                mcl_sclose(iorb, irb, rct);
                return_rct(rct);
                break;
            }
            rct->qaddr.in_progress = 0;
            term_iorb(iorb, rct, irb, HENOTALLOWED);
            break;
        }
        rct->qaddr.in_progress = 0;
    }                                  /* end of Dispatch Loop */
}

/************
 * term_iorb *
 ************/
void
term_iorb(iorb, rct, irb, reason)
struct XRB    *iorb;
struct RCT    *rct;
struct IRB    *irb;
int           reason;
{
    iorb->rb_dv2 = (ushort) reason;
    io_exit(rct, irb, 0);
}

/*************
 * term_ssrvr *
 *************/
void
term_ssrvr(iorb, irb, reason)
struct XRB    *iorb;
struct IRB    *irb;
int           reason;
{
    iorb->rb_ct2 += FUNC_DELTA;
    iorb->rb_dv2 = (ushort) reason;
    mqi_qot(super_srvr, irb);
} void
return_rct(iorb)
struct XRB    *iorb;
```

-42-

```
{
    struct RCT    *rct;

RISC_ADDR(rct, (struct RCT *),
            (lrt->rt_rct + (ushort) iorb->so.rb_accept.newlrn * 2));
    rct = (struct RCT *) ((char *) rct - OFF_RCT);
    ret_ddcor_rct(rct);
}

/************
 * PipeWrite *
 ************/
static int
PipeWrite(int id, int fd, char *buff, int len)
{
    int        rc;

do
        rc = write(fd, buff, len);
    while ((rc < 0) && (errno == EINTR));
    return (rc);
}                                /* PipeWrite */

/****************
 * parse_options *
 ****************/
int
parse_options(int argc, char **argv, struct EMU_OPTS * opt)
{
    unsigned int    sock_queue;
    int             argtype;
    extern char     *optarg;

while ((argtype = getopt(argc, argv, "Vva:l:q:t:s:w:")) != -1)
    {
        switch (argtype)
        {
        case 'a':           /* NTDX Shared Memory Segment */
            sscanf(optarg, "%d", &msg_shmid);
            break;
        case 'l':           /* System Logical Resource Table Base */
            sscanf(optarg, "%x", &sock_queue);
            lrt = (struct LRT *) sock_queue;
            break;
        case 'q':           /* Super Server's MQI Pointer (hex) */
            sscanf(optarg, "%x", &sock_queue);
            super_srvr = (struct MQI *) sock_queue;
            break;
        case 't':           /* My T-Table Ptr (hex) */
            sscanf(optarg, "%x", &sock_queue);
            my_ttbl = (struct TTBL *) sock_queue;
            break;
```

-43-

```
        case 's':           /* System Shared Memory Segment */
            sscanf(optarg, "%d", &opt->shmid);
            break;
        case 'w':
            sscanf(optarg, "%d", &virt_view);
            break;
        case 'V':
            hvx_verV(argv[0]);
            exit(0);
            break;
        case 'v':
            closelog();
            openlog(get_session_name(), LOG_PID, LOG_LOCAL0);
            setlogmask(LOG_MASK(LOG_ERR)
                    | LOG_MASK(LOG_WARNING)
                    | LOG_MASK(LOG_INFO)
                    | LOG_MASK(LOG_NOTICE)
                    | LOG_MASK(LOG_DEBUG));
            verbose = TRUE;
            break;
        default:
            break;
        }                       /* switch */
    }                           /* while */
    if (argc < 4)
        return (1);
    else
        return (0);
}                               /* parse_options */

/*************
 * mcl_socket *         3800 - Create a communication endpoint.
 *************/
void
mcl_socket(iorb, irb, rct)
struct XRB      *iorb;
struct IRB      *irb;
struct RCT      *rct;
{
    int     s, ts, id, rootid;
    int     sockioc = 1; /* Set ioctl Blocking Mode Off */
    struct socketparm *sp;

/* Check the socket type for RAW */
    sp = (struct socketparm *) & iorb->so.rb_socket;
    do
        s = socket((int) sp->domain, (int) sp->type, (int) sp->protocol);
    while ((s < 0) && (errno == EINTR));
    if (s < 0)
    {
        term_ssrvr(iorb, irb, soconv_err(errno));
        syslog(LOG_ERR, "E1196: Socket call failed %d (%m)", errno);
```

-44-

```
                return;
        }
        else
        {
/* Create the new sockets Table Entry */
                if ((ts = getsockentry(s)) < 0)
                {
                    close(s);
                    term_ssrvr(iorb, irb, HENOTPRIVILEG);
                    syslog(LOG_ERR, "E1197: getsockentry call failed %d",
                            EADDRNOTAVAIL);
                }
                else
                {
/* Mark sock_main's pid as the owner of this new socket */
                    stableptr[ts].sock_flags |= MAIN_SOCK;
/* Count the new socket just opened & Return Good status */
                    rct->qaddr.status2 = iorb->rb_ct2 = (ushort) ts;
                    term_iorb(iorb, rct, irb, AOK);
                    my_ttbl->cnt++;
                }
        }                                       /* else, s >= 0 */
}                                               /* mcl_socket */

/*************
 * mcl_accept *          3801 - Accept a socket connection.
 *************/
void
mcl_accept(iorb, irb, rct)
struct XRB      *iorb;
struct IRB      *irb;
struct RCT      *rct;
{
    int         childpid, pipefd[2];
    struct sockaddr *peer;
    int         ns, ts, realsock, savesock;
    int         *intp, acceptdata;
    char        *cptr;
    extern void cl_accept();

savesock = (int) rct->qaddr.status2;
    SRVR_RISC_ADDR(peer, (struct sockaddr *), iorb->rb_adr, irb);
    acceptdata = sizeof(struct sockaddr_in);
    intp = &acceptdata;
    if (stableptr[savesock].sock_clspipefd0)
    {
            close(stableptr[savesock].sock_clspipefd0);
            stableptr[savesock].sock_clspipefd0 = 0;
    }
    if (stableptr[savesock].sock_clspipefd1)
    {
            close(stableptr[savesock].sock_clspipefd1);
```

-45-

```
            stableptr[savesock].sock_clspipefd1 = 0;
    }
/* Create a pipe for IPC */
    if (pipe(pipefd) < 0)
    {
            syslog(LOG_ERR, "E1198: Socket accept: open pipe failed %d (%m)",
                errno);
            term_iorb(iorb, rct, irb, soconv_err(errno));
            return;
    }
/* Fork a child process to do the blocking accept and handle subsequent
 * socket system calls for a server process */
    if ((childpid = fork()) == 0)
    {
            stableptr[savesock].sock_flags |= IN_ACCEPT;
/* ignoring interrupt signal */
            sigignore(SIGFPE);
            realsock = stableptr[(int) savesock].sockno;
/* save pid for close socket purpose until accept is done */
            stableptr[savesock].sock_pid = getpid();
            sigset(SIGUSR2, cl_accept);
/* child process initial code */
            do
                ns = accept(realsock, peer, (int *) intp);
            while ((ns < 0) && ((errno == EAGAIN) || ((errno == EINTR) &&
                    (!stableptr[savesock].sock_flags & ACCEPT_BREAKIN))));
/* remove save pid */
            stableptr[savesock].sock_pid = 0;
            if (ns < 0)
            {                           /* Set Bad return status */
                stableptr[savesock].sock_flags &= ~IN_ACCEPT;
                stableptr[savesock].sock_clspipefd0 = pipefd[0];
                stableptr[savesock].sock_clspipefd1 = pipefd[1];
                if (stableptr[savesock].sock_flags & ACCEPT_BREAKIN)
                {
                    stableptr[savesock].sock_flags &= ~ACCEPT_BREAKIN;
                    term_iorb(iorb, rct, irb, HSIOCWKSERV);
                }
                else
                {
                    term_iorb(iorb, rct, irb, soconv_err(errno));
                }
                exit(0);
            }                           /* ns < 0 */
            else
            {
              if ((ts = getsockentry(ns)) < 0)
              {
                    stableptr[savesock].sock_flags &= ~IN_ACCEPT;
                    syslog(LOG_ERR, "E1201: accept getsockentry call failed %d",
                        EADDRNOTAVAIL);
                    stableptr[savesock].sock_clspipefd0 = pipefd[0];
```

```
                    stableptr[savesock].sock_clspipefd1 = pipefd[1];
                    term_iorb(iorb, rct, irb, HEADDRNOTAVAIL);
                    exit(0);
            }                           /* ts < 0 */
            else
            {
/* Return the Unique socket index in xtended IORB & size in rb_cnt */
                    iorb->so.rb_accept.accept_index = (ushort) ts;
                    iorb->rb_cnt = accptdata;
            }
        }                               /* ns >= 0 */
/* Remember the pid of the child who owns this new socket */
        stableptr[ts].sock_pid = getpid();
        stableptr[ts].sock_wrpipefd = pipefd[1];
        stableptr[savesock].sock_flags &= ~IN_ACCEPT;
/* Count the new socket just opened & Return Good status */
        my_ttbl->cnt++;
        close(realsock);
        term_iorb(iorb, rct, irb, AOK);
/* call child process ready for socket system calls */
        mcl_sockloop(pipefd[0], ts, ns);
/* never reached */
        exit(0);
    }                                   /* child */
    else
    if (childpid < 0)
    {
        syslog(LOG_ERR, "E1202: Socket accept can't fork %d (%m)", errno);
        close(pipefd[1]);
        term_iorb(iorb, rct, irb, soconv_err(errno));
    }                                   /* Parent */
    else
    {
        close(pipefd[0]);
    }                                   /* Parent */
}                                       /* mcl_accept */

/***********
 * mcl_bind *            3802 - Bind a name to a socket.
 ***********/
void
mcl_bind(iorb, irb, rct)
struct XRB     *iorb;
struct IRB     *irb;
struct RCT     *rct;
{
    struct sockaddr_in *sa;
    int         rc, count, sindex, realsock;
    sockmsg     message, *msgptr;
    struct socketparm *sp;

sindex = (int) rct->qaddr.status2;
```

```
SRVR_RISC_ADDR(sa, (struct sockaddr_in *), iorb->rb_adr, irb);
sp = (struct socketparm *) & iorb->so.rb_socket;
if (!(stableptr[sindex].sock_flags & MAIN_SOCK) &&
      stableptr[sindex].sock_wrpipefd)
{
      msgptr = (sockmsg *) & message;
      msgptr->operation = FC_BIND;
      msgptr->myiorb = iorb;
      msgptr->myirb = irb;
      msgptr->myrct = rct;
      PipeWrite(1, stableptr[sindex].sock_wrpipefd, (char *) msgptr,
              sizeof(struct sock_ipc));
      return;
}
else
{
      realsock = stableptr[(int) sindex].sockno;
      sighold(SIGFPE);
      do
         rc = bind(realsock, sa, (int) iorb->rb_rng);
      while ((rc < 0) && (errno == EINTR));
      sigrelse(SIGFPE);
      if (rc < 0)
      {
         term_iorb(iorb, rct, irb, soconv_err(errno));
         syslog(LOG_INFO, "1654: Socket bind call rejected %d (%m)", errno);
         return;
      }                         /* rc < 0 */
      term_iorb(iorb, rct, irb, AOK);
}                               /* flags || !wrpipefd */
}                               /* mclbind */

/**************
* mcl_connect *        3803 - Initiate a Socket Connection.
**************/
void
mcl_connect(iorb, irb, rct)
struct XRB    *iorb;
struct IRB    *irb;
struct RCT    *rct;
{
   struct sockaddr_in *sa;
   int       rc, signo, childpid, realsock, savesock;
   sockmsg   message, *msgptr;

savesock = (int) rct->qaddr.status2;
   SRVR_RISC_ADDR(sa, (struct sockaddr_in *), iorb->rb_adr, irb);
#ifndef HFSI_HP
   sa->sin_len = sizeof(*sa);     /* IBM requires this field be a nonzero */
#endif
   if (!(stableptr[savesock].sock_flags & MAIN_SOCK) &&
        stableptr[savesock].sock_wrpipefd)
```

-48-

```
{
    msgptr = (sockmsg *) & message;
    msgptr->operation = FC_CNNCT;
    msgptr->myiorb = iorb;
    msgptr->myirb = irb;
    msgptr->myrct = rct;
    rc = PipeWrite(2, stableptr[savesock].sock_wrpipefd, (char *) msgptr,
            sizeof(struct sock_ipc));
    if (rc < 0)
    {
      term_iorb(iorb, rct, irb, EPIPE);
      syslog(LOG_ERR,
            "E1203: Socket connect failed writing pipe %d (%m)", errno);
    }
    return;
}
realsock = stableptr[(int) savesock].sockno;
do
    rc = connect(realsock, sa, (int) iorb->rb_rng);
while ((rc < 0) && (errno == EINTR));
if (rc < 0)
{                               /* Set Bad return status */
    term_iorb(iorb, rct, irb, soconv_err(errno));
    syslog(LOG_ERR,
          "E1204: Socket connect call failed %d (%m)", errno);
}
else
{                               /* Set Good return status */
    term_iorb(iorb, rct, irb, AOK);
}
}                               /* mcl_connect */

/******************
 * mcl_getpeername *    3804 - Get peer process name.
 ******************/
void
mcl_getpeername(iorb, irb, rct)
struct XRB    *iorb;
struct IRB    *irb;
struct RCT    *rct;
{
   sockmsg     message, *msgptr;
   struct sockaddr *sp;
   int         rc, sindex, realsock, addrlen;

sindex = (int) rct->qaddr.status2;
   realsock = stableptr[(int) sindex].sockno;
   if (stableptr[sindex].sock_flags & MAIN_SOCK)
   {
        addrlen = iorb->so.rb_data.len;
        do
           rc = getpeername(realsock,
```

-49-

```
                                (struct sockaddr *) & iorb->so.rb_data.sockaddr,
                                (int *) &addrlen);
            while ((rc < 0) && (errno == EINTR));
            if (rc < 0)
            {
                term_iorb(iorb, rct, irb, soconv_err(errno));
                syslog(LOG_ERR, "E1205: getpeername failed %d (%m)", errno);
                return;
            }
            iorb->rb_cnt = (ushort) addrlen;
            term_iorb(iorb, rct, irb, AOK);
    }                                       /* MAIN_SOCK flags */
    else
    {                                       /* Socket belongs to one of our kids, have
                                             * the kid do it */
        msgptr = (sockmsg *) & message;
        msgptr->operation = FC_GTPNM;
        msgptr->myiorb = iorb;
        msgptr->myirb = irb;
        msgptr->myrct = rct;
        if (!stableptr[sindex].sock_wrpipefd ||
            PipeWrite(3, stableptr[sindex].sock_wrpipefd, (char *) msgptr,
                    sizeof(struct sock_ipc)) < 0)
        {
            syslog(LOG_ERR,
                    "E1206: getpeername failed writing pipe %d (%m)",
                    errno);
        }
    }                                       /* ! MAIN_SOCK flags */
}                                           /* mcl_getpeername */

/******************
 * mcl_getsockname *     3805 - Get the name of the socket.
 ******************/
void
mcl_getsockname(iorb, irb, rct)
struct XRB      *iorb;
struct IRB      *irb;
struct RCT      *rct;
{
    sockmsg         message, *msgptr;
    struct acceptparm *gp;
    struct sockaddr *sp;
    int             rc, sindex, realsock, addrlen;

sindex = (int) rct->qaddr.status2;
    realsock = stableptr[sindex].sockno;
    if (stableptr[sindex].sock_flags & MAIN_SOCK)
    {
            addrlen = iorb->so.rb_data.len;
            do
                rc = getsockname(realsock, (struct sockaddr *) & iorb->so.rb_data.sockaddr,
```

-50-

```
                        (int *) &addrlen);
            while ((rc < 0) && (errno == EINTR));
            if (rc < 0)
            {
               term_iorb(iorb, rct, irb, soconv_err(errno));
               syslog(LOG_ERR, "E1207: getsockname call failed %d (%m)",
                      errno);
               return;
            }
            iorb->rb_cnt = (ushort) addrlen;
            term_iorb(iorb, rct, irb, AOK);
      }                          /* MAIN_SOCK flags */
      else
      {                          /* Socket belongs to one of our kids, have
                                  * the kid do it */
         msgptr = (sockmsg *) & message;
         msgptr->operation = FC_GTSNM;
         msgptr->myiorb = iorb;
         msgptr->myirb = irb;
         msgptr->myrct = rct;
         if (!stableptr[sindex].sock_wrpipefd ||
             PipeWrite(4, stableptr[sindex].sock_wrpipefd, (char *) msgptr,
                    sizeof(struct sock_ipc)) < 0)
         {
            syslog(LOG_ERR,
                   "E1208: getsockname failed writing pipe %d (%m)", errno);
         }
      }                          /* | MAIN_SOCK flags */
}                                /* mcl_getsockname */

/*****************
 * mcl_getsockopt *     3806 - Get the socket Options.
 *****************/
void
mcl_getsockopt(iorb, irb, rct)
struct XRB    *iorb;
struct IRB    *irb;
struct RCT    *rct;
{
   sockmsg     message, *msgptr;
   int         rc, level, option, sindex, realsock;
   ushort      *goptp;
   struct sockoptparm *gop;
   struct linger   linger, *lingerp, *lingp;

sindex = (int) rct->qaddr.status2;
   realsock = stableptr[sindex].sockno;
   if (stableptr[sindex].sock_flags & MAIN_SOCK)
   {
         rc = sockgetopt(realsock, iorb, irb);
         if (rc == 0)
            term_iorb(iorb, rct, irb, AOK);
```

-51-

```
        else
        if (rc < 0)
           term_iorb(iorb, rct, irb, soconv_err(errno));
        else
           term_iorb(iorb, rct, irb, soconv_err(rc));
        return;
   }                              /* MAIN_SOCK flags */
   else
   {                              /* Socket belongs to one of our kids, have
                                   * the kid do it */
      msgptr = (sockmsg *) & message;
      msgptr->operation = FC_GTSOP;
      msgptr->myiorb = iorb;
      msgptr->myirb = irb;
      msgptr->myrct = rct;
      if (!stableptr[sindex].sock_wrpipefd ||
         PipeWrite(5, stableptr[sindex].sock_wrpipefd, (char *) msgptr,
                  sizeof(struct sock_ipc)) < 0)
      {
        syslog(LOG_ERR,
                 "E1209: getsockopt failed writing pipe %d (%m)", errno);
      }
   }                              /* ! MAIN_SOCK flags */
}                                 /* mcl_getsockopt */

/*************
 * mcl_listen *           3807 - Listen for a Connection on a socket.
 *************/
void
mcl_listen(iorb, irb, rct)
struct XRB      *iorb;
struct IRB      *irb;
struct RCT      *rct;
{
   sockmsg    message, *msgptr;
   int        rc, sindex, realsock;

sindex = (int) rct->qaddr.status2;
   realsock = stableptr[sindex].sockno;
   if (stableptr[sindex].sock_flags & MAIN_SOCK)
   {
        do
           rc = listen(realsock, (int) iorb->so.rb_listen.backlog);
        while ((rc < 0) && (errno == EINTR));
        if (rc < 0)
        {
           term_iorb(iorb, rct, irb, soconv_err(errno));
           syslog(LOG_ERR, "E1210: Socket listen call failed %d (%m)", errno);
           return;
        }
        term_iorb(iorb, rct, irb, AOK);
   }                              /* MAIN_SOCK flags */
```

```
else
{                                    /* Socket belongs to one of our kids, have
                                      * the kid do it */
    msgptr = (sockmsg *) & message;
    msgptr->operation = FC_LISTN;
    msgptr->myiorb = iorb;
    msgptr->myirb = irb;
    msgptr->myrct = rct;
    if (!stableptr[sindex].sock_wrpipefd ||
       PipeWrite(6, stableptr[sindex].sock_wrpipefd, (char *) msgptr,
              sizeof(struct sock_ipc)) < 0)
    {
      term_iorb(iorb, rct, irb, soconv_err(errno));
      syslog(LOG_ERR, "E1211: Socket listen failed writing pipe %d (%m)",
             errno);
      return;
    }
  }                                  /* | MAIN_SOCK flags */
}                                    /* mcl_listen */

/***************
 * mcl_recvfrom *       3808 - Receive data from the specified socket.
 ***************/
void
mcl_recvfrom(iorb, irb, rct)
struct XRB    *iorb;
struct IRB    *irb;
struct RCT    *rct;
{
    socom_recv(iorb, irb, rct, FC_RCVFM);
}                                    /* mcl_recvfrom */

/***********
 * mcl_recv *         380a - Receive data from a socket.
 ***********/
void
mcl_recv(iorb, irb, rct)
struct XRB    *iorb;
struct IRB    *irb;
struct RCT    *rct;
{
    socom_recv(iorb, irb, rct, FC_RECV);
}                                    /* mcl_recv */

/*************
 * socom_recv *       Common Receive Function
 *************/
void
socom_recv(iorb, irb, rct, type)
struct XRB    *iorb;
struct IRB    *irb;
struct RCT    *rct;
```

```
int        type;
{
    int        childpid, pipefd[2], realsock, savesock;
    struct dataparm *adp;
    sockmsg    message, *msgptr;

savesock = (int) rct->qaddr.status2;
    if ((stableptr[savesock].sock_flags & MAIN_SOCK) &&
        !(stableptr[savesock].sock_pid))
    {                                    /* Create a pipe for IPC */
        if (pipe(pipefd) < 0)
        {
            syslog(LOG_ERR, "E1212: Socket recv open pipe failed %d (%m)",
                errno);
            term_iorb(iorb, rct, irb, soconv_err(errno));
            return;
        }
        stableptr[savesock].sock_wrpipefd = pipefd[1];
    }                                    /* MAIN_SOCK flags */
    if (!(stableptr[savesock].sock_flags & MAIN_SOCK) ||
        ((stableptr[savesock].sock_pid) &&
         (stableptr[savesock].sock_flags & MAIN_SOCK)))
    {
        msgptr = (sockmsg *) & message;
        msgptr->operation = type;
        msgptr->myiorb = iorb;
        msgptr->myirb = irb;
        msgptr->myrct = rct;
        if (!stableptr[savesock].sock_wrpipefd ||
            PipeWrite(7, stableptr[savesock].sock_wrpipefd, (char *) msgptr,
                sizeof(struct sock_ipc)) < 0)
        {
            term_iorb(iorb, rct, irb, EPIPE);
            syslog(LOG_ERR, "E1213: Socket recv failed writing pipe");
            close(pipefd[0]);
            close(pipefd[1]);
        }
        return;
    }                                    /* MAIN_SOCK flags || sock_pid */
    if ((childpid = fork()) == 0)
    {                                    /* Client processes in main must create
                                          * child on first pass for blocking recv
                                          * calls */
        close(pipefd[1]);
        realsock = stableptr[(int) savesock].sockno;
/* ignoring interrupt signal */
        sigignore(SIGFPE);
        stableptr[savesock].sock_pid = getpid();
        sorecv(realsock, pipefd[0], iorb, irb, rct, type);
        if (!(stableptr[savesock].sock_flags & IN_RCVBI))
            recv_loop(pipefd[0], realsock, savesock);
        else
```

```
            {
                stableptr[savesock].sock_flags = 0;
                stableptr[savesock].sock_pid = 0;
                stableptr[savesock].sock_wrpipefd = 0;
                exit(0);
            }
    }                                   /* child */
    else
    if (childpid < 0)
    {
            close(pipefd[0]);
            syslog(LOG_ERR,
                "E1214: Socket recv can't create child process %d (%m)", errno);
            term_iorb(iorb, rct, irb, ECHILD);
    }                                   /* child */
    else
    {                                   /* Parent */
            close(pipefd[0]);
    }
}                                       /* mcl_recv */

/***********
* mcl_send *           380b - Send data to a socket.
***********/
void
mcl_send(iorb, irb, rct)
struct XRB      *iorb;
struct IRB      *irb;
struct RCT      *rct;
{
    socom_send(iorb, irb, rct, FC_SEND);
}                                       /* mcl_send */

/*************
* mcl_sendto *         380c - Send a message to a specified socket.
*************/
void
mcl_sendto(iorb, irb, rct)
struct XRB      *iorb;
struct IRB      *irb;
struct RCT      *rct;
{
    socom_send(iorb, irb, rct, FC_SNDTO);
}                                       /* mcl_sendto */

/*************
* socom_send *         Common Send Routine
*************/
void
socom_send(iorb, irb, rct, type)
struct XRB      *iorb;
struct IRB      *irb;
```

-55-

```
struct RCT    *rct;
int           type;
{
    int       childpid, pipefd[2], realsock, savesock, tolen;
    struct dataparm *rp;
    char      *datap;
    sockmsg   message, *msgptr;
    int       rc;

savesock = (int) rct->qaddr.status2;
    rp = (struct dataparm *) & iorb->so.rb_data;
    SRVR_RISC_ADDR(datap, (char *), iorb->rb_adr, irb);
    if ((stableptr[savesock].sock_flags & MAIN_SOCK) &&
        !(stableptr[savesock].sock_pid_xmit))
    {
/* Create a pipe for IPC */
        if (pipe(pipefd) < 0)
        {
            syslog(LOG_ERR,
                "E1215: Socket send open pipe failed %d (%m)", errno);
            term_iorb(iorb, rct, irb, soconv_err(errno));
            return;
        }
    }                           /* MAIN_SOCK flags && ! sock_pid_xmit */
    if (!(stableptr[savesock].sock_flags & MAIN_SOCK) ||
        (stableptr[savesock].sock_pid_xmit))
    {
        msgptr = (sockmsg *) & message;
        msgptr->operation = type;
        msgptr->myiorb = iorb;
        msgptr->myirb = irb;
        msgptr->myrct = rct;
        rc = -1;
        if (!(stableptr[savesock].sock_flags & MAIN_SOCK) &&
            stableptr[savesock].sock_wrpipefd)
            rc = PipeWrite(8, stableptr[savesock].sock_wrpipefd, (char *) msgptr,
                        sizeof(struct sock_ipc));
        else
        if (stableptr[savesock].sock_xwrpipefd)
            rc = PipeWrite(9, stableptr[savesock].sock_xwrpipefd, (char *) msgptr,
                        sizeof(struct sock_ipc));
        if (rc < 0)
        {
            term_iorb(iorb, rct, irb, EPIPE);
            syslog(LOG_ERR, "E1216: Socket send failed writing pipe %d (%m)",
                errno);
        }                       /* rc < 0 */
        return;
    }                           /* ! MAIN_SOCK flags || sock_pid_xmit */
    else
    {
        if ((childpid = fork()) == 0)
```

-56-

```
{                               /* Client processes in main must create
                                 * child on first pass for blocking send
                                 * calls */
        realsock = stableptr[(int) savesock].sockno;
        close(pipefd[1]);       /* close side this process does not use */
/* ignore clock interrupt signal */
        sigignore(SIGFPE);
        stableptr[savesock].sock_pid_xmit = getpid();
        if (type == FC_SEND)
        {
                do
                   rc = send(realsock, datap, iorb->rb_rng,
                             iorb->so.rb_data.flags);
                while ((rc < 0) && (errno == EINTR));
        }
        else
        {
                tolen = (int) iorb->so.rb_data.len;
                do
                   rc = sendto(realsock, datap, iorb->rb_rng,
                               iorb->so.rb_data.flags,
                               &iorb->so.rb_data.sockaddr, tolen);
                while ((rc < 0) && (errno == EINTR));
        }
        if (rc < 0)
        {                       /* Save our updated return status */
                close(pipefd[1]);
                syslog(LOG_ERR,
                    "E1217: Socket send call failed %d (%m)", errno);
                term_iorb(iorb, rct, irb, soconv_err(errno));
        }
        else
        {
                iorb->rb_cnt = rc;
                term_iorb(iorb, rct, irb, AOK);
        }
        send_loop(pipefd[0], realsock, savesock);
        return;
}                               /* child */
else
if (childpid < 0)
{
        syslog(LOG_ERR,
              "E1218: Socket send can't create a child process");
        term_iorb(iorb, rct, irb, ECHILD);
        close(pipefd[0]);
        close(pipefd[1]);
        return;
}                               /* child */
else
{                               /* Parent */
        stableptr[savesock].sock_xwrpipefd = pipefd[1];
```

```
            close(pipefd[0]);
        }
    }                                   /* MAIN_SOCK flags && ! sock_pid_xmit */
}                                       /* mcl_send */

/***************
 * mcl_shutdown *        380d - Stop data transmission on a socket.
 ***************/
void
mcl_shutdown(iorb, irb, rct)
struct XRB     *iorb;
struct IRB     *irb;
struct RCT     *rct;
{
    struct shutdownparm *lp;
    sockmsg        message, *msgptr;
    int            rc, sindex, realsock;

sindex = (int) rct->qaddr.status2;
    lp = (struct shutdownparm *) & iorb->so.rb_shut;
    if (stableptr[sindex].sock_flags & MAIN_SOCK)
    {
        realsock = stableptr[sindex].sockno;
        do
            rc = shutdown(realsock, (int) lp->how);
        while ((rc < 0) && (errno == EINTR));
        if (rc < 0)
        {
            term_iorb(iorb, rct, irb, soconv_err(errno));
            syslog(LOG_ERR, "E1219: Socket shutdown call failed %d (%m)", errno);
            return;
        }
        term_iorb(iorb, rct, irb, AOK);
    }                                   /* MAIN_SOCK flags */
    else
    {                                   /* Socket belongs to one of our kids, have
                                         * the kid do it */
        msgptr = (sockmsg *) & message;
        msgptr->operation = FC_SHUTD;
        msgptr->myiorb = iorb;
        msgptr->myirb = irb;
        msgptr->myrct = rct;
        if (!stableptr[sindex].sock_wrpipefd ||
            PipeWrite(10, stableptr[sindex].sock_wrpipefd, (char *) msgptr,
                sizeof(struct sock_ipc)) < 0)
        {
            syslog(LOG_ERR,
                "E1220: Socket shutdown failed writing pipe %d (%m)",
                errno);
        }
    }
}                                       /* mcl_shutdown */
```

-58-

```
/*****************
 * mcl_setsockopt *      380f - Set options on a socket.
 *****************/
void
mcl_setsockopt(iorb, irb, rct)
struct XRB    *iorb;
struct IRB    *irb;
struct RCT    *rct;
{
   sockmsg      message, *msgptr;
   int          *soptp, sindex, realsock, rc;
   struct setsockopt *sop;
   struct linger  linger, *lingerp, *lingp;

sindex = (int) rct->qaddr.status2;
   if (stableptr[sindex].sock_flags & MAIN_SOCK)
   {
         realsock = stableptr[sindex].sockno;
         rc = socksetopt(realsock, iorb, irb);
         if (rc == 0)
            term_iorb(iorb, rct, irb, AOK);
         else
         if (rc < 0)
            term_iorb(iorb, rct, irb, soconv_err(errno));
         else
            term_iorb(iorb, rct, irb, soconv_err(rc));
   }                              /* MAIN_SOCK flags */
   else
   {                              /* Socket belongs to one of our kids, have
                                   * the kid do it */
         msgptr = (sockmsg *) & message;
         msgptr->operation = FC_SSKOP;
         msgptr->myiorb = iorb;
         msgptr->myirb = irb;
         msgptr->myrct = rct;
         if (!stableptr[sindex].sock_wrpipefd ||
            PipeWrite(11, stableptr[sindex].sock_wrpipefd, (char *) msgptr,
                     sizeof(struct sock_ipc)) < 0)
         {
            syslog(LOG_ERR, "E1221: setsockopt failed writing pipe %d (%m)",
                     errno);
            return;
         }
   }                              /* ! MAIN_SOCK flags */
}                                 /* mcl_setsockopt */

/*************
 * mcl_sclose *      3810 - Close a socket.
 *************/
void
mcl_sclose(iorb, irb, rct)
```

-59-

```
struct XRB    *iorb;
struct IRB    *irb;
struct RCT    *rct;
{
  sockmsg       message, *msgptr;
  int           rc, sindex, realsock, sigtype;

sindex = (int) rct->qaddr.status2;
  if ((sindex < stableptr[INITIAL].sockno) ||
          (sindex >= stableptr[SOCKMAX].sockno)
          || (stableptr[sindex].sockno == 0))
  {
        syslog(LOG_ERR,
            "E1222: Warning: Socket close with illegal sock descriptor=%d",
                sindex);
        term_iorb(iorb, rct, irb, HENOTSOCK);
        return;
  }
  if (stableptr[sindex].sock_flags & IN_ACCEPT)
  {
        sigtype = SIGUSR2;
        stableptr[sindex].sock_flags |= ACCEPT_BREAKIN;
  }
  else
        sigtype = SIGKILL;
  realsock = stableptr[sindex].sockno;
  if (stableptr[sindex].sock_flags & MAIN_SOCK)
  { if (stableptr[sindex].sock_pid)
        {
          if (kill(stableptr[sindex].sock_pid, sigtype) < 0)
                syslog(LOG_ERR, "E1223: Socket close failed on kill %d (%d) (%m)",
                    errno, sigtype);
          else
          {
                waitpid(stableptr[sindex].sock_pid, (int *) 0, (int) 0);
                stableptr[sindex].sock_pid = 0;
                if (stableptr[sindex].sock_wrpipefd)
                {
                   close(stableptr[sindex].sock_wrpipefd);
                   stableptr[sindex].sock_wrpipefd = 0;
                }
          }
        }                       /* if pid */
        if (stableptr[sindex].sock_pid_xmit)
        {
          if (kill(stableptr[sindex].sock_pid_xmit, sigtype) < 0)
                syslog(LOG_ERR, "E1224: Socket close failed on kill2 %d (%d) (%m)",
                    errno, sigtype);
          else
          {
```

-60-

```c
            waitpid(stableptr[sindex].sock_pid_xmit, (int *) 0, (int) 0);
            stableptr[sindex].sock_pid_xmit = 0;
            if (stableptr[sindex].sock_xwrpipefd)
            {
                close(stableptr[sindex].sock_xwrpipefd);
                stableptr[sindex].sock_xwrpipefd = 0;
            }
        }
    }                                   /* sock_pid_xmit */
    if (stableptr[sindex].sock_clspipefd0)
    {
        close(stableptr[sindex].sock_clspipefd0);
        stableptr[sindex].sock_clspipefd0 = 0;
    }
    if (stableptr[sindex].sock_clspipefd1)
    {
        close(stableptr[sindex].sock_clspipefd1);
        stableptr[sindex].sock_clspipefd1 = 0;
    }
    stableptr[sindex].sock_flags = 0;
    do
        rc = close(realsock);
    while ((rc < 0) && (errno == EINTR));
    if ((rc < 0) && (errno == EBADF))
    {
        term_iorb(iorb, rct, irb, soconv_err(errno));
        syslog(LOG_ERR,
               "E1225: Socket sclose failed (%d (%m)) on Socket %d",
               errno, sindex);
        return;
    }
    else
    {
        stableptr[sindex].sock_wrpipefd = 0;
        stableptr[sindex].sock_pid = 0;
        stableptr[sindex].sock_flags = 0;
        if ((rc = relsockentry(sindex)) < 0)
        {
            term_iorb(iorb, rct, irb, HEADDRNOTAVAIL);
            syslog(LOG_ERR,
                   "E1226: relsockentry failed (%d) on Socket %d",
                   EADDRNOTAVAIL, sindex);
            return;
        }
        my_ttbl->cnt--;
        term_iorb(iorb, rct, irb, AOK);
    }                               /* rc >= 0 || errno != EBADF */
}                                   /* MAIN_SOCK flags */
else
{                                   /* Socket belongs to one of our kids, have
                                     * the kid close it */
    msgptr = (sockmsg *) & message;
```

-61-

```
            msgptr->operation = FC_CLOSE;
            msgptr->myiorb = iorb;
            msgptr->myirb = irb;
            msgptr->myrct = rct;
            if (!stableptr[sindex].sock_wrpipefd ||
                PipeWrite(12, stableptr[sindex].sock_wrpipefd, (char *) msgptr,
                        sizeof(struct sock_ipc)) < 0)
            {
                syslog(LOG_ERR, "E1227: Socket sclose failed writing pipe %d (%m)",
                        errno);
                return;
            }
            waitpid(stableptr[sindex].sock_pid, (int *) 0, (int) 0);
            stableptr[sindex].sock_pid = 0;
            if (stableptr[sindex].sock_wrpipefd)
            {
                close(stableptr[sindex].sock_wrpipefd);
                stableptr[sindex].sock_wrpipefd = 0;
            }
            if (stableptr[sindex].sock_clspipefd0)
            {
                close(stableptr[sindex].sock_clspipefd0);
                stableptr[sindex].sock_clspipefd0 = 0;
            }
            if (stableptr[sindex].sock_clspipefd1)
            {
                close(stableptr[sindex].sock_clspipefd1);
                stableptr[sindex].sock_clspipefd1 = 0;
            }
            stableptr[sindex].sock_flags = 0;
    }                                       /* ! MAIN_SOCK flags */
}                                           /* mcl_sclose */

/*******************
 * mcl_rejectsocket *        reject socket on accept due to running out of lrn
 *******************/
void
mcl_rejectsocket(sindex)
int         sindex;
{
    sockmsg     message, *msgptr;
    int         realsock;

sindex &= 0x0000ffff;
    if ((sindex < stableptr[INITIAL].sockno) ||
            (sindex >= stableptr[SOCKMAX].sockno)
        || (stableptr[sindex].sockno == 0))
    {
        syslog(LOG_ERR,
            "E1349: Warning: Socket reject with illegal sock descriptor=%d",
            sindex);
```

-62-

```
        return;
}
realsock = stableptr[sindex].sockno;
msgptr = (sockmsg *) & message;
msgptr->operation = FC_ABORT;
if (!stableptr[sindex].sock_wrpipefd ||
        PipeWrite(12, stableptr[sindex].sock_wrpipefd, (char *) msgptr,
                sizeof(struct sock_ipc)) < 0)
{
        syslog(LOG_ERR, "E1350: Socket reject failed writing pipe %d (%m)",
            errno);
        return;
}
waitpid(stableptr[sindex].sock_pid, (int *) 0, (int) 0);

}                               /* mcl_rejectsocket */

/******************
* mcl_socketioctl *     3812 - Send an ioctl to a socket.
******************/
void
mcl_socketioctl(iorb, irb, rct)
struct XRB      *iorb;
struct IRB      *irb;
struct RCT      *rct;
{
   struct ioctlparm *iop;
   int          rc, argc, x, sindex;
   sockmsg      message, *msgptr;
   char         *namep;

rc = 0;
   sindex = (int) rct->qaddr.status2;
   iop = (struct ioctlparm *) & iorb->so.rb_ioctl;
   SRVR_RISC_ADDR(namep, (char *), iorb->rb_adr, irb);

if (!(stableptr[sindex].sock_flags & MAIN_SOCK) &&
          (iop->cmd != HSIOCWKRECV) && (iop->cmd != HSIOCGCONNSTAT))
   {
/* send all but 'recv Break-In' to the child to execute */
        msgptr = (sockmsg *) & message;
        msgptr->operation = FC_IOCTL;
        msgptr->myiorb = iorb;
        msgptr->myirb = irb;
        msgptr->myrct = rct;
        if (!stableptr[sindex].sock_wrpipefd ||
            PipeWrite(13, stableptr[sindex].sock_wrpipefd,
                    (char *) msgptr, sizeof(struct sock_ipc)) < 0)
        {
           syslog(LOG_ERR, "E1228: Socket ioctl failed writing pipe %d (%m)",
                errno);
           exit(0);
```

-63-

```
        }
        return;
    }                           /* MAIN_SOCK flags && ! HSIOCWKRECV && !
                                 * HSIOCGCONNSTAT */
/* Otherwise do it in Main */
    switch (iop->cmd)
    {
    case HSIOCSHOSTNAME:
        if ((rc = sethostname(namep, (int) iorb->rb_rng)) < 0)
        {
            syslog(LOG_ERR, "E1229: Socket ioctl sethostname failed %d (%m)",
                    errno);
        }
        break;
    case HSIOCWKSERV:           /* Break-In on Blocked Accept */
        if (stableptr[sindex].sock_flags & IN_ACCEPT)
        {
            if (stableptr[sindex].sock_pid)
            {
                stableptr[sindex].sock_flags |= ACCEPT_BREAKIN;
                if (kill(stableptr[sindex].sock_pid, SIGUSR2) < 0)
                    syslog(LOG_ERR,
                            "E1230: Socket ioctl 1 failed on kill %d (%m)",
                            errno);
                else
                {
                    waitpid(stableptr[sindex].sock_pid, (int *) 0, (int) 0);
                    stableptr[sindex].sock_pid = 0;
                    stableptr[sindex].sock_wrpipefd = 0;
                }
            }                   /* if pid */
            stableptr[sindex].sock_flags &= ~IN_ACCEPT;
            term_iorb(iorb, rct, irb, AOK);
            return;
        }
        else
        {
            term_iorb(iorb, rct, irb, AOK);
            return;
        }
        break;
    case HSIOCWKRECV:           /* Break-In on Blocked Receive */
        if (stableptr[sindex].sock_pid)
        {
            msgptr = (sockmsg *) & message;
            msgptr->operation = FC_IOCTL;
            msgptr->myiorb = iorb;
            msgptr->myirb = irb;
            msgptr->myrct = rct;
            if (!stableptr[sindex].sock_wrpipefd ||
                    PipeWrite(14, stableptr[sindex].sock_wrpipefd,
                        (char *) msgptr, sizeof(struct sock_ipc)) < 0)
```

-64-

```
        {
            syslog(LOG_ERR,
                "E1231: Socket ioctl failed writing pipe %d (%m)",
                errno);
            term_iorb(iorb, rct, iorb, ENXIO);
        }
        return;
    }                              /* sock_pid */
    else
    {
        term_iorb(iorb, rct, iorb, ENXIO);
        return;
    }
    break;
case HSIOCGHOSTNAME:
    if ((rc = gethostname(namep, (int) iorb->rb_rng)) < 0)
    {
        syslog(LOG_ERR,
            "E1232: Socket ioctl gethostname failed %d (%m)", errno);
    }
    break;
default:
    syslog(LOG_ERR,
        "E1233: Socket ioctl: default, type = %d", iop->cmd);
    term_iorb(iorb, rct, irb, HEOPNOTSUPP);
    return;
}                                  /* iop->cmd switch */
if (rc != 0)
{
    term_iorb(iorb, rct, irb, soconv_err(errno));
    return;
}
term_iorb(iorb, rct, irb, AOK);
}                                  /* mcl_socketioctl */

/****************
 * mcl_sock_init *            Initialize the socket related code, etc.
 ****************/
void
mcl_sock_init()
{
    struct HDM    *hdm_base;
    struct SCB    *scb;
    int           x;
    NCBPTR        ncb;
    char          *cptr;

hdm_base = (struct HDM *) sys_r0;
    RISC_ADDR(scb, (struct SCB *), hdm_base->h_scb);
    RISC_ADDR(ncb, (NCBPTR), scb->s_ntdc);
    stableptr = (struct sock_table *) ((char *) Msg + ncb->n_shsize);
    memset((char *) stableptr, 0, (sizeof(struct sock_table) * SOCKSIZE));
```

```
        stableptr[INITIAL].sockno = SOCKMIN;
        stableptr[CURRENT].sockno = SOCKMIN;
        stableptr[SOCKMAX].sockno = SOCKSIZE;
/* Set the sock_main pid */
        sox_main_pid = getpid();
        sock_init = 0xaaaa;
}                               /* mcl_sock_init */

/*****************
* mcl_sockloop *        Socket Services Loop (Executed by each forked child)
*****************/
void
mcl_sockloop(rdpipe, sockindex, mysock)
int        rdpipe, sockindex, mysock;
{
        fd_set        rdeventset, waitset, connset;
        ushort        *soptp, *hisp, boxit;
        int           rc, childpid, mypid, *sockctlp, *intp;
        int           nfound, *ioctldatap;
        int           option, optionlen, count, tolen, addrlen;
        struct sock_ipc *ipcp, ipcbuf;
        struct IRB    *irb;
        struct XRB    *iorb;
        struct RCT    *rct;
        struct sockaddr *peer;
        struct sockaddr_in *sa;
        struct shutdownparm *sdp;
        struct dataparm *rp;
        struct ioctlparm *iop;
        struct listenparm *lop;
        struct sockoptparm *sop;
        char          *datap;
        char          *namep;
        struct timeval timeout;

/* Set-Up the child process before entering the Loop */
/*----------------------------------------------------*/
/* Set mypid descriptor to assigned values */
        mypid = getpid();
/* Set Buffer Pointers */
        ipcp = &ipcbuf;
/* Setup the select file descriptor sets */
        FD_ZERO(&waitset);
        FD_SET(rdpipe, &waitset);
/* SOCKET OPERATIONS LOOP */
/*----------------------------------------------------*/
        while (1)
        {
/* Set up to wait on pipe activity, only */
                memcpy(&rdeventset, &waitset, sizeof(waitset));
                if ((nfound = select(FD_SETSIZE, (void *) &rdeventset, (void *) 0,
                                (void *) 0, (struct timeval *) 0)) < 0)
```

-66-

```
        {
            syslog(LOG_ERR, "E1234: Socket Loop: select error %d (%m)", errno);
            exit(0);
        }
        if (!FD_ISSET(rdpipe, &rdeventset))
            continue;
/* Read the Newly Requested Socket Operation from the Pipe */
        if (read(rdpipe, ipcp, sizeof(struct sock_ipc)) < 0)
        {
            syslog(LOG_ERR,
                    "E1235: Socket Loop: Child pipe read failed (%d (%m))",
                    errno);
            exit(0);
        }
        irb = ipcp->myirb;
        iorb = ipcp->myiorb;
        rct = ipcp->myrct;
        switch ((int) ipcp->operation)      /* Socket Operations Decoder Switch */
        {
        case FC_BIND:
/*************
* mcl_bind *         3802 - Bind a name to a socket.
*************/
/* Non-Blocking Call */
            SRVR_RISC_ADDR(sa, (struct sockaddr_in *), iorb->rb_adr, irb);
            do
                rc = bind(mysock, sa, (int) iorb->rb_rng);
            while ((rc < 0) && (errno == EINTR));
            if (rc < 0)
            {
                term_iorb(iorb, rct, irb, soconv_err(errno));
                syslog(LOG_ERR, "E1236: Socket Loop: bind call failed %d (%m)",
                    errno);
            }                               /* rc < 0 */
            else
            {
                term_iorb(iorb, rct, irb, AOK);
            }
            break;
        case FC_CNNCT:
/*************
* mcl_connect *      3803 - Initiate a Socket Connection.
*************/
/* blocking call */
            SRVR_RISC_ADDR(sa, (struct sockaddr_in *), iorb->rb_adr, irb);
#ifndef HFSI_HP
            sa->sin_len = sizeof(*sa);      /* IBM requires this field be a
                                             * nonzero */
#endif
            do
                rc = connect(mysock, sa, (int) iorb->rb_rng);
            while ((rc < 0) && (errno == EINTR));
```

```
            if (rc < 0)
            {                           /* Save our updated return status */
                    term_iorb(iorb, rct, irb, soconv_err(errno));
                    syslog(LOG_ERR,
                        "E1237: Socket Loop: connect call failed %d (%m)",
                        errno);
            }
            else
            {
                    term_iorb(iorb, rct, irb, AOK);
            }
            break;
        case FC_GTPNM:
/********************
* mcl_getpeername *      3804 - Get peer process name.
********************/
/* Non-Blocking Call */
            addrlen = iorb->so.rb_data.len;
            do
                    rc = getpeername(mysock,
                                (struct sockaddr *) & iorb->so.rb_data.sockaddr,
                                    (int *) &addrlen);
            while ((rc < 0) && (errno == EINTR));
            if (rc < 0)
            {
                    term_iorb(iorb, rct, irb, soconv_err(errno));
                    syslog(LOG_ERR,
                        "E1238: Socket Loop: getpeername call failed %d (%m)",
                        errno);
            }
            else
            {
                    iorb->rb_cnt = (ushort) addrlen;
                    term_iorb(iorb, rct, irb, AOK);
            }
            break;
        case FC_GTSNM:
/********************
* mcl_getsockname *      3805 - Get the name of the socket.
********************/
/* Non-Blocking Call */
            addrlen = iorb->so.rb_data.len;
            do
                    rc = getsockname(mysock,
                                (struct sockaddr *) & iorb->so.rb_data.sockaddr,
                                    (int *) &addrlen);
            while ((rc < 0) && (errno == EINTR));
            if (rc < 0)
            {
                    term_iorb(iorb, rct, irb, soconv_err(errno));
                    syslog(LOG_ERR, "E1239: getsockname call failed %d (%m)",
                        errno);
```

-68-

```
            }
            else
            {
                    iorb->rb_cnt = (ushort) addrlen;
                    term_iorb(iorb, rct, irb, AOK);
            }
            break;
        case FC_GTSOP:
/*****************
* mcl_getsockopt *      3806 - Get the socket Options.
*****************/
/* Non-Blocking Call */
            rc = sockgetopt(mysock, iorb, irb);
            if (rc == 0)
                    term_iorb(iorb, rct, irb, AOK);
            else
                    term_iorb(iorb, rct, irb, soconv_err(rc));
            break;
        case FC_LISTN:
/*************
* mcl_listen *      3807 - Listen for a Connection on a socket.
*************/
/* Non-Blocking Call */
            do
                    rc = listen(mysock, (int) iorb->so.rb_listen.backlog);
            while ((rc < 0) && (errno == EINTR));
            if (rc < 0)
            {
                    term_iorb(iorb, rct, irb, soconv_err(errno));
                    syslog(LOG_ERR,
                        "E1240: Socket Loop: listen call failed %d (%m)", errno);
            }
            else
                    term_iorb(iorb, rct, irb, AOK);
            break;
        case FC_RCVFM:
/***************
* mcl_recvfrom *      3808 - Receive data from the specified socket.
***************/
        case FC_RECV:
/***********
* mcl_recv *      380a - Receive data from a socket.
***********/
/* Blocking Call */
            sorecv(mysock, rdpipe, iorb, irb, rct, ipcp->operation);
            break;
        case FC_SEND:
/***********
* mcl_send *      380b - Send data to a socket.
***********/
        case FC_SNDTO:
/*************
```

-69-

```
* mcl_sendto *        380c - Send a message to a specified socket.
***************/
/* Blocking Call */
        SRVR_RISC_ADDR(datap, (char *), iorb->rb_adr, irb);
        if (ipcp->operation == FC_SEND)
        {
            do
               rc = send(mysock, datap, iorb->rb_rng,
                         iorb->so.rb_data.flags);
            while ((rc < 0) && (errno == EINTR));
        }
        else
        {
            tolen = (int) iorb->so.rb_data.len;
            do
               rc = sendto(mysock, datap, iorb->rb_rng,
                           iorb->so.rb_data.flags,
                           &iorb->so.rb_data.sockaddr,
                           tolen);
            while ((rc < 0) && (errno == EINTR));
        }
        if (rc < 0)
        {                        /* Save our updated return status */
            term_iorb(iorb, rct, irb, soconv_err(errno));
            syslog(LOG_ERR, "E1241: Socket Loop: send call failed %d (%m)", errno);
        }
        else
        {
            iorb->rb_cnt = rc;
            term_iorb(iorb, rct, irb, AOK);
        }
        break;
    case FC_SHUTD:
/****************
* mcl_shutdown *      380d - Stop data transmission on a socket.
****************/
/* Non-Blocking Call */
        sdp = (struct shutdownparm *) & iorb->so.rb_shut;
        do
            rc = shutdown(mysock, (int) sdp->how);
        while ((rc < 0) && (errno == EINTR));
        if (rc < 0)
            term_iorb(iorb, rct, irb, soconv_err(errno));
        else
            term_iorb(iorb, rct, irb, AOK);
        break;
    case FC_SSKOP:
/******************
* mcl_setsockopt *    380f - Set options on a socket.
******************/
/* Non-Blocking Call */
        rc = socksetopt(mysock, iorb, irb);
```

-70-

```
            if (rc == 0)
                    term_iorb(iorb, rct, irb, AOK);
            else
                    term_iorb(iorb, rct, irb, soconv_err(rc));
            break;
         case FC_CLOSE:
/**************
* mcl_sclose *         3810 - Close a socket.
**************/
/* Non-Blocking Call */
            if (((rc = close(mysock)) == -1) && (errno == EBADF))
                    {                   /* Error on Close */
                    term_iorb(iorb, rct, irb, soconv_err(errno));
                    syslog(LOG_ERR,
                        "E1242: Socket Loop: sclose call failed (%d (%m)) on Socket %d",
                        errno, mysock);
                    continue;
                    }
            else
                    {                   /* Successful close done */
                    stableptr[sockindex].sock_flags = 0;
                    stableptr[sockindex].sock_pid = 0;
                    stableptr[sockindex].sock_wrpipefd = 0;
                    if ((rc = relsockentry(sockindex)) < 0)
                       {
                       term_iorb(iorb, rct, irb, HEADDRNOTAVAIL);
                       syslog(LOG_ERR,
                           "E1243: Socket Loop: relsockentry failed (%d) on Socket %d",
                           EADDRNOTAVAIL, sockindex);
                       return;
                       }
                    my_ttbl->cnt--;
                    term_iorb(iorb, rct, irb, AOK);
                    exit(0);
                    }                   /* mysock != -1 || errno != EBADF */
         case FC_IOCTL:
/********************
* mcl_socketioctl *      3812 - Send an ioctl to a socket.
********************/
/* Non-Blocking Call */
            iop = (struct ioctlparm *) & iorb->so.rb_ioctl;
            SRVR_RISC_ADDR(namep, (char *), iorb->rb_adr, irb);
            switch (iop->cmd)
                    {                   /* ioctl type switch */
                    case HSIOCSHOSTNAME:
                       if ((rc = sethostname(namep, (int) iorb->rb_rng)) < 0)
                          {
                          syslog(LOG_ERR,
                              "E1244: Socket Loop: ioctl sethostname failed %d(%m)",
                                  errno);
                          }
                       break;
```

-71-

```
         case HSIOCGHOSTNAME:
             if ((rc = gethostname(namep, (int) iorb->rb_rng)) < 0)
             {
                syslog(LOG_ERR,
                    "E1245: Socket Loop: ioctl gethostname failed %d (%m)", errno);
             }
             break;
         }                          /* iop->cmd switch */
         break;
      case FC_ABORT:                /* abort due to accept reject */
         my_ttbl->cnt--;
         exit(0);
      default:
         syslog(LOG_ERR,
             "E1246: Socket Loop: Non-Supported operation on Socket %d",
             mysock);
         term_iorb(iorb, rct, irb, HEOPNOTSUPP);
/* Currently Non-Supported Socket Monitor Calls are as follows: */
/*
* mcl_accept        FC_ACCPT: 3801 - Accept a socket connection.
*
* mcl_recvmsg       FC_RCVMS: 3809 - Receive a message OOB.
*
* mcl_sendmsg       FC_SNDMS: 380e - Send a message OOB.
*
* mcl_socketpair FC_SCKPR: 3811 - Connect 2 Unnamed Sockets.
*/
      }                             /* Child Socket Operations switch */
   }                                /* while() */
}                                   /* mcl_sockloop */

/*************
* sockgetopt *
*************/
int
sockgetopt(socknum, iorb, irb)
int        socknum;
struct XRB   *iorb;
struct IRB   *irb;
{
   int        rc, optionlen;
   struct sockoptparm *sop;
   char       *option, temp[8];

SRVR_RISC_ADDR(option, (char *), iorb->rb_adr, irb);
   sop = (struct sockoptparm *) & iorb->so.rb_sockopt;
   optionlen = sizeof(int);
   do
         rc = getsockopt(socknum, ((int) sop->level & 0x0000ffff), (int) sop->name, temp,
                (int *) &optionlen);
   while ((rc < 0) && (errno == EINTR));
   if (rc < 0)
```

-72-

```
    {                           /* Error on getsockopt call */
        syslog(LOG_ERR,
            "E1247: sockgetopt: getsockopt failed (%d (%m)) on Socket %d",
            errno, socknum);
        return (rc);
    }
    if (sop->name != SO_LINGER)
    {
        *option++ = temp[2];
        *option++ = temp[3];
        iorb->rb_cnt = (ushort) 2;
    }
    else
    {
        iorb->rb_cnt = (ushort) 4;
        *option++ = temp[2];
        *option++ = temp[3];
        *option++ = temp[6];
        *option++ = temp[7];
    }
    return (0);
}                               /* sockgetopt */

/*************
 * socksetopt *
 *************/
int
socksetopt(socknum, iorb, irb)
int          socknum;
struct XRB   *iorb;
struct IRB   *irb;
{
    int       level, optionlen, lingsz, rc;
    char      *option;
    char      sotemp[8];
    struct sockoptparm *sop;

SRVR_RISC_ADDR(option, (char *), iorb->rb_adr, irb);
    sop = (struct sockoptparm *) & iorb->so.rb_sockopt;
    optionlen = iorb->rb_rng;
    if (sop->name != SO_LINGER)
    {
        sotemp[0] = 0;
        sotemp[1] = 0;
        sotemp[2] = option[0];
        sotemp[3] = option[1];
        optionlen = 4;
    }
    else
    {
        sotemp[0] = 0;
        sotemp[1] = 0;
```

-73-

```
            sotemp[2] = option[0];
            sotemp[3] = option[1];
            sotemp[4] = 0;
            sotemp[5] = 0;
            sotemp[6] = option[2];
            sotemp[7] = option[3];
            optionlen = 8;
    }
    do
            rc = setsockopt(socknum, ((int) sop->level & 0x0000ffff), (int) sop->name,
                            &sotemp[0], optionlen);
    while ((rc < 0) && (errno == EINTR));
    if (rc < 0)
    {                                   /* Error on Close */
            syslog(LOG_ERR,
              "E1248: socksetopt: setsockopt call failed (%d (%m)) on Socket %d",
                    errno, socknum);
            return (errno);
    }
    return (0);                         /* Successful setsockopt done */
}                                       /* socksetopt */

/*********
 * sorecv *
 *********/
void
sorecv(socknum, ipcpipe, iorb, irb, rct, type)
int           socknum, ipcpipe, type;
struct XRB    *iorb;
struct IRB    *irb;
struct RCT    *rct;
{
    int            rc, nfound, fromlen;
    struct ioctlparm *biiop;
    struct sock_ipc  *biipcp, biipcbuf;
    struct timeval   timer;
    struct sockaddr  *from;
    fd_set           rdeventset, readset;
    char             *datap, *ioctldatap;
    int              sindex;
    int              len;
    int              sockioc = 1; /* set ioctl blocking off */ sindex = rct->qaddr.status2;
    FD_ZERO(&readset);
    FD_SET(ipcpipe, &readset);
    FD_SET(socknum, &readset);
    SRVR_RISC_ADDR(datap, (char *), iorb->rb_adr, irb);
/* set socket to nonblocking */
    if (ioctl(socknum, FIONBIO, &sockioc))
    {                                   /* Set socket to Non-Blocking */
            term_iorb(iorb, rct, irb, soconv_err(errno));
```

-74-

```
        syslog(LOG_ERR,
            "E1249: sorecv: Non Blocking socket ioctl call failed %d (%m)",
            errno);
        return;
    }
    sockioc = 0;
    while (1)
    {
        timer.tv_sec = 0;
        timer.tv_usec = 500000;    /* Set Timeout for 1/2 Second */
        memcpy(&rdeventset, &readset, sizeof(readset));
        do
            nfound = select(FD_SETSIZE, (void *) &rdeventset, (void *) 0,
                            (void *) 0, (struct timeval *) & timer);
        while ((nfound < 0) && (errno == EINTR));
        if (nfound < 0)
        {
            syslog(LOG_ERR,
                "E1250: Socket sorecv: select failed %d (%m)", errno);
            continue;
        }
        if (nfound == 0)
        {
            continue;
        }
        if (FD_ISSET(ipcpipe, &rdeventset))
        {                       /* May be a legal read-cancel operation
                                 * from a different task */
            FD_ZERO(&rdeventset);
            biipcp = &biipcbuf;
/* Read the Newly Requested Socket Operation from the Pipe */
            if (read(ipcpipe, biipcp,
                    sizeof(struct sock_ipc)) != sizeof(struct sock_ipc))
            {
                syslog(LOG_ERR,
                    "E1251: Socket sorecv: pipe read for Break-In failed (%d (%m))",
                    errno);
                exit(0);
            }
            if (biipcp->operation == FC_IOCTL)
            {                       /* Check for a Non-Blocking ioctl command
                                     * Call */
                biiop = (struct ioctlparm *) & biipcp->myiorb->so.rb_ioctl;
                stableptr[sindex].sock_flags |= IN_RCVBI;
                if (biiop->cmd == HSIOCWKRECV)
                {
/* return the orginal receive iorb */
                    term_iorb(iorb, rct, irb, AOK);
/* return the aborting iorb */
                    term_iorb(biipcp->myiorb, biipcp->myrct, biipcp->myirb, AOK);
                    syslog(LOG_INFO,
                        "I655: Socket sorecv: recv call Cancelled");
```

```
                }
                else
                {
                    term_iorb(biipcp->myiorb, biipcp->myrct, biipcp->myirb, ENXIO);
                    syslog(LOG_ERR, "E1252: sorecv: recv call failed %x",
                            biiop->cmd);
                }
            }                       /* operation == FC_IOCTL */
            ioctl(socknum, FIONBIO, &sockioc);
            return;
        }                           /* if (FD_ISSET(ipcpipe, &rdeventset)) */
        else
        if (FD_ISSET(socknum, &rdeventset))
        {                           /* Socket is ready to receive */
            FD_ZERO(&rdeventset);
            if (type == FC_RECV)
            {
                do
                    rc = recv(socknum, datap, (int) iorb->rb_rng,
                            (int) iorb->so.rb_data.flags);
                while ((rc < 0) && (errno == EINTR));
            }                       /* type == FC_RECV */
            else
            {
                len = (int) iorb->so.rb_data.len;
                len &= 0x0000ffff;
                do
                    rc = recvfrom(socknum, datap, (int) iorb->rb_rng,
                                (int) iorb->so.rb_data.flags,
                                (int) &iorb->so.rb_data.sockaddr,
                                (int *) &len);
                while ((rc < 0) && (errno == EINTR));
            }
            if ((rc <= 0))
            {                       /* Save updated return status */
                if ((rc < 0) && (errno == EAGAIN))
                {
                    continue;
                }
                else
                {
                    if (errno == EAGAIN)
                    {
                        term_iorb(iorb, rct, irb, HECONNRESET);
                        ioctl(socknum, FIONBIO, &sockioc);
                        return;
                    }
                    else
                    {
                        if (errno == ECONNREFUSED)
                            term_iorb(iorb, rct, irb, 0x1d1b);
                        else
```

-76-

```
                {
                    if (rc == 0)
                    {
                        iorb->rb_cnt = rc;
                        term_iorb(iorb, rct, irb, AOK);
                    }
                    else
                    {
                        syslog(LOG_ERR,
                            "E1253: Socket sorecv: failed %d (%m) rc=%d",
                                errno, rc);
                        term_iorb(iorb, rct, irb, soconv_err(errno));
                    }
                }
                ioctl(socknum, FIONBIO, &sockioc);
                return;
            }
        }                       /* rc == 0 || errno != EAGAIN */
    }                           /* rc <= 0 */
    else
    {
        iorb->rb_cnt = rc;
        term_iorb(iorb, rct, irb, AOK);
        if (ioctl(socknum, FIONBIO, &sockioc) < 0)
        {                       /* Reset socket to Blocking */
            syslog(LOG_ERR,
                "E1254: Socket sorecv: Blocking ioctl failed %d (%m)", errno);
        }
        return;
    }                           /* rc > 0 */
}                               /* if (FD_ISSET(socknum, &rdeventset)) */
else
{                               /* timeout broke us out */
    do
        rc = recv(socknum, datap, (int) iorb->rb_rng,
            (int) iorb->so.rb_data.flags);
    while ((rc < 0) && (errno == EINTR));
    if ((rc == 0) && (errno == EAGAIN))
    {                           /* Save updated return status */
        term_iorb(iorb, rct, irb, HECONNRESET);
        syslog(LOG_ERR,
            "E1255: Socket sorecv: recv Timeout Disconnect");
        ioctl(socknum, FIONBIO, &sockioc);
        return;
    }
}                               /* ! if (FD_ISSET(socknum, &rdeventset)) */
}                               /* while (1) */
}                               /* sorecv */

/************
 * send_loop *
 ************/
```

-77-

```
void
send_loop(rdpipe, socknum, sockindex)
int        rdpipe, socknum, sockindex;
{
   struct sock_ipc *ipcp, ipcbuf;
   struct socksend *rp;
   struct sockaddr *to;
   int        rc, tolen, type;
   char       *datap;
   struct XRB    *iorb;
   struct IRB    *irb;
   struct RCT    *rct;

/* Blocking Call */
   ipcp = &ipcbuf;
   while (1)
   {
/* Read the Newly Requested Socket Operation from the Pipe */
      do
         rc = read(rdpipe, ipcp, sizeof(struct sock_ipc));
      while ((rc < 0) && (errno == EINTR));
      if (rc < 0)
      {
         syslog(LOG_ERR,
            "E1256: Socket Send_loop: Child pipe read failed (%d (%m))",
               errno);
         exit(0);
      }
      iorb = ipcp->myiorb;
      irb = ipcp->myirb;
      rct = ipcp->myrct;
      type = ipcp->operation;
      SRVR_RISC_ADDR(datap, (char *), iorb->rb_adr, irb);
      if (type == FC_SEND)
      {
         do
            rc = send(socknum, datap, (int) iorb->rb_rng,
                  (int) iorb->so.rb_data.flags);
         while ((rc < 0) && (errno == EINTR));
      }
      else
      {
         tolen = (int) iorb->so.rb_data.len;
         do
            rc = sendto(socknum, datap, (int) iorb->rb_rng,
                  (int) iorb->so.rb_data.flags,
                  &iorb->so.rb_data.sockaddr,
                  tolen);
         while ((rc < 0) && (errno == EINTR));
      }
      if (rc < 0)
      {                        /* Save our updated return status */
```

```
            if (errno != EPIPE)
                 syslog(LOG_ERR,
                       "E1257: Send_loop: Socket send call failed %d (%m)",
                        errno);
            term_iorb(iorb, rct, irb, soconv_err(errno));
         }
         else
         {
           iorb->rb_cnt = rc;
           term_iorb(iorb, rct, irb, AOK);
         }
      }                              /* while (1) */
}                                    /* send_loop */

/************
 * recv_loop *
 ************/
void
recv_loop(rdpipe, realsock, sockindex)
int       rdpipe, realsock, sockindex;
{
   struct sock_ipc  *ipcp, ipcbuf;
   struct sockrecv  *rp;
   char             *datap;
   int              rc, type;
   struct XRB       *iorb;
   struct IRB       *irb;
   struct RCT       *rct;

ipcp = &ipcbuf;
   while (1)
   {
/* Read the Newly Requested Socket Operation from the Pipe */
      do
         rc = read(rdpipe, ipcp, sizeof(struct sock_ipc));
      while ((rc < 0) && (errno == EINTR));
      if (rc < 0)
      {
        syslog(LOG_ERR,
              "E1258: Socket Recv_loop: Child pipe read failed (%d (%m))",
                errno);
        exit(0);
      }
      iorb = ipcp->myiorb;
      irb = ipcp->myirb;
      rct = ipcp->myrct;
      type = ipcp->operation;
      if ((ipcp->operation == FC_RECV) || (ipcp->operation == FC_RCVFM))
         sorecv(realsock, rdpipe, iorb, irb, rct, type);
      else
      if (ipcp->operation == FC_IOCTL)
      {
```

-79-

```
            term_iorb(ipcp->myiorb, ipcp->myrct, ipcp->myirb, AOK);
            continue;
        }
        else
        {
            syslog(LOG_ERR,
                    "E1259: Socket recv_loop:illegal cmd in pipe");
        }
    }                                       /* while (1) */
}                                           /* recv_loop */

/************
 * socleanup *
 ************/
void
socleanup()
{
    int     index;
    int     pid, waitstat;

if (stableptr == NULL)
            return;
    sock_init = 0;
    for (index = 3; index < SOCKSIZE; index++)
    {
        if ((pid = stableptr[index].sock_pid))
        {
            kill(pid, SIGKILL);
            do
                    waitstat = waitpid(pid, (int *) 0, 0);
            while ((waitstat == -1) && (errno == EINTR));
            stableptr[index].sock_pid = 0;
        }
        if ((pid = stableptr[index].sock_pid_xmit))
        {
            kill(pid, SIGKILL);
            do
                    waitstat = waitpid(pid, (int *) 0, 0);
            while ((waitstat == -1) && (errno == EINTR));
            stableptr[index].sock_pid_xmit = 0;
        }
        if ((stableptr[index].sockno != 0) &&
            (stableptr[index].sock_flags & MAIN_SOCK))
            close(stableptr[index].sockno);
        if (stableptr[index].sock_wrpipefd)
        {
            close(stableptr[index].sock_wrpipefd);
            stableptr[index].sock_wrpipefd = 0;
        }
        if (stableptr[index].sock_xwrpipefd)
        {
            close(stableptr[index].sock_xwrpipefd);
```

-80-

```
            stableptr[index].sock_xwrpipefd = 0;
         }
         if (stableptr[index].sock_clspipefd0)
         {
            close(stableptr[index].sock_clspipefd0);
            stableptr[index].sock_clspipefd0 = 0;
         }
         if (stableptr[index].sock_clspipefd1)
         {
            close(stableptr[index].sock_clspipefd1);
            stableptr[index].sock_clspipefd1 = 0;
         }
         stableptr[index].sockno = 0;
         stableptr[index].sock_flags = 0;
         syslog(LOG_INFO, "I656: SOCK_SVR:socket cleanup completed.");
         exit(0);
      }                                       /* for index */
   }                                          /* socleanup */

/***************
 * getsockentry *
 ***************/
/* Get an empty entry from the socket control table and return its indexgetsockentry */
int
getsockentry(int realsock)
{
   int      initial, current, sockmax, first;
   initial = stableptr[INITIAL].sockno;
   current = stableptr[CURRENT].sockno;
   sockmax = stableptr[SOCKMAX].sockno;
   if (current != sockmax)
   {
      first = 0;
      while (1)
      {
         for (; (stableptr[current].sockno && (current != sockmax));
                  current++)
            ;
         if ((current == sockmax) && (!first))
         {
            first = 1;
            current = initial;
            continue;
         }
         else
         if ((current == sockmax) && (first))
         {
            return (-1);
         }
         else
         {
            stableptr[CURRENT].sockno = current + 1;
```

```
                    stableptr[current].sockno = realsock;
                    if (!(stableptr[current].sock_flags & IN_ACCEPT))
                    {
                       if (stableptr[current].sock_clspipefd0)
                       {
                            close(stableptr[current].sock_clspipefd0);
                            stableptr[current].sock_clspipefd0 = 0;
                       }
                       if (stableptr[current].sock_clspipefd1)
                       {
                            close(stableptr[current].sock_clspipefd1);
                            stableptr[current].sock_clspipefd1 = 0;
                       }
                    }
                    return (current);
                }
            }                        /* while (1) */
        }                            /* current != sockmax */
    else                             /* current equal to max */
    {
        current = initial;
        for (; (stableptr[current].sockno && (current != sockmax)); current++)
            ;
        if (current == sockmax)
            return (-1);
        else
        {
            stableptr[CURRENT].sockno = current + 1;
            stableptr[current].sockno = realsock;
            if (!(stableptr[current].sock_flags & IN_ACCEPT))
            {
                if (stableptr[current].sock_clspipefd0)
                {
                   close(stableptr[current].sock_clspipefd0);
                   stableptr[current].sock_clspipefd0 = 0;
                }
                if (stableptr[current].sock_clspipefd1)
                {
                   close(stableptr[current].sock_clspipefd1);
                   stableptr[current].sock_clspipefd1 = 0;
                }
            }
            return (current);
        }
    }                                /* current == sockmax */
}                                    /* getsockentry */

/***************
 * relsockentry *
 ***************/
int
relsockentry(int sockindex)
```

-82-

```
{
   stableptr[sockindex].sockno = 0;
   return 0;
}                                /* relsockentry */

/*************
 * soconv_err *
 *************/
int
soconv_err(aixerrno)
int         aixerrno;
{
   switch (aixerrno)
   {
   case 0:
        return (0);
   case EWOULDBLOCK:
        return (HEWOULDBLOCK);
   case EINPROGRESS:
        return (HEINPROGRESS);
   case EALREADY:
        return (HEALREADY);
   case ENOTSOCK:
        return (HENOTSOCK);
   case EDESTADDRREQ:
        return (HEDESTADDRREQ);
   case EMSGSIZE:
        return (HEMSGSIZE);
   case EPROTOTYPE:
        return (HEPROTOTYPE);
   case ENOPROTOOPT:
        return (HENOPROTOOPT);
   case EPROTONOSUPPORT:
        return (HEPROTONOSUPPORT);
   case ESOCKTNOSUPPORT:
        return (HESOCKTNOSUPPORT);
   case EOPNOTSUPP:
        {
           syslog(LOG_ERR,
                  "E1260: Illegal Socket Error call %d", EOPNOTSUPP);
           return (HEOPNOTSUPP);
        }
   case EPFNOSUPPORT:
        return (HEPFNOSUPPORT);
   case EAFNOSUPPORT:
        return (HEAFNOSUPPORT);
   case EADDRINUSE:
        return (HEADDRINUSE);
   case EADDRNOTAVAIL:
        return (HEADDRNOTAVAIL);
   case ENETDOWN:
        return (HENETDOWN);
```

-83-

```
case ENETUNREACH:
    return (HENETUNREACH);
case ENETRESET:
    return (HENETRESET);
case ECONNABORTED:
    return (HECONNABORTED);
case ECONNRESET:
    return (HECONNRESET);
case ENOBUFS:
    return (HENOBUFS);
case EISCONN:
    return (HEISCONN);
case ENOTCONN:
    return (HENOTCONN);
case ESHUTDOWN:
    return (HESHUTDOWN);
case ETOOMANYREFS:
    return (HETOOMANYREFS);
case ETIMEDOUT:
    return (HETIMEDOUT);
case ECONNREFUSED:
    return (HECONNREFUSED);
case EHOSTDOWN:
    return (HEHOSTDOWN);
case EHOSTUNREACH:
    return (HEHOSTUNREACH);
case ENXIO:
    return (HENOSUCHADDR);
case EPERM:
    return (HENOTALLOWED);
case EACCES:
    return (HENOTPRIVILEG);
case EINVAL:
    return (HEWRONGPARAM);
case EFAULT:
    return (HEFAULTMEM);
case EPIPE:
    return (HECANTSENDMORE);
default:
    {
        syslog(LOG_ERR, "E1261: Socket soconv_err default call %d",
            aixerrno);
        return (aixerrno);
    }
}                               /* aixerrno switch */
/*
* No Equivalent Error Codes in AIX for these GCOS6 types:
*       ENOTACCEPT;     ELENERRSEND;
*       ELENERRRECV;    ECANTSENDMORE;
*       ECANTRECVMORE;  EMEMCORPTD;
*       EROUTEEXIST;    ETCPNOTSTARTED;
*       ENOROUTE;       ENOSUCHIF;
```

```
*/
}                          /* soconv_err */

/*
 * do nothing SIGUSR2 handler
 */
void
cl_accept()
{
    ;
}
```

-85-

II. SOCKET HANDLER COMPONENT (sockmclc.c)

```c
/*
 * Monitor call interface to the socket abstraction for Host (HVX).
 */ include "socktcpmcl.h"
include "socktcperr.h"
#include <socket.h>
#include "sock_fcbi.h"
#include "sock_ioctl.h"
#include "sockmcli.h"
#include "sock_iorb.h"
#ifdef 0
#define SYSTEM_RESIDENT_ 1
#include <z_names.h>
endif define GROUP$S 0x2453

/* issue i/o request to socket server */ int issue_reqio (EXT_IORB *iorb_p, IORB_FN fcode, int lrn,
                 char *adr, int rng, unsigned int dvs)
{
  struct mcl_psb   regs;
  int              rc, rc2;

/* initialize IORB fields */
  iorb_p->i_ct1.s.i       = TRUE;           /* set for iorb request   */
  iorb_p->i_ct2.s.function = fcode;         /* set iorb function code */
  iorb_p->i_ct2.s.extended = TRUE;          /* always use extended iorb */
  iorb_p->i_ext           = 0x0E0E;         /* size of extended part  */
  iorb_p->i_ct2.s.lrn     = USE_XTND_LRN;   /* use extended LRNs      */
  iorb_p->i_elrn          = lrn;            /* store LRN in iorb      */
  iorb_p->i_adr           = CPTR_BASE (adr); /* set buffer address    */
  iorb_p->i_ct2.s.byte    = CPTR_OFFSET (adr) ? TRUE : FALSE;
  iorb_p->i_rng           = (short int) rng; /* set transfer range    */
  iorb_p->i_dvs           = dvs;            /* set device specific word */
  iorb_p->i_type          = SOCK_IORB_ID;   /* set iorb type for server */
  iorb_p->i_dv2           = 0x0a0a;

/* set up mcl interface and issue request */
  memset ((void *) ®s, 0, sizeof (struct mcl_psb));
  regs.reg_b4 = (short int *) &iorb_p->iorb_base;
  rc = mcl (MCL$RQIO, ®s);
  rc2 = iorb_p->i_dv2;
#ifdef 0
  if (rc != 0) {
     printf("issue_reqio error=%x on fcode=%x dvs=%x rng=%x\n",rc, fcode,dvs,rng);
  }
```

-86-

```c
    else if (rc2 != 0)
        printf("issue_reqio dv2=%x\n",rc2);
#endif
    return (rc == 0 && rc2 == 0) ? 0 : (rc2 ? rc2 : rc);

}

/* reserve an available socket lrn and the physical device
 */
int gtsock_lrn (int *lrn)
{
    int         rc;
    struct mcl_psb    regs;

memset ((void *) ®s, 0, sizeof (struct mcl_psb));
    if ((rc = mcl(MCL_SOCK_LRN, ®s)) == 0) {
        *lrn = regs.reg_r2;
        rc = mcl (MCL_GTDEV, ®s);
    }
    return rc;
}

/* release the server (the socket lrn)
 */
int reles_sock_dev (int lrn)
{
    int         rc;
    struct mcl_psb    regs;

memset ((void *) ®s, 0, sizeof (struct mcl_psb));
    regs.reg_r2 = lrn;
    rc = mcl (MCL_RLDEV, ®s);
    return rc;
}

/**/
int socket(int family, int type, int protocol)
{
    Map_t   sp;
    int     u_error, u_tgid, lrn ;
    struct  mcl_psb context;
    EXT_IORB iorb;

lrn = -1;
    if (type == SOCK_RAW) {
        memset(&context,0,sizeof(struct mcl_psb));
        if (mcl(MCL$GRPID, &context))
            u_tgid = 0x2e2e;
        else
            u_tgid = context.reg_r6;
```

-87-

```
        if (u_tgid != GROUP$S) {
            context.reg_r1 = 0;
            context.reg_r6 = 0;
            if (!(mcl(MCL$CKPRV, &context))){
              if (context.reg_r1) {
                RetCode = ENOTPRIVILEG;
                return(-1);
              }
            }
            else {
                    RetCode = ENOTPRIVILEG;
                    return(-1);
            }
        }
   }
   sp.LFN = -1 ;
   u_error = Start_Socket_FCB(&sp) ;
   if (u_error) {
     RetCode = u_error ;
     return( -1 ) ;
   }
   memset ((void *) &iorb, 0, sizeof (EXT_IORB));
   iorb.so.socket.family = family;
   iorb.so.socket.type = type;
   iorb.so.socket.protocol = protocol;

if (u_error = gtsock_lrn(&lrn)) {
      goto bad;
   }
   u_error = issue_reqio(&iorb, CONN_FUNCTION, lrn, NULL, 0, SOCKET);
   if (u_error != 0 ) {
   bad:
      if (lrn < 0)
             reles_sock_dev(lrn);
      RetCode = u_error ;
      Release_Socket_FCB( sp.LFN ) ;
      Stop_Socket_FCB( &sp ) ;
      Release_Socket_FCB( sp.LFN ) ;
      return( -1 );
   }
   sp.sap->socket_descriptor = (struct socket *)lrn;
   Release_Socket_FCB( sp.LFN ) ;
   return( sp.LFN );
}

/**/
int bind(int lfn, SOCKADDR *name, int namelen)
{
  Map_t sp;
  int u_error, lrn;
  EXT_IORB iorb;
```

-88-

```
if ((name == 0) || (namelen < sizeof(SOCKADDR))) {
  RetCode = EWRONGPARAM;
  return ( -1 );
}
sp.LFN = lfn ;
u_error = Get_Socket_FCB(&sp);
if ( u_error ) {
  RetCode = u_error ;
  return ( -1 ) ;
}
lrn = (int)sp.sap->socket_descriptor;
memset ((void *) &iorb, 0, sizeof (EXT_IORB));

u_error = issue_reqio(&iorb, FC_WRITE, lrn, (char *)name, namelen, BIND);

if ( u_error != 0 ) {
bad:
    RetCode = u_error;
    Release_Socket_FCB( sp.LFN ) ;
    return( -1 );
}
Release_Socket_FCB( sp.LFN ) ;
return(0);
}

/**/
int listen(int lfn, int backlog)
{
  Map_t sp;
  int u_error, lrn ;
  EXT_IORB iorb;

sp.LFN = lfn ;
  u_error = Get_Socket_FCB( &sp );
  if ( u_error ) {
    RetCode = u_error ;
    return( -1 ) ;
  }
  lrn = (int)sp.sap->socket_descriptor;
  memset ((void *) &iorb, 0, sizeof (EXT_IORB));
  iorb.so.listen.backlog = backlog;
  u_error = issue_reqio(&iorb, FC_WRITE, lrn, NULL, 0, LISTEN);
  Release_Socket_FCB( sp.LFN ) ;
  if ( u_error != 0 ) {
    RetCode = u_error ;
    return( -1 ) ;
  }
  return(0);
}

/**/
int accept(int lfn, SOCKADDR *name, int *namelen)
```

-89-

```
{
  Map_t     sp, sp2 ;
  int       u_error, lrn, newlrn, sockfd;
  EXT_IORB  iorb;

newlrn = -1;
  sp.LFN = lfn ;
  u_error = Get_Socket_FCB(&sp);
  if ( u_error ) {
    RetCode = u_error ;
    return( -1 ) ;
  } sp2.LFN = -1 ;
  u_error = Start_Socket_FCB( &sp2 );
  if ( u_error ) {
    Release_Socket_FCB( sp.LFN );
    RetCode = u_error;
    return( -1 );
  }
  lrn = (int)sp.sap->socket_descriptor;
  memset ((void *) &iorb, 0, sizeof (EXT_IORB));
  u_error = issue_reqio(&iorb, FC_WRITE, lrn, (char *)name, *namelen, ACCEPT);

if (u_error != 0) {
bad:
    if (newlrn != -1) {
          reles_sock_dev(newlrn);
    }
    Release_Socket_FCB( sp.LFN ) ;
    Release_Socket_FCB( sp2.LFN ) ;
    Stop_Socket_FCB( &sp2 ) ;
    Release_Socket_FCB( sp2.LFN ) ;
    RetCode = u_error ;
    return(-1);
  }
  sockfd = iorb.so.accept.sockfd;
  memset ((void *) &iorb, 0, sizeof (EXT_IORB));
  iorb.so.accept.sockfd = sockfd;
  u_error = gtsock_lrn(&newlrn);   /* allocate lrn for accept */
  if ((u_error != 0) && (newlrn == -1))
  {
    /* close the newly accept socket */
bad1:
    issue_reqio(&iorb, FC_WRITE, lrn, NULL, 0, ACCEPT_REJECT);
    goto bad;
  }
  /* issue iorb to server to confirm the accept so that the ln_server
   * will put the socket main server's address into the rct
   */
  u_error = issue_reqio(&iorb, CONN_FUNCTION, newlrn, NULL, 0, ACCEPT_CONFIRM);
  if (u_error != 0)
```

-90-

```
    goto bad1;
  sp2.sap->socket_descriptor = (struct socket *)newlrn;
  Release_Socket_FCB( sp.LFN );
  Release_Socket_FCB( sp2.LFN );
  return( sp2.LFN );
}
/**/
int connect(int lfn, SOCKADDR *name, int namelen)
{
  Map_t    sp;
  int      u_error, lrn;
  EXT_IORB iorb;

if ((name == 0) || (namelen < sizeof(SOCKADDR))) {
    RetCode = EWRONGPARAM;
    return ( -1 );
  }
  sp.LFN = lfn;
  u_error = Get_Socket_FCB( &sp );
  if ( u_error ) {
    RetCode = u_error;
    return( -1 );
  }
  lrn = (int)sp.sap->socket_descriptor;
  memset ((void *) &iorb, 0, sizeof (EXT_IORB));
  u_error = issue_reqio(&iorb, FC_WRITE, lrn, (char *)name, namelen, CONNECT);
  if (u_error != 0 ) {
    Release_Socket_FCB( sp.LFN );
    RetCode = u_error;
    return( -1 );
  }
  Release_Socket_FCB( sp.LFN );
  return(0);
}

/**/
int socketpair(int domain, int type, int protocol, int *rsv)
{
    RetCode = EOPNOTSUPP;
    return( -1 );
}

/**/
int sendto(int lfn, void *buf, int len, int flags, SOCKADDR *to, int tolen)
{
  Map_t    sp;
  int      u_error, lrn ;
  EXT_IORB iorb;

if ( ( (buf == 0) || (len == 0) || (to == 0) || (tolen < sizeof(SOCKADDR))) {
    RetCode = EWRONGPARAM;
```

-91-

```
  return ( -1 );
}
sp.LFN = lfn ;
u_error = Get_Socket_FCB(&sp);
if ( u_error ) {
  RetCode = u_error ;
  return( -1 ) ;
}
lrn = (int)sp.sap->socket_descriptor;
memset ((void *) &iorb, 0, sizeof (EXT_IORB));
iorb.so.data.flags = flags;
iorb.so.data.len = tolen;
memcpy((char *)&iorb.so.data.sockaddr, (char *) to, tolen);
u_error = issue_reqio(&iorb, FC_WRITE, lrn, (char *) buf, len, SENDTO);
Release_Socket_FCB( sp.LFN ) ;
if (u_error != 0 ) {
  RetCode = u_error ;
  return( -1 );
}
  return (iorb.i_cnt);
}

/**/
int send(int lfn, void *buf, int len, int flags)
{

Map_t      sp;
  int        u_error, lrn ;
  EXT_IORB   iorb;

if ((buf == 0) || (len == 0)) {
    RetCode = EWRONGPARAM;
    return ( -1 );
  }
  sp.LFN = lfn ;
  u_error = Get_Socket_FCB( &sp );
  if ( u_error ) {
    RetCode = u_error ;
    return( -1 ) ;
  }
  lrn = (int)sp.sap->socket_descriptor;
  memset ((void *) &iorb, 0, sizeof (EXT_IORB));
  iorb.so.data.flags = flags;

u_error = issue_reqio(&iorb, FC_WRITE, lrn, (char *) buf, len, SEND);

Release_Socket_FCB( sp.LFN ) ;
  if (u_error != 0) {
    RetCode = u_error ;
    return( -1 );
  }
  return ( iorb.i_cnt) ;
```

```
}
/**/
int sendmsg(int lfn,struct msghdr *umsg, int flags)
{
    RetCode = EOPNOTSUPP;
    return( -1 ) ;
}

/**/
int recvfrom(int lfn, void *buf, int len, int flags, SOCKADDR *from,
             int *fromlen)
{
  Map_t      sp;
  int        u_error, lrn;
  EXT_IORB   iorb;

if ((buf == 0) || (len == 0) || (from == 0) ||
                  (*fromlen < sizeof(SOCKADDR))) {
    RetCode = EWRONGPARAM;
    return ( -1 );
  }
  sp.LFN = lfn ;
  u_error = Get_Socket_FCB( &sp ) ;
  if (u_error) {
    RetCode = u_error ;
    return( -1 ) ;
  }
  lrn = (int)sp.sap->socket_descriptor;
  memset ((void *) &iorb, 0, sizeof (EXT_IORB));
  iorb.so.data.flags = flags;
  iorb.so.data.len = *fromlen;

u_error = issue_reqio(&iorb, FC_READ, lrn, (char *) buf, len, RECVFROM);

Release_Socket_FCB( sp.LFN ) ;
  if (u_error != 0) {
    RetCode = u_error;
    return (-1);
  }
  memcpy((char *)from, (char *)&iorb.so.data.sockaddr, iorb.so.data.len);
  *fromlen = iorb.so.data.len;
  return( iorb.i_cnt) ;
}

/**/
int recvmsg(int lfn, struct msghdr *msg, int flags)
{
    RetCode = EOPNOTSUPP;
    return( -1 ) ;
}
```

-93-

```
/**/
int recv(int lfn, void *buf, int len, int flags)
{
  Map_t      sp;
  int        u_error, lrn;
  EXT_IORB   iorb;

if ((buf == 0) || (len == 0)) {
    RetCode = EWRONGPARAM;
    return ( -1 );
  }
  sp.LFN = lfn ;
  u_error = Get_Socket_FCB( &sp ) ;
  if ( u_error ) {
    RetCode = u_error ;
    return( -1 ) ;
  }
  lrn = (int)sp.sap->socket_descriptor;
  memset ((void *) &iorb, 0, sizeof (EXT_IORB));
  iorb.so.data.flags = flags;
  u_error = issue_reqio(&iorb, FC_READ, lrn, (char *) buf, len, RECV);

Release_Socket_FCB( sp.LFN ) ;
  if ( u_error != 0 ) {
    RetCode = u_error;
    return (-1);
  }
  return( iorb.i_cnt);
}

/**/
int shutdown(int lfn, int how)
{
  Map_t      sp;
  int        u_error, lrn ;
  EXT_IORB   iorb;

sp.LFN = lfn ;
  u_error = Get_Socket_FCB( &sp ) ;
  if ( u_error ) {
    RetCode = u_error ;
    return ( -1 ) ;
  }
  lrn = (int)sp.sap->socket_descriptor;
  memset ((void *) &iorb, 0, sizeof (EXT_IORB));
  iorb.so.shut.how = how;
  u_error = issue_reqio(&iorb, FC_WRITE, lrn, NULL, 0, SHUTDOWN);

Release_Socket_FCB( sp.LFN ) ;
  if ( u_error != 0 ) {
    RetCode = u_error ;
    return ( -1 ) ;
```

-94-

```
  }
  return(0);
}

/**/
int setsockopt(int lfn, int level, int name, void *val, int valsize)
{
  Map_t     sp;
  int       u_error, lrn ;
  EXT_IORB  iorb;

if ((val == 0) || (valsize == 0)) {
    RetCode = EWRONGPARAM;
    return ( -1 );
  } sp.LFN = lfn ;
  u_error = Get_Socket_FCB(&sp);
  if ( u_error ) {
    RetCode = u_error ;
    return (-1);
  }
  lrn = (int)sp.sap->socket_descriptor;
  memset ((void *) &iorb, 0, sizeof (EXT_IORB));
  iorb.so.sockopt.level = level;
  iorb.so.sockopt.name = name;

u_error = issue_reqio(&iorb, FC_WRITE, lrn, (char *) val, valsize, SETSOPT);
  Release_Socket_FCB(sp.LFN);
  if ( u_error != 0 ) {
    RetCode = u_error;
    return (-1) ;
  }
  return(0);
}

/**/
int getsockopt(int lfn, int level, int name, void *val, int *avalsize)
{
  Map_t     sp;
  int       u_error, lrn ;
  EXT_IORB  iorb;

if ((val == 0) || (*avalsize == 0) || (avalsize == 0)) {
    RetCode = EWRONGPARAM;
    return ( -1 );
  }
  sp.LFN = lfn ;
  u_error = Get_Socket_FCB( &sp ) ;
  if ( u_error ) {
    RetCode = u_error ;
    return ( -1 ) ;
```

-95-

```
   }
   lrn = (int)sp.sap->socket_descriptor;
   memset ((void *) &iorb, 0, sizeof (EXT_IORB));
   iorb.so.sockopt.level = level;
   iorb.so.sockopt.name = name;

u_error = issue_reqio(&iorb, FC_READ, lrn, (char *) val,
                         *avalsize, GETSOPT);

Release_Socket_FCB( sp.LFN ) ;
   if (u_error != 0 ) {
     RetCode = u_error ;
     return( -1 ) ;
   }
   *avalsize = iorb.i_cnt;
   return(0);
}

/**/
/*
 * Get socket name.
 */
int getsockname(int lfn, SOCKADDR *asa, int *alen)
{
   Map_t     sp;
   int       u_error, lrn ;
   EXT_IORB  iorb;

if ((asa == 0) || (alen == 0) || (*alen == 0)) {
     RetCode = EWRONGPARAM;
     return ( -1 );
   }
   sp.LFN = lfn ;
   u_error = Get_Socket_FCB( &sp ) ;
   if ( u_error ) {
     RetCode = u_error ;
     return ( -1 ) ;
   }
   lrn = (int)sp.sap->socket_descriptor;
   memset ((void *) &iorb, 0, sizeof (EXT_IORB));
   iorb.so.data.len = *alen;
   u_error = issue_reqio(&iorb, 0, lrn, 0, 0, GETSNAME);

Release_Socket_FCB( sp.LFN ) ;
   if (u_error != 0 ) {
     RetCode = u_error ;
     return( -1 );
   }
   memcpy((char *)asa, (char *)&iorb.so.data.sockaddr, iorb.i_cnt);
   return(0);
}
```

-96-

```c
/**/
/*
 * Get name of peer for connected socket.
 */
int getpeername(int lfn, SOCKADDR *asa, int *alen)
{
  Map_t     sp;
  int       u_error,lrn ;
  EXT_IORB  iorb;

if ((asa == 0) || (alen == 0) || (*alen == 0)) {
    RetCode = EWRONGPARAM;
    return ( -1 );
  }
  sp.LFN = lfn ;
  u_error = Get_Socket_FCB( &sp ) ;
  if ( u_error ) {
    RetCode = u_error ;
    return ( -1 ) ;
  }
  lrn = (int)sp.sap->socket_descriptor;
  memset ((void *) &iorb, 0, sizeof (EXT_IORB));
  iorb.so.data.len = *alen;
  u_error = issue_reqio(&iorb, 0, lrn, 0,0, GETPEERNAME);

Release_Socket_FCB( sp.LFN ) ;
  if (u_error != 0 ) {
    RetCode = u_error ;
    return( -1 );
  }
  memcpy((char *)asa, (char *)&iorb.so.data.sockaddr, iorb.i_cnt);
  return(0);
}

/**/
int sclose(int lfn)
{
  Map_t     sp;
  int       u_error, lrn;
  EXT_IORB  iorb;

sp.LFN = lfn ;
  u_error = Stop_Socket_FCB( &sp ) ;
  if ( u_error != 0 && u_error != 0xffff) {
    RetCode = u_error ;
    return ( -1 ) ;
  }
  if (u_error == 0xffff)/* do not close socket if someone else use it */
    u_error = 0;
  else {
    lrn = (int) sp.sap->socket_descriptor;
    memset ((void *) &iorb, 0, sizeof (EXT_IORB));
```

-97-

```
    u_error = issue_reqio(&iorb, DISC_FUNCTION, lrn, NULL, 0, SCLOSE);
  }
  Release_Socket_FCB( sp.LFN ) ;
  reles_sock_dev(lrn);
  if ( u_error != 0 ) {
    RetCode = u_error ;
    return( -1 ) ;
  }
  return(0);
}

/**/
int soo_ioctl(lfn, cmd, udata, datalen)
int    lfn, cmd;
char   *udata;
int    datalen;
{ int        u_error, *data, lrn;
  Map_t      sp;
  EXT_IORB   iorb;
data = (int *)udata;
  if (data == (int *)0 || (datalen <= 0)) {
    RetCode = EWRONGPARAM;
    return( -1 );
  }
/*****
  if ((cmd != SIOCWKSERV) && (cmd != SIOCWKSERV))
  {
    RetCode = EOPNOTSUPP;
    return(-1);
  }
*****/
  sp.LFN = lfn;
  u_error = Get_Socket_FCB( &sp );
  if ( u_error ) {
    RetCode = u_error;
    return( -1 );
  }
  lrn = (int)sp.sap->socket_descriptor;
  memset ((void *) &iorb, 0, sizeof (EXT_IORB));
  iorb.so.ioctl.cmd = cmd;
  u_error = issue_reqio(&iorb, FC_WRITE, lrn, udata, 2, IOCTL);

if (u_error != 0) {
    RetCode = u_error;
    Release_Socket_FCB( sp.LFN ) ;
    return( -1 );
  }
  Release_Socket_FCB( sp.LFN ) ;
  return (0);
}
```

III. SOCKET CONTROL TABLE STRUCTURE (ntc_ncb.h)

```
* Shared memory socket control table
*/
struct sock_table
{
   int    sockno;         /* socket number from tcp/ip */
   int    sock_pid;       /* process ID associated with Loop/Main Recv */
   int    sock_pid_xmit;  /* process ID associated with Main Send */
   int    sock_flags;     /* flags */
   int    sock_wrpipefd;  /* write pipe fd with Loop */
   int    sock_xwrpipefd; /* write pipe fd with Loop */
   int    sock_clspipefd0; /* read pipe fd to be closed */
   int    sock_clspipefd1; /* write pipe fd to be closed */
};
#define SOCKSIZE   1024   /* Max.# of socket descriptors in the system */
```

-99-

IV.  SOCKET CALL AND IORB RELATED DATA STRUCTURES (sock_iorb.h)

```c
/*Emulated System ( HVS) monitor call function codes */
#define MCL_SOCK_LRN    0x3727    /* get LRN of an available lrn */
#define MCL_GTDEV       0x020B    /* get physical device */
define MCL_RLDEV       0x020C    /* release physical device */ struct socketparm {     /* for socket call */
  int  family;
  int  type;
  int  protocol;
};

struct listenparm {     /* for listen call */
  int  backlog;
};

struct dataparm {       /* for send, recv,sendto or recvfrom call */
  int   flags;
  char  sockaddr[16];
  int   len;
};

struct shutdownparm {   /* for shutdown call */
  int  how;
};
struct sockoptparm {    /* for getsocketopt or setsocketopt call */
  int  level;
  int  name;
};

struct ioctlparm {      /* for socket ioctl call */
  int   cmd;
};

struct acceptparm {     /* for socket accept call */
  int  sockfd;
  int  newlrn;
};

/* extended IORB structure for socket */ typedef struct sock_iorb {
    unsigned int  filler:4;      /* unused            */
    unsigned int  i_elrn:12;     /* extended LRN       */
    short int     sys_use [2];   /* used by system     */

/* -> HERE'S OFFSET 0, AS FAR AS GCOS IS CONCERNED <- */
    short int  *i_rsu;     /* reserved for system use    */
```

-100-

```
union
{
   struct
   {
      unsigned int rs:8;  /* Return status              */
      unsigned int t:1;   /* 1 => Not posted yet        */
      unsigned int w:1;   /* 1 => Don't wait            */
      unsigned int u:1;   /* For applications's use     */
      unsigned int s:1;   /* 1 => V-op named semaphore  */
                          /*    when this IORB is posted */
      unsigned int p:1;   /* 1 => Can satisfy a Wait Any */
      unsigned int r:1;   /* 1 => Request designated    */
                          /*    when this IORB is posted */
      unsigned int d:1;   /* 1 => Delete this IORB when */
                          /*    it is posted            */
      unsigned int i:1;   /* Must be set                */
   } s;
   unsigned short int w;
   unsigned char cs [2];
} i_ct1;
union
{
   struct
   {
      unsigned int lrn:8;      /* Logical Resource Number */
      unsigned int byte:1;     /* byte index of buffer address */
      unsigned int private:1;  /* 1 => Private space     */
      unsigned int extended:1; /* 1 => This is a extended IORB */
      unsigned int function:4; /* Function code          */
   } s;
   unsigned short int w;
   unsigned char cs [2];
} i_ct2;
short int *         i_adr;   /* buffer address for data transfer */
short int           i_rng;   /* max number bytes to be transferrred */
unsigned short int i_dvs;   /* device specific word (socket calls) */
short int           i_rsr;   /* iorb_rng - num bytes transferred */
unsigned short int i_st;    /* status word              */
unsigned short int i_ext;   /* extension size */
/* EXTENDED PART OF IORB */
unsigned short int i_dv2;   /* return code stored here by server */
unsigned short int i_cnt;
unsigned short int i_type;
unsigned short int i_rfu;
union {
      struct acceptparm    accept;
      struct socketparm    socket;
      struct listenparm    listen;
      struct dataparm      data;
      struct shutdownparm  shut;
   struct sockoptparm   sockopt;
      struct ioctlparm     ioctl;
```

-101-

```
}so;
} EXT_IORB;

#define iorb_base  i_rsu           /* offset zero of iorb */
#define iorb_ctl   i_ct1.w
#define iorb_lrn   i_ct2.cs[0]
#define iorb_func  i_ct2.cs[1]

#define SOCK_IORB_ID  5            /* identifies IORB as belonging to socket */

/* IORB function codes */ typedef enum iorb_function_codes {
    SOCKET = 0x11, ACCEPT = 1, BIND = 2,CONNECT = 3,
    GETPEERNAME = 4, GETSNAME = 5, GETSOPT = 6, LISTEN = 7,
    RECVFROM = 8, RECV = 0x0a, SEND = 0x0b, SENDTO = 0x0c,
    SHUTDOWN = 0x0d, SETSOPT = 0x0f, SCLOSE = 9,IOCTL = 0x0e,
    ACCEPT_CONFIRM = 0x10, ACCEPT_REJECT = 0x13
} IORB_FN;

/* definition for using extended LRNs in IORBs */ define USE_XTND_LRN    0xfd    /* use extended LRN                    */
```

-102-

V. SOCKET CONTROL & RELATED DATA STRUCTURES (sock_head.h)

```
#define AOK        0
#define SEND       1
#define SENDTO     2
#define RECV       3
#define RECVFROM   4
#define INITIAL    0   /* socket control table first entry */
#define CURRENT    1   /* socket control table 2nd entry */
#define SOCKMAX    2   /* socket control table 3rd entry */
#define SOCKMIN    3   /* beginning of socket control table entry */

/* sock_flags field masks */
#define MAIN_SOCK     0x80
#define IW_WAIT       0x40
#define IN_ACCEPT     0x20
#define IN_RCVBI      0x10
#define ACCEPT_BREAKIN 0x100

/* IORB Function code */
#define CONN_FUNCTION 10
#define DISC_FUNCTION 11
/* defines for HVX SOCKET call IORB device specific word (dvs) */
#define FC_RFU         0x0    /* rserverd                              */
#define FC_ACCPT       0x1    /* Accept Connection on a Socket         */
#define FC_BIND        0x2    /* Bind a Socket                         */
#define FC_CNNCT       0x3    /* Establish a Connection on a Socket    */
#define FC_GTPNM       0x4    /* Get Peer Name                         */
#define FC_GTSNM       0x5    /* Get Socket Name                       */
#define FC_GTSOP       0x6    /* Get Socket Options                    */
#define FC_LISTN       0x7    /* Listen on a Socket                    */
#define FC_RCVFM       0x8    /* Receive Data from Specified Socket    */
#define FC_CLOSE       0x9    /* Close a Socket                        */
#define FC_RECV        0xa    /* Receive from a Socket                 */
#define FC_SEND        0xb    /* Send to a Socket                      */
#define FC_SNDTO       0xc    /* Send Data to Specified Socket         */
#define FC_SHUTD       0xd    /* Shutdown Xmission on a Socket         */
#define FC_IOCTL       0xe    /* Send IO control to a Socket           */
#define FC_SSKOP       0xf    /* Set Options on a Socket               */
#define ACCEPT_CONFIRM 0x10   /* Update given Socket Index to given RCT */
#define FC_SOCKT       0x11   /* Open a Socket                         */
#define FC_ABORT       0x12   /* abort the accept process              */
define ACCEPT_REJECT  0x13   /* reject the socket on accept           */ struct socketparm
{ /* parameters for "Opening a Socket" */
  short  domain;
  short  type;
  short  protocol;
};
```

-103-

```
struct acceptparm
{
  short   accept_index;
  short   newlrn;
};

struct listenparm
{ /* parameters for listen on Sockets */
  short  backlog;
};

struct dataparm
{ /* Socket Send or Sendto or Recv or Recvfrom Parameters */
  short  flags;
  char   sockaddr[16];
  short  len;
};

struct shutdownparm
{ /* Socket Shutdown Parameters */
  short  how;
};

struct sockoptparm
{ /* getsockopt or setsockopt parameters */
  short  level;
  short  name;
};

struct ioctlparm
{ /* Socket IOCTL parameters */
  short  cmd;
};

struct XRB
{ /* IORB structure for Sockets API */
  struct neg_xrb
  {
        WORD rb_lrx;   /*lrn extension (lrn in ct2 = FD) */
        ADDR rb_rrb[2]; /*    return rb (r=1)      */
  } neg;
  ADDR rb_rs[2];     /*   return status     */
  WORD rb_ct1;       /*   rs    |t|w|u|s|a|r|d|1 */
  WORD rb_ct2;       /*   lrn   |i|b| |e| funct */
  ADDR rb_adr[2];    /*   buffer address    */
  WORD rb_rng;       /*   range             */
  WORD rb_dvs;       /*   device specific word  */
  WORD rb_rsr;       /*   residual range    */
  WORD rb_st;        /*   first status word */
  WORD rb_ext;       /*   extended rb length */
  WORD rb_dv2;       /* Operation Return Code; 0 if AOK */
  WORD rb_cnt;       /* number of bytes sent or received */
```

-104-

```
    WORD rb_type;      /* socket type */
    WORD rb_rfu;       /* filler */
    union {
          struct acceptparm      rb_accept;
          struct socketparm      rb_socket;
          struct listenparm      rb_listen;
          struct dataparm        rb_data;
          struct shutdownparm    rb_shut;
          struct sockoptparm     rb_sockopt;
          struct ioctlparm       rb_ioctl;
    }so;
};

/* IPC Message passing from parent to child process */
typedef struct sock_ipc
{
    ushort    operation;    /* Socket MCL Type */
    ushort    flags;        /* not used */
    struct XRB  *myiorb;    /* pointer to GCOS6 IORB */
    struct IRB  *myirb;     /* IRB pointer */
    struct RCT  *myrct;     /* RCT pointer */
}sockmsg;
```

What is claimed is:

1. A host system having a memory organized into shared and host memory areas and a hardware platform operatively coupled to a communications network for communicating with other units using a communications network protocol, said host system emulating the execution of emulated system instructions by an emulator running as an application process on said host system, said emulator including a number of emulated system executive service components operating in said shared memory area comprising a command handler unit and an interpreter, an emulator monitor call unit (EMCU) and server facilities operating in said host memory area, said host system further including operating system facilities for providing a number of services for host programs, said operating system facilities being coupled to said communications network and to said EMCU, said host system further including a socket mechanism for processing socket library calls generated by emulated system application programs running under control of said emulator, said socket mechanism comprising:

socket command handler means included within said command handler unit, said socket command handler means in response to each socket library call specifying a socket function received from an emulated application program generating an I/O request containing an input/output (IORB) data structure coded to contain a socket command identifying a socket operation mapped from said each socket library call and forwarding said request to said EMCU for issuance to said server facilities;

an addressable socket control table located in said host memory area, said socket control table having a number of locations for storing predetermined formatted control words generated in response to socket commands generated by said socket command handler means specifying socket operations designated by said socket commands; and, said server facilities including main socket server processing means, said main socket server processing means in response to each socket command selectively generating a child process as a function of the length of time required to execute that type of socket operation on said communications network through the operating system facilities and for storing and updating said control words stored in said socket control table for executing socket operations initiated by socket library calls generated by any one of said emulated system application programs.

2. The host system of claim 1 wherein said socket command handler means includes a number of socket handler routines and wherein said emulated system components further includes an emulated system socket library containing a plurality of routines which in response to socket library calls from said emulated system application programs generate predetermined socket monitor calls for processing by said number of socket handler routines, each socket handler routine including mapping means for building an extension to said IORB structure for storing predetermined socket argument values derived from said socket monitor call in predetermined fields of said extension and for storing an appropriate socket function code in said IORB data structure designating the socket operation to be performed by said main socket server processing means.

3. The host system of claim 2 wherein said predetermined fields include an iorb socket family, iorb socket type and iorb socket protocol fields.

4. The host system of claim 1 wherein said server facilities includes a dynamic server handler which in response to a first I/O request specifying a socket operation operates to invoke said main socket server processing means and establish direct communications between said main socket server processing means and said socket command handler means for processing said socket commands.

5. The host system of claim 4 wherein said main socket server processing means generates said socket control table to contain a predetermined number of locations for processing a maximum number of socket operations for said number of emulated system application programs.

6. The host system of claim 1 wherein said operating system facilities includes a host socket library coupled to a network protocol stack facility, said network protocol stack facility being coupled to said communications network, said main server processing means in response to said socket commands being operative to access said host sockets library for generating signals for invoking said protocol stack to communicate over said communications network using said network protocol.

7. The host system of claim 6 wherein said protocol stack implements said predetermined protocol which corresponds to a TCP/IP protocol.

8. The host system of claim 1 wherein said control words of said socket control table are cleared from said socket control table upon the completion the use of assigned socket network resources by corresponding ones of said emulated system application programs.

9. The host system of claim 1 wherein said length of time exceeds a predetermined period of time during which said main socket server processing means is blocked from processing subsequently received socket commands from other emulated system application programs in an expeditious manner.

10. The host system of claim 9 wherein socket commands coded to specify accept, receive and send functions require a length of time exceeding said predetermined period of time causing said main socket server processing means to generate child processes for executing said socket operations enabling said main socket server processing means to continue processing of said subsequently received socket commands.

11. The host system of claim 1 wherein said socket control table includes socket pointer address means for accessing said locations for storing and updating said control words as required for executing operations specified by said socket commands, said main socket processing means in response to a first socket command and upon receipt of a socket number value from said communication network storing said socket number value corresponding to an actual socket number into a first available location in said socket control table designated by said socket pointer address means and returning to one of said emulated system application programs which issued said socket command, an index value obtained from said socket pointer address means identifying said first available location in said socket control table for use in subsequent socket operation requests.

12. The host system of claim 11 wherein said first socket command is coded to specify an open socket function.

13. The host system of claim 11 wherein said one of said emulated system application programs issues a subsequent socket command which includes said index value specifying a type of socket operation requiring more than a predetermined time period, said main server processing means being operative to access said control word stored in said location specified by said index value for obtaining the actual socket number to be used in issuing socket library calls to said communications network and to advance said socket pointer address means to specify a next available location in said socket control table.

14. The host system of claim 13 wherein said main socket server processing means in response to each subsequent socket command designating said actual socket number determines if a child process already exists for executing said each subsequent socket command, when said child process does not exist, said main socket server means generating an interprocess communications channel and executing a fork type of operation for spawning a child process to perform said socket operation specified by the subsequent socket command furnished by said socket server processing means to said child process through said interprocess communications channel.

15. The host system of claim 1 wherein each control word includes a plurality of fields, a first field for storing a socket number value returned by said host communications network, a first number of fields for storing socket process identification values designating which child process is associated with execution of different types of socket operations, a second number of fields for storing a number of indicator flags for indicating predetermined state characteristics of said socket, a third number of fields for storing pipe file values used for interprocess communication between said child process and said main server processing means and a fourth number of fields for storing pipe field values used for indicating which resources are to be returned to said host system when said socket is closed.

16. The host system of claim 15 wherein said first number of fields includes a first child process ID field for designating which child process is associated with an accept, receive or receive from type function and a second child process ID field for designating which child process is associated with a send or send to function.

17. The host system of claim 15 wherein said second number of fields includes a first indicator flag for designating when said socket defined by said first field is owned by said main server processing means, a second indicator flag for designating when said socket designated by said first field is in an accept block state and a third indicator flag for designating when a break-in command has been received by said main server processing means.

18. The host system of claim 15 wherein said third number of fields includes a first write pipe field for designating a write pipe file descriptor which is associated with a receive, accept or receive from type function and a second write pipe field for designating a write pipe file descriptor which is designated with a send or send to type function.

19. The host system of claim 15 wherein said fourth number of fields includes first and second socket pipe descriptor fields designating pipe files to be closed when said socket designated by said first field is closed.

20. The host system of claim 14 wherein each control word stored in said socket control table remains in said table for a period of time that the actual socket is being used by one of said emulated system application programs.

21. The host system of claim 14 wherein said subsequent socket command specifies an accept type operation, said child process accesses a designated control word location of said socket control table specified by said index value, sets said child process ID in said second number of fields and sets an indicator flag of said third number of fields to indicate that said socket is in an accept blocked state and generates a new socket call to said host requesting a new socket.

22. The host system of claim 21 wherein said child process upon receipt of an actual socket number from said communications network in response to said new socket call, first accesses said socket control table for resetting said indicator flag removing said blocked state and then accesses a next available location of said socket control table for storing in said first field of said control word, the actual socket number of said new socket returned by said host communications network and write pipe descriptor value in a first one of said second number of fields for enabling said child process to communicate with said main server processing means for processing subsequently issued socket commands.

23. A method of organizing an emulator for executing socket library calls received from a plurality of emulated system application programs running under control of a host operating system on a host system connected to host communications network facilities which maximizes the use of said communications network facilities, said operating system including a host socket library, a host protocol stack operatively coupled to said library and to said host communications network facilities, said host system having a memory organized into shared and host memory areas and a hardware platform operatively coupled to said host communications network facilities for communicating with other units using a communications network protocol, said emulator including a number of emulated system executive service components operating in said shared memory area comprising a command handler unit operatively coupled to an emulated system socket library and an interpreter, an emulator monitor call unit (EMCU) coupled to said operating system and server facilities operating in said host memory area, said host system further including a socket mechanism for processing socket library calls generated by emulated system application programs running under control of said emulator, said method comprising the steps of:

including socket command handler means included within said command handler unit;

generating an I/O request containing an input/output (IORB) data structure by said socket command handler means in response to each socket library call specifying a socket function received from an emulated application program;

mapping said each socket library call into a socket command coded to identify a socket operation for inclusion in said I/O request;

forwarding said I/O request to said EMCU for issuance to said server facilities;

storing an addressable socket control table in said host memory area, said socket control table having a number of locations for storing predetermined formatted control words generated in response to socket commands generated by said socket command handler specifying socket operations designated by said socket commands;

including a main socket server processing means in said server facilities;

selectively generating a child process as a function of the length of time required to execute that type of socket operation on said communications network through the operating system facilities by said main socket server processing means in response to said each socket command; and, storing and updating said control words stored in said socket control table by said child process and main socket server processing means for executing socket operations initiated by socket library calls generated by different ones of said emulated system application programs.

24. The method of claim 23 wherein said socket command handler means includes a number of socket handler routines and wherein said system socket library contains a plurality of routines, said method further including the steps of:

generating in response to socket library calls from said emulated system application programs predetermined socket monitor calls for processing by said number of socket handler routines, said mapping step building an extension to said IORB structure for storing predetermined socket argument values derived from said socket monitor call in predetermined fields of said extension and storing an appropriate socket function code in said IORB data structure designating the socket operation to be performed by said main socket server processing means.

25. The method of claim 24 wherein said predetermined fields include an iorb socket family, iorb socket type and iorb socket protocol fields.

26. The method of claim 23 wherein said method further includes the step of accessing said host sockets library in response to said socket command for generating signals which invoke said protocol stack to communicate over said communications network using said network protocol.

27. The method of claim 26 wherein said protocol stack implements said network protocol which corresponds to a TCP/IP protocol.

28. The method of claim 23 wherein said method further includes the step of clearing control words from said socket control upon the completion the use of assigned socket network resources by corresponding ones of said emulated system application programs.

29. The method of claim 23 wherein said length of time exceeds a predetermined period of time during which said main socket server processing means is blocked from processing subsequently received socket commands from other emulated system application programs in an expeditious manner.

30. The method of claim 29 wherein said step of generating said child process is performed in response to each socket command coded to specify an accept, receive or send function which requires a length of time exceeding said predetermined period of time for executing said socket operation enabling said main socket server processing means to continue processing of said subsequently received socket commands.

31. The method of claim 23 wherein said socket control table includes socket pointer address means for accessing said locations for storing and updating said control words as required for executing operations specified by said socket commands, said method further including the steps of:

storing said socket number value corresponding to an actual socket number into a first available location in said socket control table designated by said socket pointer address means main in response to a first socket command and upon receipt of a socket number value from said communication network; and, returning to one of said emulated system application programs which issued said socket command, an index value obtained from said socket pointer address means identifying said first available location in said socket control table for use in subsequent socket operation requests.

32. The method of claim 31 wherein said first socket command is coded to specify an open socket function.

33. The method of claim 31 wherein said one of said emulated system application programs issues a subsequent socket command which includes said index value specifying a type of socket operation requiring more than a predetermined time period, said method further including the steps of:

accessing said control word stored in said location specified by said index value for obtaining the actual socket number to be used in issuing socket library calls to said communications network; and, advancing said socket pointer address means to specify a next available location in said socket control table.

34. The method of claim 33 wherein said method further includes the steps of:

determining if a child process already exists for executing said each subsequently received socket command designating said actual socket number; and, when said child process does not exist, generating an interprocess communications channel and executing a fork type of operation for spawning a child process to perform said socket function specified by the subsequent socket command furnished by said socket server processing means to said child process through said interprocess communications channel.

35. The method of claim 23 wherein each control word includes a plurality of fields, a first field for storing a socket number value returned by said host communications network, a first number of fields for storing socket process identification values designating which child process is associated with execution of different types of socket operations, a number of second fields for storing a number of indicator flags for indicating predetermined state characteristics of said socket, a third number of fields for storing pipe file values used for interprocess communication between said child process and said main server processing means and a fourth number of fields for storing pipe field values used for indicating which resources are to be returned to said host system when said socket is closed.

36. The method of claim 35 wherein said first number of fields includes a first child process ID field for designating which child process is associated with an accept, receive or receive from type function and a second child process ID field for designating which child process is associated with a send or send to function.

37. The method of claim 35 wherein said second number of fields includes a first indicator flag for designating when said socket defined by said first field is owned by said main server processing means, a second indicator flag for designating when said socket designated by said first field is in an accept block state and a third indicator flag for designating when a break-in command has been received by said main server processing means.

38. The method of claim 35 wherein said third number of fields includes a first write pipe field for designating a write pipe file descriptor which is associated with a receive, accept or receive from type function and a second write pipe field for designating a write pipe file descriptor which is designated with a send or send to type function.

39. The method of claim 35 wherein said fourth number of fields includes first and second socket pipe descriptor fields designating pipe files to be closed when said socket designated by said first field is closed.

40. The method of claim 34 wherein each control word stored in said actual socket control table remains in said table for a period of time that the actual socket is being used by one or said emulated system application programs.

41. The method of claim 34 wherein said subsequent socket command specifies an accept type operation, said method further includes the steps of:

accessing a designated control word location of said socket control table specified by said index value by said child process;

setting said child process ID in said second number of fields and an indicator flag of said third number of fields to indicate that said socket is in an accept blocked state; and, generating a new socket call to said host socket library requesting a new socket.

42. The host system of claim 41 wherein said method further includes the steps of:

first accessing said socket control table by child process upon receipt of an actual socket number from said communications network in response to said new socket call for resetting said indicator flag removing said blocked state; and, accessing a next available location of said socket control table for storing in said first field of said control word, the actual socket number of said new socket returned by said host communications network and write pipe descriptor value in a first one of said second number of fields for enabling said child process to communicate with said main server processing means for processing subsequently issued socket commands.

* * * * *